(12) United States Patent
Botts et al.

(10) Patent No.: US 11,745,619 B2
(45) Date of Patent: *Sep. 5, 2023

(54) MULTIPLE CHEMISTRY BATTERY SYSTEMS FOR ELECTRIC VEHICLES

(71) Applicant: Premergy, Inc., Macon, GA (US)

(72) Inventors: Richard Edward Botts, Griffin, GA (US); Blakely Lane Fabiani, Auburn, AL (US); David S. Merrill, Macon, GA (US)

(73) Assignee: PREMERGY, INC, Macon, GA (US)

( * ) Notice: Subject to any disclaimer, the term of this patent is extended or adjusted under 35 U.S.C. 154(b) by 590 days.

This patent is subject to a terminal disclaimer.

(21) Appl. No.: 16/851,388

(22) Filed: Apr. 17, 2020

(65) Prior Publication Data

US 2020/0247269 A1 Aug. 6, 2020

Related U.S. Application Data

(63) Continuation of application No. 16/172,300, filed on Oct. 26, 2018, now Pat. No. 10,661,679.

(51) Int. Cl.
| | |
|---|---|
| *H02P 1/00* | (2006.01) |
| *B60L 58/19* | (2019.01) |
| *H01M 10/0525* | (2010.01) |
| *H02J 7/00* | (2006.01) |
| *B60L 58/12* | (2019.01) |
| *H01M 10/48* | (2006.01) |

(52) U.S. Cl.
CPC ............... *B60L 58/19* (2019.02); *B60L 58/12* (2019.02); *H01M 10/0525* (2013.01); *H01M 10/48* (2013.01); *H02J 7/0042* (2013.01); *H02J 7/0068* (2013.01)

(58) Field of Classification Search
CPC ........ B60L 58/19; B60L 58/12; H02J 7/0042; H02J 7/0068; H01M 10/0525
See application file for complete search history.

(56) References Cited

U.S. PATENT DOCUMENTS

| | | |
|---|---|---|
| 9,037,334 B1 | 5/2015 | Cole |
| 10,017,056 B1 | 7/2018 | Botts |
| 2005/0002140 A1* | 1/2005 | Borrego Bel ....... H02J 7/00304 361/62 |
| 2010/0141213 A1* | 6/2010 | Iida ..................... H01M 10/482 320/134 |

(Continued)

*Primary Examiner* — Kawing Chan
*Assistant Examiner* — Gabriel Agared
(74) *Attorney, Agent, or Firm* — Eversheds Sutherland (US) LLP

(57) ABSTRACT

Multiple chemistry battery systems and methods for using such systems in electric vehicles are disclosed. In one embodiment, an example electric vehicle may include a drive motor configured to impart motion to one or more wheels of the electric vehicle, a plurality of batteries configured to power the drive motor, and one or more controllers. The plurality of batteries may include a first battery including a first cell having a first chemistry, and a second battery including a second cell having a second chemistry different from the first chemistry. The one or more controllers may be configured to cause the first battery and the second battery to power the drive motor, and to cause the drive motor to charge the first battery and the second battery.

18 Claims, 27 Drawing Sheets

(56) References Cited

U.S. PATENT DOCUMENTS

| | | | |
|---|---|---|---|
| 2010/0187905 A1* | 7/2010 | Tang | B60L 50/52 |
| | | | 307/10.1 |
| 2015/0188188 A1* | 7/2015 | Zhang | B60L 58/19 |
| | | | 429/9 |
| 2016/0114692 A1 | 4/2016 | Tripathi et al. | |
| 2016/0207403 A1* | 7/2016 | Iida | B60L 58/20 |
| 2017/0274783 A1* | 9/2017 | Kuribara | B60L 53/14 |
| 2019/0160972 A1 | 5/2019 | Zeiler et al. | |

* cited by examiner

MULTIPLE CHEMISTRY BATTERY SYSTEMS FOR ELECTRIC VEHICLES

CROSS-REFERENCE TO RELATED APPLICATIONS

This application is a continuation of U.S. application Ser. No. 16/172,300 filed Oct. 26, 2018, the entire contents of which is incorporated by reference herewith.

FIELD OF THE DISCLOSURE

The present disclosure relates generally to electric drive systems, and more particularly to multiple chemistry battery systems for electric vehicles or any other electric drive systems with complex duty cycles and related methods for using multiple chemistry battery systems to power electric vehicles and other electric drive systems.

BACKGROUND OF THE DISCLOSURE

Electric vehicles may use a battery system including a number of secondary (i.e., rechargeable) batteries to power the electric vehicle. Particular characteristics of the batteries, the battery system, and an overall electric drive system of the vehicle may determine a range of driving distance for the electric vehicle. Once the secondary batteries are discharged to a certain depth, the batteries may be recharged for subsequent use of the vehicle. For example, the electric vehicle may be stopped and connected to an external charger to recharge the batteries, which may be a time consuming process. In some instances, while the electric vehicle is in motion, the electric drive system may recapture energy during braking or deceleration of the vehicle, which may be used for recharging the batteries. However, it may be difficult to recharge the batteries effectively using such regeneration techniques due to characteristics of the batteries, the battery system, and/or the overall electric drive system.

The utility of a particular secondary battery generally may be defined by a number of performance characteristics, including capacity, discharge rate, charge rate, operating temperature, life, safety, toxicity, and cost of the battery. Currently, no single commercially available secondary battery chemistry is capable of providing optimum performance for all of these characteristics. Accordingly, selection of a secondary battery chemistry for a particular application typically involves tradeoffs between battery performance characteristics. In certain complex applications, such as electric vehicles, demand for optimal performance across the full range of performance characteristics may be particularly high. In the context of electric vehicles, users generally may desire improved electric drive systems that provide an extended range of driving distance as compared to existing technology. Although developments in battery chemistry have led to enhanced driving ranges in recent years, there remains a need for further improvement to electric drive systems and battery systems used therein.

Figure 1:
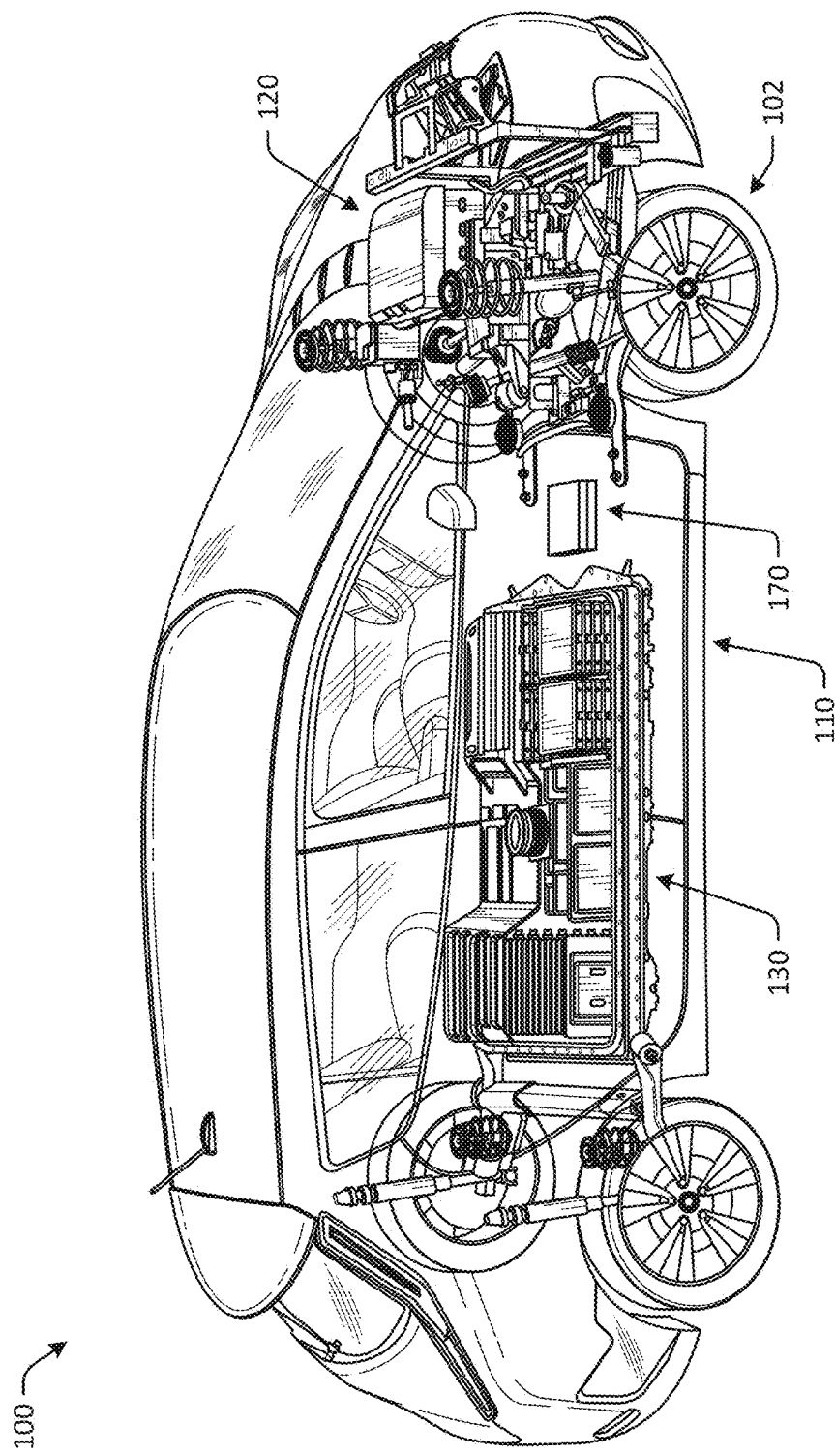
FIG. 1 illustrates an example electric vehicle in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element, depending on the context, may encompass a plural number of such components or elements and vice versa.

DETAILED DESCRIPTION OF THE DISCLOSURE

Overview

Various types of battery systems may be used to power electric vehicles or other electric drive systems. For example, energy stored in one or more secondary (i.e., rechargeable) batteries of a battery system may be used to drive one or more motors and impart rotational motion to one or more wheels of an electric vehicle. The secondary batteries, the motors, one or more controllers, and additional components collectively may form an electric drive system of the vehicle. Particular characteristics of the batteries, the battery system, and the overall electric drive system may determine a range of driving distance for the electric vehicle. The range of driving distance may be based at least in part on the number and capacity of the batteries, respective connections between the batteries, the weight profile and size of the vehicle, and so forth. For example, an electric vehicle having a battery system with a relatively greater battery or energy storage capacity may have a greater range of driving distance than a similar electric vehicle having a battery system with a relatively lesser battery or energy storage capacity. The secondary batteries may be discharged over time, and the batteries may need to be recharged before subsequent use of the vehicle. For example, an external charger may be connected to an internal charger of the electric vehicle and used to recharge the batteries while the vehicle is stopped. Depending on characteristics of the battery system and the secondary batteries thereof, such charging may be a time consuming process. In some instances, while the electric vehicle is in motion, the electric drive system may recapture energy during braking or deceleration of the vehicle and use such energy to recharge the batteries. However, the effectiveness of recharging the batteries using such regeneration techniques may be limited by characteristics of the batteries, the battery system, and/or the overall electric drive system.

Multiple performance characteristics may define the utility of a particular secondary battery. Basic performance characteristics may include capacity, discharge rate, charge rate, operating temperature, life, safety, toxicity, and cost of the battery. Currently, no single commercially available secondary battery chemistry is capable of providing optimum performance for all of these characteristics, and thus selection of a battery chemistry for a particular application generally involves tradeoffs between battery performance characteristics. Demand for optimal performance across the full range of performance characteristics may be particularly high in certain complex applications, such as electric vehicles. For electric vehicles, users continue to desire improved electric drive systems that provide an extended range of driving distance as compared to existing technology.

Battery systems for electric vehicles may include one or more secondary batteries for powering the vehicle. Each secondary battery may include one or more packs each including one or more cells. For example, a battery system may include a plurality of secondary batteries, each secondary battery may include a plurality of packs, and each pack may include a plurality of cells. Various types of connections, including series connections, parallel connections, and combinations of series and parallel connections, may be used to electrically couple respective cells of a particular pack, respective packs of a particular battery, and respective batteries of the battery system. Conventional battery systems generally use a common battery chemistry throughout the entire system. In other words, each cell of the battery system may have the same battery chemistry. For example, certain battery systems for electric vehicles may use lithium-ion (Li-ion) cells throughout the system, while other battery systems may rely solely on nickel-metal hydride (NIMH) cells, nickel cadmium (NiCd) cells, or cells having another type of battery chemistry. As mentioned above, no single commercially available secondary battery chemistry is capable of providing optimum performance for all of the basic performance characteristics. Accordingly, use of a single battery chemistry throughout a particular battery system may achieve optimal performance for one or more characteristics while sacrificing performance with respect to one or more other characteristics. For example, use of one chemistry for a battery system may provide a relatively high energy density but a relatively low power density. In contrast, use of another chemistry for a similarly configured battery system may provide a relatively high power density but a relatively low energy density. As a result, in the context of electric vehicles, use of one of these battery chemistries throughout a battery system may present certain advantages and disadvantages with respect to the range of driving distance provided by the system, the time required to charge the system, and/or other considerations. Users may desire electric vehicles including an electric drive system that provides a relatively high driving range and has a battery system that is capable of being recharged in a relatively short time period. Accordingly, conventional battery systems that use a common battery chemistry throughout the system may not be capable of meeting user demands.

Embodiments of the disclosure may power electric vehicles using a battery system that includes respective cells having multiple different secondary battery chemistries. For example, certain embodiments may use a dual chemistry battery system to power an electric vehicle. In other words, the battery system may include one or more cells having a first chemistry and one or more cells having a second chemistry different from the first chemistry. Other embodiments may power an electric vehicle using a battery system that includes one or more cells having a first chemistry, one or more cells having a second chemistry, and one or more cells having a third chemistry, with the first chemistry, the second chemistry, and the third chemistry being different from one another. Any number of different secondary battery chemistries may be used in a single battery system according to various embodiments of the disclosure. Although certain embodiments of battery systems described herein may be referred to as "dual chemistry" battery systems, such systems alternatively may be referred to as "multiple chemistry" battery systems, particularly when such systems include respective cells having more than two different battery chemistries. Further, although certain embodiments of battery systems and electric drive systems including such battery systems may be described herein with respect to electric vehicles, it will be appreciated that such battery systems and electric drive systems may be used to provide power and impart motion in various other applications.

In one aspect, an electric vehicle is provided. According to one or more embodiments, an electric vehicle may include a first drive motor configured to impart motion to one or more wheels of the electric vehicle, a plurality of batteries configured to power the first drive motor, and one or more controllers. The plurality of batteries may include a first battery comprising a first cell having a first chemistry, and a second battery comprising a second cell having a second chemistry different from the first chemistry. The one or more controllers may be configured to cause the first battery and the second battery to power the first drive motor, and to cause the first drive motor to charge the first battery and the second battery.

In some embodiments, the first cell may have a first energy density, and the second cell may have a second energy density less than the first energy density. In some embodiments, the first cell may have a first power density, and the second cell has a second power density greater than the first power density. In some embodiments, the first cell may be a lithium-ion cell, and the second cell may be a lithium-titanate cell. The first cell and the second cell may have various other battery chemistries and other differences in battery characteristics according to other embodiments.

In some embodiments, the electric vehicle also may include one or more switches or transistors electrically coupled to the first battery and the second battery. The one or more switches or transistors may be configured to transition between a first state in which the one or more switches or transistors form a series connection between the first battery and the second battery and a second state in which the one or more switches or transistors form a parallel connection between the first battery and the second battery. In some embodiments, the one or more controllers may be configured to determine an electric load on the plurality of batteries, and to cause, based at least in part on the electric load, the one or more switches or transistors to form the series connection or the parallel connection between the first battery and the second battery. In some embodiments, the one or more controllers may be configured to cause the one or more switches or transistors to form the series connection between the first battery and the second battery, and to cause the first battery and the second battery to power the first drive motor while the first battery and the second battery are connected in series. In some embodiments, the one or more controllers may be configured to cause the one or more switches or transistors to form the parallel connection between the first battery and the second battery, and to cause the first drive motor to charge the first battery and the second battery while the first battery and the second battery are connected in parallel.

In some embodiments, the electric vehicle also may include one or more DC-DC converters electrically coupled to the first battery and the second battery. In some embodiments, the one or more controllers may be configured to determine a first state of charge of the first battery, to determine a second state of charge of the second battery, and to cause, based at least in part on the first state of charge and the second state of charge, the one or more DC-DC converters to transfer energy between the first battery and the second battery.

In some embodiments, the electric vehicle also may include a second drive motor configured to impart motion to one or more wheels of the electric vehicle. In some embodiments, the one or more controllers may be configured to cause the first battery and the second battery to power the second drive motor, and to cause the second drive motor to charge the first battery and the second battery. In some embodiments, the electric vehicle also may include one or more switches or transistors electrically coupled to the first battery and the second battery. In some embodiments, the one or more switches or transistors may be configured to transition between a first state in which the one or more switches or transistors form a series connection between the first battery and the second battery, a second state in which the one or more switches or transistors form a parallel connection between the first battery and the second battery, and a third state in which the first battery and the second battery are disconnected from one another. In some embodiments, the one or more controllers may be configured to cause the one or more switches or transistors to form the series connection between the first battery and the second battery, and to cause the first battery and the second battery to power the first drive motor and the second drive motor while the first battery and the second battery are connected in series. In some embodiments, the one or more controllers may be configured to cause the one or more switches or transistors to form the parallel connection between the first battery and the second battery, and to cause the first battery and the second battery to power the first drive motor and the second drive motor while the first battery and the second battery are connected in parallel. In some embodiments, the one or more controllers may be configured to cause the one or more switches or transistors to disconnect the first battery and the second battery from one another, to cause the first battery to power the first drive motor while the first battery and the second battery are disconnected from one another, and to cause the second battery to power the second drive motor while the first battery and the second battery are disconnected from one another. In some embodiments, the first motor and the second motor may be mechanically coupled to one another. In some embodiments, the one or more controllers may be configured to cause the one or more switches or transistors to disconnect the first battery and the second battery from one another, to cause the first battery to power the first drive motor while the first battery and the second battery are disconnected from one another, and to cause the second drive motor to charge the second battery while the first battery and the second battery are disconnected from one another and the first battery powers the first drive motor.

In another aspect, an electric drive system is provided. According to one or more embodiments, an electric drive system may include a first drive motor, a plurality of batteries configured to power the first drive motor, and one or more controllers. The plurality of batteries may include a first battery comprising a first cell having a first chemistry, and a second battery comprising a second cell having a second chemistry different from the first chemistry. The one or more controllers may be configured to cause the first battery and the second battery to power the first drive motor, and to cause the first drive motor to charge the first battery and the second battery.

In some embodiments, the first cell may have a first energy density, and the second cell may have a second energy density less than the first energy density. In some embodiments, the first cell may have a first power density, and the second cell has a second power density greater than the first power density. In some embodiments, the first cell may be a lithium-ion cell, and the second cell may be a lithium-titanate cell. The first cell and the second cell may have various other battery chemistries and other differences in battery characteristics according to other embodiments.

In some embodiments, the electric drive system also may include one or more switches or transistors electrically coupled to the first battery and the second battery. The one or more switches or transistors may be configured to transition between a first state in which the one or more switches or transistors form a series connection between the first battery and the second battery and a second state in which the one or more switches or transistors form a parallel connection between the first battery and the second battery. In some embodiments, the one or more controllers may be configured to determine an electric load on the plurality of batteries, and to cause, based at least in part on the electric load, the one or more switches or transistors to form the series connection or the parallel connection between the first battery and the second battery. In some embodiments, the one or more controllers may be configured to cause the one or more switches or transistors to form the series connection between the first battery and the second battery, and to cause the first battery and the second battery to power the first drive motor while the first battery and the second battery are connected in series. In some embodiments, the one or more controllers may be configured to cause the one or more switches or transistors to form the parallel connection between the first battery and the second battery, and to cause the first drive motor to charge the first battery and the second battery while the first battery and the second battery are connected in parallel.

In some embodiments, the electric drive system also may include one or more DC-DC converters electrically coupled to the first battery and the second battery. In some embodiments, the one or more controllers may be configured to determine a first state of charge of the first battery, to determine a second state of charge of the second battery, and to cause, based at least in part on the first state of charge and the second state of charge, the one or more DC-DC converters to transfer energy between the first battery and the second battery.

In some embodiments, the electric drive system also may include a second drive motor. In some embodiments, the one or more controllers may be configured to cause the first battery and the second battery to power the second drive motor, and to cause the second drive motor to charge the first battery and the second battery. In some embodiments, the electric drive system also may include one or more switches or transistors electrically coupled to the first battery and the second battery. In some embodiments, the one or more switches or transistors may be configured to transition between a first state in which the one or more switches or transistors form a series connection between the first battery and the second battery, a second state in which the one or more switches or transistors form a parallel connection between the first battery and the second battery, and a third state in which the first battery and the second battery are disconnected from one another. In some embodiments, the one or more controllers may be configured to cause the one or more switches or transistors to form the series connection between the first battery and the second battery, and to cause the first battery and the second battery to power the first drive motor and the second drive motor while the first battery and the second battery are connected in series. In some embodiments, the one or more controllers may be configured to cause the one or more switches or transistors to form the parallel connection between the first battery and the second battery, and to cause the first battery and the second battery to power the first drive motor and the second drive motor while the first battery and the second battery are connected in parallel. In some embodiments, the one or more controllers may be configured to cause the one or more switches or transistors to disconnect the first battery and the second battery from one another, to cause the first battery to power the first drive motor while the first battery and the second battery are disconnected from one another, and to cause the second battery to power the second drive motor while the first battery and the second battery are disconnected from one another. In some embodiments, the first motor and the second motor may be mechanically coupled to one another. In some embodiments, the one or more controllers may be configured to cause the one or more switches or transistors to disconnect the first battery and the second battery from one another, to cause the first battery to power the first drive motor while the first battery and the second battery are disconnected from one another, and to cause the second drive motor to charge the second battery while the first battery and the second battery are disconnected from one another and the first battery powers the first drive motor.

In still another aspect, a method is provided. According to one or more embodiments, a method may include determining, by one or more computer processors coupled to at least one memory, an electric load on a plurality of batteries of an electric vehicle, causing the first battery and the second battery to power a first drive motor of the electric vehicle, and causing the first drive motor to charge the first battery and the second battery. The plurality of batteries may include a first battery comprising a first cell having a first chemistry, and a second battery comprising a second cell having a second chemistry different from the first chemistry.

In some embodiments, the first cell may have a first energy density, and the second cell may have a second energy density less than the first energy density. In some embodiments, the first cell may have a first power density, and the second cell has a second power density greater than the first power density. In some embodiments, the first cell may be a lithium-ion cell, and the second cell may be a lithium-titanate cell. The first cell and the second cell may have various other battery chemistries and other differences in battery characteristics according to other embodiments.

In some embodiments, the method also may include causing, based at least in part on the electric load, one or more switches or transistors to form a series connection or a parallel connection between the first battery and the second battery. In some embodiments, the method also may include causing one or more switches or transistors to form a series connection between the first battery and the second battery. In some embodiments, causing the first battery and the second battery to power the first drive motor may include causing the first battery and the second battery to power the first drive motor while the first battery and the second battery are connected in series. In some embodiments, the method also may include causing the one or more switches or transistors to form a parallel connection between the first battery and the second battery, and causing the first drive motor to charge the first battery and the second battery while the first battery and the second battery are connected in parallel. In some embodiments, the method also may include causing one or more switches or transistors to form a parallel connection between the first battery and the second battery. In some embodiments, causing the first battery and the second battery to power the first drive motor may include causing the first battery and the second battery to power the first drive motor while the first battery and the second battery are connected in parallel. In some embodiments, the method also may include causing the first drive motor to charge the first battery and the second battery while the first battery and the second battery are connected in parallel.

In some embodiments, the method also may include determining a first state of charge of the first battery, determining a second state of charge of the second battery, and causing, based at least in part on the first state of charge and the second state of charge, one or more DC-DC converters to transfer energy between the first battery and the second battery. In some embodiments, the method also may include causing the first battery and the second battery to power a second drive motor of the electric vehicle, and causing the second drive motor to charge the first battery and the second battery.

In some embodiments, the method also may include causing one or more switches or transistors to form a series connection between the first battery and the second battery, and causing the first battery and the second battery to power the first drive motor and a second drive motor of the electric vehicle while the first battery and the second battery are connected in series. In some embodiments, the method also may include causing the one or more switches or transistors to form a parallel connection between the first battery and the second battery, and causing the first drive motor and the second drive motor to charge the first battery and the second battery while the first battery and the second battery are connected in parallel. In some embodiments, the method also may include causing one or more switches or transistors to form a parallel connection between the first battery and a second battery of the electric vehicle, and causing the first battery and the second battery to power the first drive motor and the second drive motor while the first battery and the second battery are connected in parallel. In some embodiments, the method also may include causing the first drive motor and the second drive motor to charge the first battery and the second battery while the first battery and the second battery are connected in parallel. In some embodiments, the method also may include causing one or more switches or transistors to disconnect the first battery and a second battery of the electric vehicle from one another, causing the first battery to power the first drive motor while the first battery and the second battery are disconnected from one another, and causing the second battery to power a second drive motor of the electric vehicle while the first battery and the second battery are disconnected from one another. In some embodiments, causing the second battery to power the second drive motor while the first battery and the second battery are disconnected from one another may include causing the second battery to power the second drive motor while the first battery and the second battery are disconnected from one another and the first battery powers the first drive motor.

This disclosure relates to, among other things, systems, methods, computer-readable media, techniques, and methodologies for multiple chemistry battery systems, such as dual chemistry battery systems, for electric vehicles. In an example embodiment, an electric vehicle may include a first drive motor, a plurality of batteries, and one or more controllers. The first drive motor may be configured to impart motion to one or more wheels of the electric vehicle, and the plurality of batteries may be configured to power the first drive motor. The plurality of batteries may include a first battery including a first cell having a first chemistry, and a second battery including a second cell having a second chemistry different from the first chemistry. The one or more controllers may be configured to cause the first battery and the second battery to power the first drive motor, and to cause the first drive motor to charge the first battery and the second battery.

As a result, embodiments of the disclosure may improve battery systems and overall electric drive systems for electric vehicles or other applications. In particular, by configuring battery systems with a combination of cells having multiple different battery chemistries, the battery systems may provide optimal performance for more battery performance characteristics than may be achieved with single chemistry battery systems. For example, in certain embodiments related to electric vehicles, the multiple chemistry battery systems may include a combination of cells having respective battery chemistries that provide an extended range of driving distance, faster recharging of the cells, and/or other improved performance attributes as compared to existing battery systems. Further, the multiple chemistry battery systems described herein may allow for greater flexibility in tailoring battery systems for particular complex applications as compared to conventional technology that relies on a single battery chemistry approach.

Referring now to FIG. 1, an example electric vehicle 100 in accordance with one or more embodiments of the disclosure is depicted. The electric vehicle 100 may be any suitable electric or hybrid vehicle that is at least partially powered by stored energy from one or more batteries. For example, the electric vehicle 100 may be a pure electric or all-electric vehicle, a plug-in electric vehicle (PEV), a neighborhood electric vehicle (NEV), a plug-in hybrid electric vehicle (PHEV), a range-extended electric vehicle (REEV), or other type of electric or hybrid vehicle that uses one or more batteries to power one or more motors of the vehicle.

The electric vehicle 100 may include an electric drive system 110 that is configured to propel the vehicle 100 during operation of the electric drive system 110. The electric drive system 110 may include one or more drive motor(s) 120 (which also may be referred to individually as a "traction motor" or an "electric motor"), one or more battery system(s) 130 (which also may be referred to individually as a "battery assembly"), and one or more controller(s) 170 (which also may be referred to individually as a "control module" or a "control unit").

The drive motor(s) 120 may be configured to impart motion to one or more wheel(s) 102 of the electric vehicle 100. In some embodiments, the drive motor(s) 120 may be an AC motor, such as an asynchronous electric motor (i.e., an induction motor) or a synchronous electric motor. In other embodiments, the drive motor(s) 120 may be a DC motor, such as a brushed DC electric motor or a brushless DC electric motor. The drive motor(s) 120 may be mechanically coupled to the wheel(s) 102 via one or more gearboxes, one or more axles, and the like. In a drive mode of operation, the drive motor(s) 120 may operate as a motor, receiving electric current from the battery system(s) 130 and producing torque that is transferred to the wheel(s) 102 and causes the wheel(s) 102 to rotate, thereby causing the electric vehicle 100 to move. In a regeneration mode of operation, the drive motor(s) 120 may operate as a generator, being driven by rotation of the wheel(s) 102 and producing electric current that is delivered to the battery system(s) 130, thereby charging one or more batteries of the battery system(s) 120. In some embodiments, the drive motor(s) 120 may be a single drive motor. In some embodiments, the drive motor(s) 120 may include a first drive motor and a second drive motor. In some embodiments, the first drive motor and the second drive motor may be mechanically coupled to one another such that rotation of an output shaft of the first drive motor causes rotation of an output shaft of the second drive motor and vice-versa. For example, the first drive motor and the second drive motor may be mechanically coupled to one another by a mechanical coupling, such as a shaft, a clutch, a limited-slip differential, and the like. In other embodiments, the first drive motor and the second drive motor may be mechanically uncoupled from one another. In some embodiments, the drive motor(s) 120 may include more than two drive motors, which may be mechanically coupled to one another by two or more mechanical couplings or may be mechanically uncoupled from one another.

The battery system(s) 130 may include one or more secondary (i.e., rechargeable) batteries configured to store energy and to power the drive motor(s) 120. In other words, in the drive mode of operation, the batteries may be configured to deliver electric current to the drive motor(s) 120, thereby causing the drive motor(s) 120 to produce torque. The batteries also may be configured to be charged by the drive motor(s) 120. In other words, in the regeneration mode of operation, the batteries may be configured to receive electric current from the drive motor(s) 120, thereby storing electrical energy that subsequently may be used to power the drive motor(s) 120. Further, the batteries may be configured to be charged by a charger, such as an external AC charger or an external DC charger, when the electric vehicle 100 is stopped and not in use. Each battery may include one or more pack(s) each including one or more cell(s). In some embodiments, each battery may include a plurality of packs, and each pack may include a plurality of cells.

Various types of connections, including series connections, parallel connections, and combinations of series and parallel connections, may be used to electrically couple respective cells of a particular pack, respective packs of a particular battery, and respective batteries of the battery system(s) 130. In some embodiments, the cells of a particular pack may be arranged in modules each including a plurality of cells connected in parallel, with the modules being connected in series. In other embodiments, all of the cells of a particular pack may be connected in series. In some embodiments, all of the packs of a particular battery may be connected in series. In other embodiments, all of the packs of a particular battery may be connected in parallel. In still other embodiments, some of the packs of a particular battery may be connected in series, while other packs of the battery may be connected in parallel. In some embodiments, all of the batteries of a particular battery system may be connected in series. In other embodiments, all of the batteries of a particular battery system may be connected in parallel. In still other embodiments, some of the batteries of a particular battery system may be connected in series, while other batteries of the battery system may be connected in parallel. In some embodiments, the connections between respective cells, between respective packs, and between respective batteries may be fixed. In other embodiments, one or more, or all, of the connections between respective cells, between respective packs, and between respective batteries may be adjustable or switchable, for example, by one or more switches, transistors, or solid state relays, as described further below. In some embodiments, some of the connections between respective cells, between respective packs, and between respective batteries may be fixed, and other connections between respective cells, between respective packs, and between respective batteries may be adjustable or switchable.

Each battery of the battery system(s) 130 also may include a battery management system (BMS) electrically coupled to the cells of the battery. Each BMS may include one or more battery management unit(s) (BMU) each including a controller configured to perform one or more battery management functions using one or more processor(s) thereof. Various BMS configurations may be used. In some embodiments, according to a centralized configuration, a particular BMS may be or may include a single BMU that is electrically coupled to each of the cells of the respective battery. In other embodiments, according to a modular configuration, a particular BMS may include a plurality of BMUs, with the number of BMUs corresponding to the number of packs of the respective battery. In this manner, each BMU may be electrically coupled to each of the cells of the respective pack. In still other embodiments, according to a distributed configuration, a particular BMS may include a plurality of BMUs, with the number of BMUs corresponding to the number of cells of the respective battery. In this manner, each BMU may be electrically coupled to a single cell of the respective battery.

Each BMS may be configured to manage the respective cells coupled thereto. In particular, each BMS may be configured to perform various battery management functions, such as monitoring, energy recovery, computation, communication, connection, and/or optimization functions, with respect to the respective battery, pack(s), and/or cell(s) associated therewith. Monitoring functions performed by the BMS may include monitoring one or more, or all, of voltage (total voltage, voltages of individual cells, minimum cell voltage, maximum cell voltage, and/or voltage of periodic taps), temperature (average temperature, temperatures of individual cells, coolant input temperature, and/or coolant output temperature), state of charge (SOC), depth of discharge (DOD), state of health (SOH), state of power (SOP), and current (current received and/or current delivered), in any combination thereof. Energy recovery functions performed by the BMS may include, in the regeneration mode of operation, controlling recharging of the respective battery, pack(s), and/or cell(s) associated therewith by redirecting recovered energy into the battery, pack(s), and/or cell(s). Computation functions performed by the BMS may include calculating one or more, or all, of maximum charge current, maximum discharge current, energy delivered since last charge or charge cycle, internal impedance of individual cells, charge delivered, charge stored, total energy delivered since first use, total operating time since first use, and/or total number of cycles, in any combination thereof. Communication functions performed by the BMS may include a central controller of the BMS communicating internally with cell-level hardware and/or externally with high-level hardware. In some embodiments, high-level external communication may include controller area network (CAN) bus communications between the BMS and other components, devices, subsystems, or systems of the electric vehicle 100. Connection functions performed by the BMS may include connecting the respective battery to one or more loads, such as the drive motor(s) 120. Optimization functions performed by the BMS may include balancing of the respective cells to maximize the capacity of the respective battery and to prevent localized under-charging or over-charging. In various embodiments, the battery balancing provided by the BMS may be performed with respect to state of charge, voltage, current, or capacity. In some embodiments, the BMS may provide active balancing of the respective cells. In other embodiments, the BMS may provide passive balancing of the respective cells.

Respective batteries of a particular battery system 130 may have structural configurations that are different from or the same as one another. For example, the battery system 130 may include a first battery and a second battery, with the structural configuration of the first battery being different from or the same as the structural configuration of the second battery. In various embodiments, a number of the packs of the first battery may be greater than, less than, or the same as a number of the packs of the second battery. In various embodiments, the types of connections (i.e., series or parallel) between the packs of the first battery may different from or the same as the types of connections between the packs of the second battery. In various embodiments, a number of the cells of the first battery may be greater than, less than, or the same as a number of the cells of the second battery. In various embodiments, the types of connections between the cells of the first battery may different from or the same as the types of connections between the cells of the second battery.

A particular battery system 130 may be a multiple chemistry battery system, such as a dual chemistry battery system, a triple chemistry battery system, a quadruple chemistry battery system, and the like. According to a dual chemistry configuration, the battery system 130 may include one or more first cells having a first chemistry and one or more second cells having a second chemistry different from the first chemistry. According to a triple multiple chemistry configuration, the battery system 130 may include one or more first cells having a first chemistry, one or more second cells having a second chemistry, and one or more third cells having a third chemistry, with the first chemistry, the second chemistry, and the third chemistry being different from one another. According to still other multiple chemistry configurations, the battery system 130 may include respective cells having four or more different battery chemistries. Various types of battery chemistries may be used in the cells of the battery system 130, including, but not limited to, lithium-ion (Li-ion), lithium-titanate (lithium titanium oxide) (LTO), nickel-metal hydride (NIMH), and nickel cadmium (NiCd).

In some embodiments, a particular battery system 130 may have a multiple chemistry configuration, including one or more first cells having a first chemistry and one or more second cells having a second chemistry different from the first chemistry. For example, one or more of cells of a first battery may have a first chemistry, and one or more of cells of a second battery may have a second chemistry different from the first chemistry. In some embodiments, all of the cells of the first battery may have the first chemistry, and all of the cells of the second battery may have the second chemistry. In other words, the first battery may rely solely on the first battery chemistry, and the second battery may rely solely on the second battery chemistry. In other embodiments, one or more of the cells of the first battery may have a first chemistry, one or more of the cells of the first battery may have a second chemistry different from the first chemistry, one or more of the cells of the second battery may have the second chemistry, and one or more of the cells of the second battery may have the first chemistry. In such embodiments, the battery chemistry distribution of the cells of the first battery may be different from or the same as the battery chemistry distribution of the cells of the second battery. In other words, the number of the cells of the first battery having the first chemistry may be different from or the same as the number of the cells of the second battery having the first chemistry, and the number of the cells of the first battery having the second chemistry may be different from or the same as the number of the cells of the second battery having the second chemistry. In still other embodiments, the respective cells of the first battery may have three or more different battery chemistries, and/or the respective cells of the second battery may have three or more different battery chemistries. In such embodiments, one or more, or all, of the respective battery chemistries used in the cells of the first battery may be different from one or more, or all, of the respective battery chemistries used in the cells of the second battery. In other words, one or more, or all, of the cells of the first battery may have a battery chemistry that that is not used in any of the cells of the second battery.

In some embodiments, a particular battery of a particular battery system 130 may have a multiple chemistry configuration, including one or more first cells having a first chemistry and one or more second cells having a second chemistry different from the first chemistry. In some embodiments, the first cells may be cells of a first pack of the battery, and the second cells may be cells of a second pack of the battery. In some embodiments, all of the cells of the first pack may have the first chemistry, and all of the cells of the second pack may have the second chemistry. In some embodiments, a particular pack of a battery of a particular battery system 130 may have a multiple chemistry configuration, including one or more first cells having a first chemistry and one or more second cells having a second chemistry different from the first chemistry. In some embodiments, the first cells may be cells of a first module of the pack, and the second cells may be cells of a second module of the pack. In some embodiments, all of the cells of the first module may have the first chemistry, and all of the cells of the second module may have the second chemistry. In some embodiments, a particular module of a pack of a battery of a particular battery system 130 may have a multiple chemistry configuration, including one or more first cells having a first chemistry and one or more second cells having a second chemistry different from the first chemistry. Various types of multiple chemistry configurations may be used for a particular battery system 130.

Different combinations of battery chemistries may be used within a particular battery system 130. In various embodiments, a particular battery system 130 having a multiple chemistry configuration may include one or more lithium-ion cells, one or more lithium-titanate cells, one or more nickel-metal hydride cells, and/or one or more nickel cadmium cells, in any combination of at least two of such battery chemistries. Still other types of battery chemistries may be used in combination with such battery chemistries and/or additional battery chemistries. As explained above, a first cell having a first chemistry and a second cell having a second chemistry different from the first chemistry may be included in different batteries of a particular battery system 130, the same battery of a particular battery system 130, different packs of a battery of a particular battery system 130, the same pack of a battery of a particular battery system 130, different modules of a pack of a battery of a particular battery system 130, or the same module of a pack of a battery of a particular battery system 130.

The controller(s) 170 may include any number of controllers configured to control operation of various systems, subsystems, devices, and/or components of the electric vehicle 100. In some embodiments, the controller(s) 170 may include one or more motor controller(s) electrically coupled to the drive motor(s) 120 and the battery system(s) 130 and configured to control delivery of electric current between the drive motor(s) 120 and the battery system(s) 130. In some embodiments, a single motor controller may be may be electrically coupled to the drive motor(s) 120 and the battery system(s) 130 and configured to control delivery of electric current between the drive motor(s) 120 and the battery system(s) 130. In this manner, the single motor controller may be configured to control delivery of electric current between multiple drive motors and one or a plurality of battery systems. In some embodiments, multiple motor controllers may be may be electrically coupled to the drive motor(s) 120 and the battery system(s) 130 and configured to control delivery of electric current between the drive motor(s) 120 and the battery system(s) 130. In some embodiments, a number of the motor controller(s) may correspond to a number of the drive motor(s) 120, with each motor controller being electrically coupled to a single drive motor. In some embodiments, a number of the motor controller(s) may correspond to a number of the batteries of a particular battery system, with each motor controller being electrically coupled to a single battery. In some embodiments, the motor controller(s) may include one or more inverter(s) configured to convert direct current into alternating current, or the motor controller(s) may be electrically coupled to and in operable communication with one or more inverter(s). The inverter(s) may be electrically coupled to the drive motor(s) 120 and one or more batteries of the battery system(s) 130 and configured to convert direct current delivered by the one or more batteries into alternating current for receipt by the drive motor(s) 120 in the drive mode of operation. In some embodiments, the motor controller(s) may include one or more rectifier(s) configured to convert alternating current into direct current, or the motor controller(s) may be electrically coupled to and in operable communication with one or more rectifier(s). The rectifier(s) may be electrically coupled to the drive motor(s) 120 and one or more batteries of the battery system(s) 130 and configured to convert alternating current delivered by drive motor(s) 120 into direct current for receipt by the one or more batteries in the regeneration mode of operation. In some embodiments, the controller(s) 170 may be configured to perform various other functions in addition to controlling delivery of electric current between the drive motor(s) 120 and the battery system(s) 130.

In some embodiments, the controller(s) 170 may include one or more switch controller(s) configured to change or adjust respective connections between respective batteries of a particular battery system, respective packs of a particular battery, or respective cells of a particular pack, as described further below. For example, the switch controller(s) may be configured to change or adjust one or more connections from series to parallel, from parallel to series, from series to disconnected, from disconnected to series, from parallel to disconnected, and/or from disconnected to parallel. In some embodiments, the switch controller(s) may include one or more switch(es), transistor(s), such as metal-oxide-semiconductor field-effect transistor(s) (MOSFETs), or solid state relay(s), or the switch controller(s) may be electrically coupled to and in operable communication with one or more switch(es), transistor(s), or solid state relay(s). The switch(es), transistor(s), or solid state relay(s) may be configured to transition between two or more states to form the respective connections between respective batteries of a particular battery system, respective packs of a particular battery, or respective cells of a particular pack.

In some embodiments, the controller(s) 170 may include one or more energy transfer controller(s) configured to control transfer of energy between respective batteries of a particular battery system. For example, the energy transfer controller(s) may be configured to control transfer of energy between a first battery and a second battery of a particular battery system. In some embodiments, the energy transfer controller(s) may include one or more DC-DC converter(s), or the energy transfer controller(s) may be electrically coupled to and in operable communication with one or more DC-DC converter(s). The DC-DC converter(s) may be configured to convert a source of direct current from a first voltage level, such as a voltage level suitable for a first battery, to a second voltage level, such as a voltage level suitable for a second battery. In some embodiments, the DC-DC converter(s) may include one or more unidirectional DC-DC converters. In some embodiments, the DC-DC converter(s) may include one or more bidirectional DC-DC converters.

In some embodiments, the controller(s) 170 may include an electronic control unit (ECU) or onboard vehicle computer of the electric vehicle 100, or the controller(s) 170 may be electrically coupled to and in operable communication with the ECU of the electric vehicle 100. The ECU may be configured to determine various vehicle information regarding operation of the electric vehicle 100 and to direct operation of various systems, subsystems, devices, and/or components of the vehicle 100. For example, the ECU may be configured to communicate with the aforementioned types of controllers and to cause such controllers to perform one or more of the functions mentioned above. In some embodiments, the controller(s) 170 may include one or more, or all, of the aforementioned types of controllers may be provided as discrete, separate controllers. In other words, one or more, or all, of the aforementioned functions performed by the controller(s) 170 may be performed by discrete, separate controllers. In other embodiments, all of the aforementioned types of controllers may be provided as a single controller. In other words, all of the aforementioned functions performed by the controller(s) 170 may be performed by a single controller. In still other embodiments, two or more of the aforementioned types of controllers may be provided as a single controller, and one or more of the aforementioned types of controllers may be provided as a discrete, separate controller. In other words, two or more of the aforementioned functions performed by the controller(s) 170 may be performed by a single controller, and one or more of the aforementioned functions performed by the controller(s) 170 may be performed by discrete, separate controllers. In some embodiments, the controller(s) 170 may not include all of the types of controllers mentioned above.

In other words, not all of the aforementioned functions may be performed by the controller(s) 170. Further, in some embodiments, the controller(s) 170 may include other types of controllers in addition to those mentioned above. In other words, the controller(s) 170 may perform other functions in addition those mentioned above.

In an illustrative configuration, the controller(s) 170 may include one or more processors (processor(s)), one or more memory devices (also referred to herein as memory), one or more input/output (I/O) interface(s), one or more network interface(s), one or more antenna(e), one or more transceiver(s), and/or data storage. The controller(s) 170 may further include one or more bus(es) that functionally couple various components of the controller(s) 170. These various components will be described in more detail hereinafter.

The bus(es) may include at least one of a system bus, a memory bus, an address bus, or a message bus, and may permit the exchange of information (e.g., data (including computer-executable code), signaling, etc.) between various components of the controller(s) 170. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory of the controller(s) 170 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage may include removable storage and/or non-removable storage including, but not limited to, magnetic storage, optical disk storage, and/or tape storage. The data storage may provide non-volatile storage of computer-executable instructions and other data. The memory and the data storage, removable and/or non-removable, are examples of computer-readable storage media (CRSM) as that term is used herein.

The data storage may store computer-executable code, instructions, or the like that may be loadable into the memory and executable by the processor(s) to cause the processor(s) to perform or initiate various operations described herein. The data storage may additionally store data that may be copied to the memory for use by the processor(s) during the execution of the computer-executable instructions. Moreover, output data generated as a result of execution of the computer-executable instructions by the processor(s) may be stored initially in the memory, and may ultimately be copied to data storage for non-volatile storage.

More specifically, the data storage may store one or more operating systems (O/S); one or more database management systems (DBMS); and one or more program module(s), applications, engines, computer-executable code, scripts, or the like such as, for example, one or more communication module(s) and/or one or more power management module(s). Some or all of these module(s) may be or include sub-module(s). Any of the components stored in data storage may include any combination of software, firmware, and/or hardware. The software and/or firmware may include computer-executable code, instructions, or the like that may be loaded into the memory for execution by one or more of the processor(s). Any of the components stored in data storage may support the functionality described in reference to the corresponding components named in this disclosure.

The data storage may further store various types of data utilized by the components of the controller(s) 170. Any data stored in the data storage may be loaded into the memory for use by the processor(s) in executing computer-executable code. In addition, any data stored in the data storage may potentially be stored in one or more datastore(s) and may be accessed via the DBMS and loaded in the memory for use by the processor(s) in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) may be configured to access the memory and execute computer-executable instructions loaded therein. For example, the processor(s) may be configured to execute computer-executable instructions of the various program module(s), applications, engines, or the like of the controller(s) 170 to cause or facilitate various operations to be performed in accordance with one or more embodiments of the disclosure. The processor(s) may include any suitable processing unit capable of accepting data as input, processing the input data in accordance with stored computer-executable instructions, and generating output data. The processor(s) may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) may be capable of supporting any of a variety of instruction sets. The controller(s) 170 may include computer-executable instructions, code, or the like that responsive to execution by one or more of the processor(s) may perform various functions including, but not limited to, all of the functions described herein, and the like.

In addition, various program module(s), script(s), plug-in(s), Application Programming Interface(s) (API(s)), or any other suitable computer-executable code hosted locally on the controller(s) 170, and/or hosted on other computing device(s) accessible via one or more networks, may be provided to support the functionality provided by the program module(s), applications, or computer-executable code described herein and/or additional or alternate functionality. Further, functionality may be modularized differently such that processing described as being supported collectively by the collection of program module(s) described herein may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) may be implemented, at least partially, in hardware and/or firmware.

It should further be appreciated that the controller(s) 170 may include alternate and/or additional hardware, software, or firmware components beyond those described or depicted without departing from the scope of the disclosure. More particularly, it should be appreciated that software, firmware, or hardware components described or depicted as forming part of the controller(s) 170 are merely illustrative and that some components may not be present or additional components may be provided in various embodiments. It should further be appreciated that each of the above-mentioned module(s), in various embodiments, may represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more described or depicted module(s) may not be present in certain embodiments, while in other embodiments, additional module(s) not described or depicted may be present and may support at least a portion of the described functionality and/or additional functionality. Moreover, while certain module(s) may be depicted or described as sub-module(s) of another module, in certain embodiments, such module(s) may be provided as independent module(s) or as sub-module(s) of other module(s).

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2A:
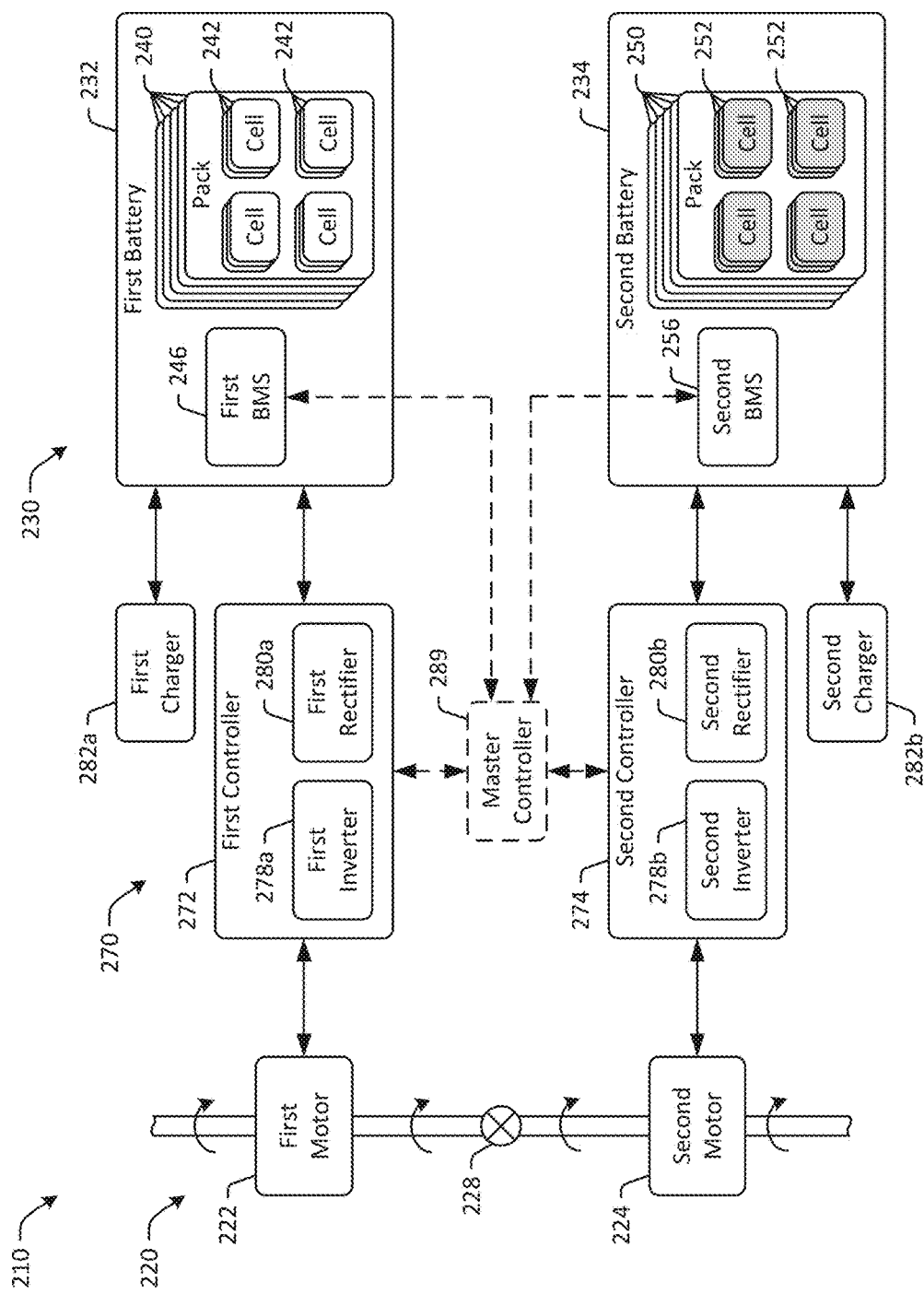
FIG. 2A schematically illustrates an example mechanically coupled electric drive system with a multiple chemistry battery system for electric vehicles in accordance with one or more embodiments of the disclosure.
Figure 2B:
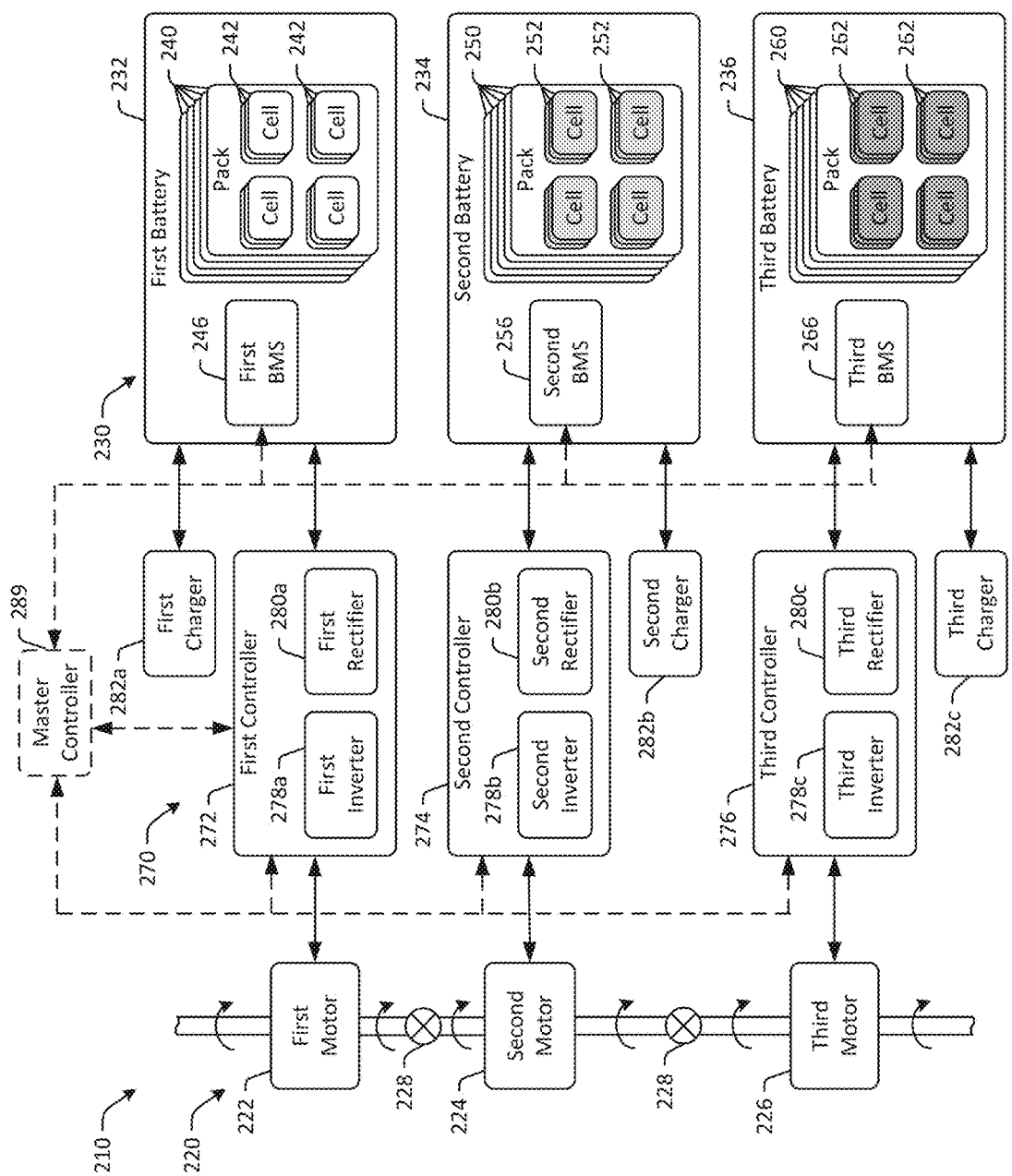
FIG. 2B schematically illustrates an example mechanically coupled electric drive system with a multiple chemistry battery system for electric vehicles in accordance with one or more embodiments of the disclosure.

FIGS. 2A and 2B schematically illustrate an electric drive system 210 in accordance with one or more embodiments of the disclosure. The electric drive system 210 may be used as a part of an electric vehicle, such as the electric vehicle 100 described above. The electric drive system 210 may be configured to propel the electric vehicle 100 during operation of the electric drive system 210. As shown, the electric drive system 210 may include one or more drive motor(s) 220, one or more battery system(s) 230, and one or more controller(s) 270. The drive motor(s) 220, the battery system(s) 230, and the controller(s) 270 of the electric drive system 210 generally may be configured in a manner similar to the corresponding components and systems of the electric drive system 110 described above, although particular aspects of the electric drive system 210 are described below. It will be appreciated that the drive motor(s) 220, the battery system(s) 230, and the controller(s) 270 may include other features and/or components in addition to those illustrated in FIG. 2A, such as any of those described above with respect to the electric drive system 110, where applicable. The embodiment of FIGS. 2A and/or 2B may represent mechanically coupled power transfer and/or balancing.

As shown, the drive motor(s) 220 may include a first drive motor 222 and a second drive motor 224. The first drive motor 222 and the second drive motor 224 may be configured to impart motion to one or more of the wheel(s) 102 of the electric vehicle 100. The battery system(s) 230 may be or may include a multiple chemistry battery system, such as a dual chemistry battery system, that includes a plurality of batteries configured to power the first drive motor 222 and the second drive motor 224. The plurality of batteries may include a first battery 232 and a second battery 234. The controller(s) 270 may include a first motor controller 272 and a second motor controller 274 configured to control delivery of electric current between the drive motors 222, 224 and the batteries 232, 234. An optional master controller 289 may be electrically coupled to one or more of the first controller 272, the second controller 274, the first BMS 246, and/or the second BMS 256.

The first drive motor 222 may be an AC motor, and the second drive motor 224 may be an AC motor. For example, the drive motors 222, 224 may be asynchronous electric motors or synchronous electric motors. As shown, the first drive motor 222 and the second drive motor 224 may be mechanically coupled to one another by a mechanical coupling 228. The mechanical coupling 228 may be configured such that rotation of an output shaft of the first drive motor 222 causes rotation of an output shaft of the second drive motor 224, and/or such that rotation of the output shaft of the second drive motor 224 causes rotation of the output shaft of the first drive motor 222. In some embodiments, the mechanical coupling 228 may cause the respective output shafts of the drive motors 222, 224 to rotate at the same rate. In other embodiments, the mechanical coupling 228 may allow or cause the respective output shafts of the drive motors 222, 224 to rotate at different rates. The drive motors 222, 224 may be mechanically coupled to one or more of the wheel(s) 102. In a drive mode of operation, one or both of the drive motors 222, 224 may operate as a motor, receiving electric current from one or both of the batteries 232, 234 and producing torque that is transferred to the wheel(s) 102 and causes the wheel(s) 102 to rotate, thereby causing the electric vehicle 100 to move. In a regeneration mode of operation, one or both of the drive motors 222, 224 may operate as a generator, being driven by the wheel(s) 102 and producing electric current that is delivered to one or both of the batteries 232, 234, thereby charging one or both of the batteries 232, 234. In some instances, the drive motors 222, 224 simultaneously may operate as motors, producing torque for rotating the wheel(s) 102. In some instances, the drive motors 222, 224 simultaneously may operate as generators, producing electric current for charging one or both of the batteries 232, 234. In some instances, one of the drive motors 222, 224 may operate as a motor while the other of the drive motors 222, 224 operates as a generator. At a particular time during operation of the electric drive system 210, one or both of the drive motors 222, 224 may operate as a motor or a generator based at least in part on a required torque to be produced by the drive motors 222, 224 and/or a charge level of one of the batteries 232, 234 at that time.

In some embodiments, as shown in FIG. 2B, the drive motor(s) 220 also may include a third drive motor 226, the plurality of batteries of the battery system(s) 230 also may include a third battery 236, and the controller(s) 270 also may include a third motor controller 276. According to various embodiments, the drive motor(s) 220 may include more than three drive motors, the plurality of batteries of the battery system(s) 230 may include more than three batteries, and the controller(s) 270 may include more than three motor controllers. The third drive motor 228 may be an AC motor, such as an asynchronous electric motor or a synchronous electric motor. As shown, the third drive motor 228 and the second drive motor 224 may be mechanically coupled to one another by a mechanical coupling 226 such that rotation of an output shaft of the third drive motor 228 may cause rotation of the output shaft of the second drive motor 224, and/or such that rotation of the output shaft of the second drive motor 224 may cause rotation of the output shaft of the third drive motor 228. Similar to the drive motors 222, 224, the third drive motor 228 may operate as a motor in some instances and as a generator in other instances. In some instances, the drive motors 222, 224, 226 simultaneously may operate as motors, producing torque for rotating the wheel(s) 102. In some instances, the drive motors 222, 224, 226 simultaneously may operate as generators, producing electric current for charging one or more, or all, of the batteries 232, 234, 236. In some instances, one or two of the drive motors 222, 224, 226 may operate as a motor while the remainder of the drive motors 222, 224, 226 operate(s) as a generator. At a particular time during operation of the electric drive system 210, one or more, or all, of the drive motors 222, 224, 226 may operate as a motor or a generator based at least in part on a required torque to be produced by the drive motors 222, 224, 226 and/or a charge level of one of the batteries 232, 234, 236 at that time. In FIG. 2B, an optional master controller 289 may be electrically coupled to one or more of the first controller 272, the second controller 274, the third controller 276, the first BMS 246, the second BMS 256, and/or the third BMS 266.

The batteries 232, 234, 236 may be configured to store energy and to power the drive motors 222, 224, 226. In other words, in the drive mode of operation, the batteries 232, 234, 236 may be configured to deliver electric current to the drive motors 222, 224, 226. As shown, the first battery 232 may power the first drive motor 222, the second battery 234 may power the second drive motor 224, and the third battery 236 may power the third drive motor 226. The batteries 232, 234, 236 also may be configured to be charged by the drive motors 222, 224, 226. In other words, in the regeneration mode of operation, the batteries 232, 234, 236 may be configured to receive electric current from the drive motors 222, 224, 226. As shown, the first battery 232 may be charged by the first drive motor 222, the second battery 234 may be charged by the second drive motor 224, and the third battery 236 may be charged by the third drive motor 226.

Each of the batteries 232, 234, 236 may include one or more pack(s) each including one or more cell(s). As shown, the first battery 232 may include a plurality of packs 240, and each of the packs 240 may include a plurality of cells 242. Likewise, the second battery 234 may include a plurality of packs 250, and each of the packs 250 may include a plurality of cells 252. Further, the third battery 236 may include a plurality of packs 260, and each of the packs 260 may include a plurality of cells 262.

Figure 2C:
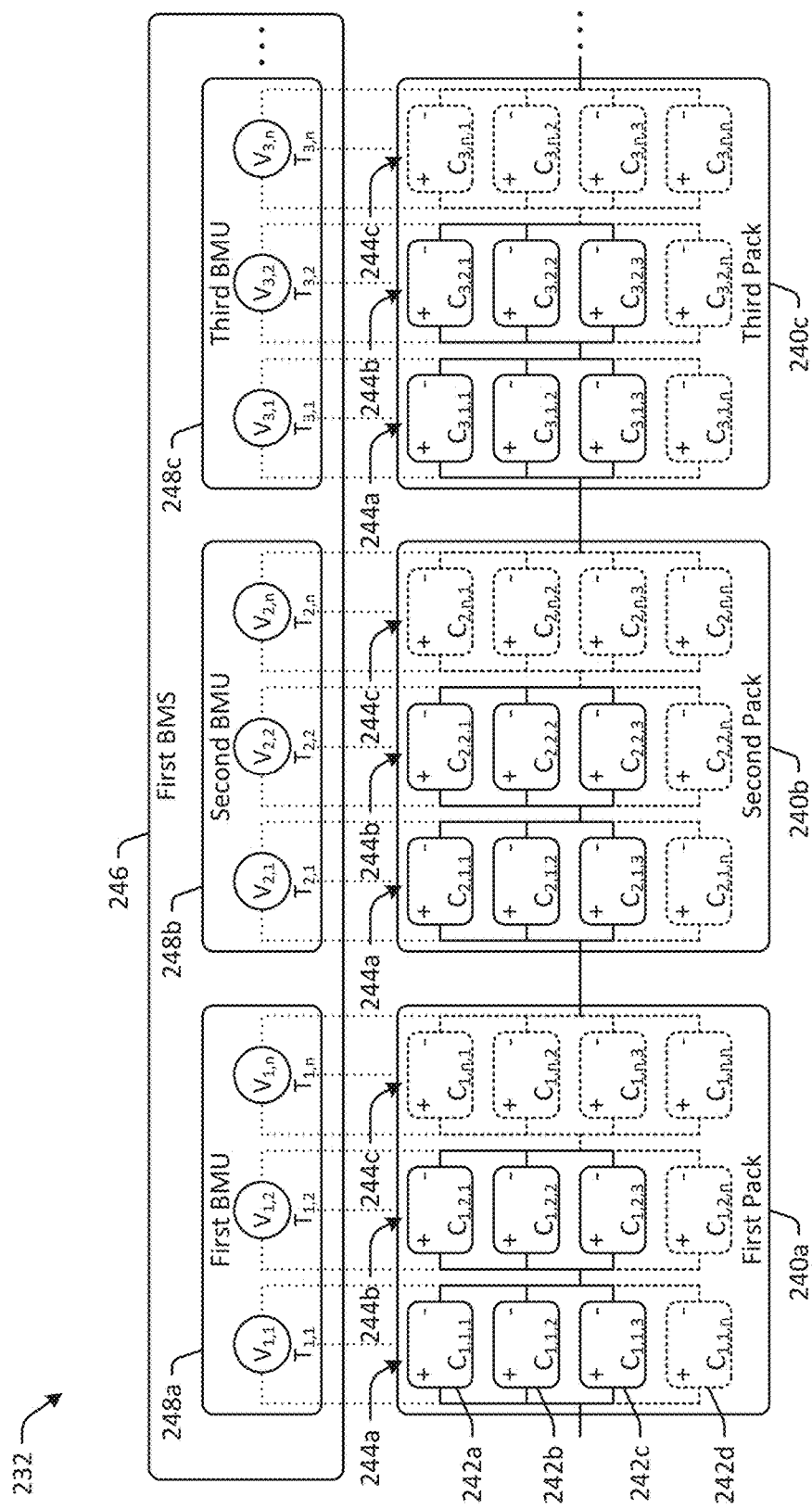
FIG. 2C schematically illustrates an example first battery for multiple chemistry battery systems for electric vehicles in accordance with one or more embodiments of the disclosure.

As shown in FIG. 2C, the first battery 232 may include a first pack 240a, a second pack 240b, and a third pack 240c electrically coupled to one another. The first battery 232 also may include one or more other packs 240 in addition to the packs 240a, 240b, 240c depicted in FIG. 2C. The first battery 232 may include any number of packs 240 electrically coupled to one another. In some embodiments, as shown, all of the packs 240 may be connected in series. In other embodiments, all of the packs 240 may be connected in parallel. In still other embodiments, the packs 240 may be connected by a combination of series connections and parallel connections. In some embodiments, as shown, the respective connections between the packs 240 may be fixed. In other embodiments, one or more, or all, of the respective connections between the packs 240 may be adjustable or switchable. Within each of the packs 240, the cells 242 may be arranged in a plurality of modules 244 each including a plurality of the cells 242. As shown, each of the packs 240 may include a first module 244a, a second module 244b, and one or more additional modules 244c. Each of the packs 240 may include any number of modules 244 electrically coupled to one another. In some embodiments, as shown, all of the modules 244 of a particular pack 240 may be connected in series. In other embodiments, all of the modules 244 of a particular pack 240 may be connected in parallel. In still other embodiments, the modules 244 of a particular pack 240 may be connected by a combination of series connections and parallel connections. In some embodiments, as shown, the respective connections between the modules 244 may be fixed. In other embodiments, one or more, or all, of the respective connections between the modules 244 may be adjustable or switchable. As shown, each of the modules 244 may include a first cell 242a, a second cell 242b, a third cell 242c, and one or more additional cells 242d. Each of the modules 244 may include any number of cells 242 electrically coupled to one another. In some embodiments, as shown, all of the cells 242 of a particular module 244 may be connected in parallel. In other embodiments, all of the cells 242 of a particular module 244 may be connected in series. In still other embodiments, the cells 242 of a particular module 244 may be connected by a combination of series connections and parallel connections. In some embodiments, as shown, the respective connections between the cells 242 may be fixed. In other embodiments, one or more, or all, of the respective connections between the cells 242 may be adjustable or switchable. In FIG. 2C, the cells 242 are labeled using the nomenclature "$C_{[a],[b],[c]}$" in which value [a] indicates the pack 240 in which the cell 242 is positioned, value [b] indicates the module 244 in which the cell 242 is positioned, and value [c] indicates the position of the cell 242 within the module 244. This nomenclature for labeling cells is used similarly in FIGS. 2D, 8B-8D, and 9B-9D. In FIG. 2C, a top level battery management system may be included for top level control, and one or more battery management units may be included for pack level control, where independent battery management units may provide individual pack or group control. In some embodiments, the battery management system may wholly control packs or groups.

The first battery 232 also may include a first battery management system (BMS) 246 electrically coupled to the cells 242 and configured to perform various battery management functions, as described above. The first BMS 246 may include one or more battery management unit(s) (BMU) 248 each including a controller to perform the battery management functions for respective cells 242 of the first battery 232 using one or more processor(s) of the controller. As shown, the first BMS 246 may include a plurality of BMUs 248. In some embodiments, as shown, the first BMS 246 may have a modular configuration, with the number of BMUs 248 corresponding to the number of packs 240 of the first battery 232. In this manner, the first BMS 246 may include a first BMU 248a electrically coupled to the cells 242 of the first pack 240a, a second BMU 248b electrically coupled to the cells 242 of the second pack 240b, a third BMU 248c electrically coupled to the cells 242 of the third pack 240c, and so forth. In other embodiments, the first BMS 246 may have a centralized configuration or a distributed configuration. The first BMS 246 may be configured to perform battery management functions, including one or more, or all, of the monitoring functions, energy recovery functions, computation functions, communication functions, connection functions, and optimization functions described above. In some embodiments, the first BMS 246 may be configured to perform battery balancing with respect to state of charge, voltage, current.

Figure 2D:
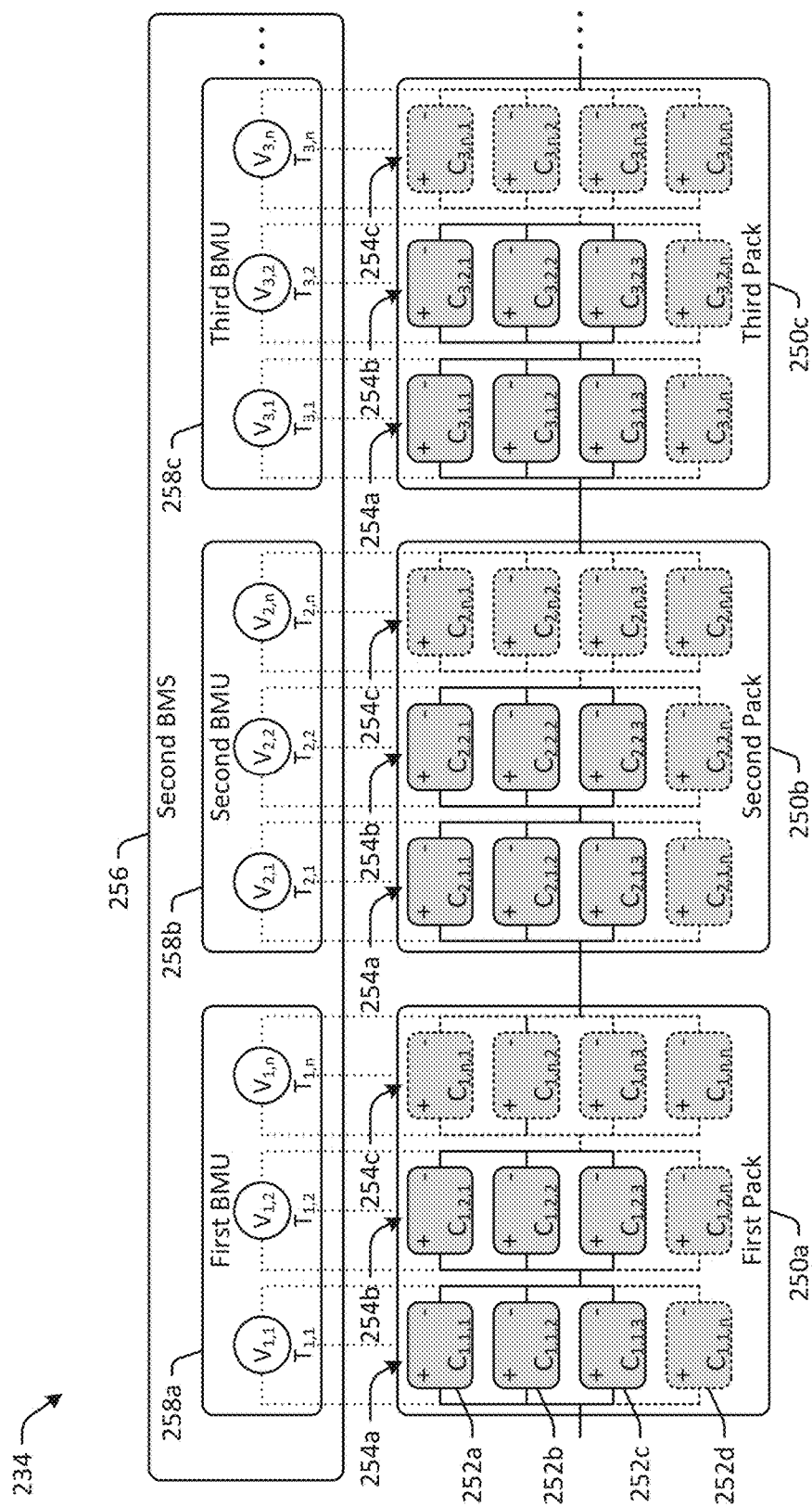
FIG. 2D schematically illustrates an example second battery for multiple chemistry battery systems for electric vehicles in accordance with one or more embodiments of the disclosure.

In a similar manner, as shown in FIG. 2D, the second battery 234 may include a first pack 250a, a second pack 250b, and a third pack 250c electrically coupled to one another. The second battery 234 also may include one or more other packs 250 in addition to the packs 250a, 250b, 250c depicted in FIG. 2D. The second battery 234 may include any number of packs 250 electrically coupled to one another. In some embodiments, as shown, all of the packs 250 may be connected in series. In other embodiments, all of the packs 250 may be connected in parallel. In still other embodiments, the packs 250 may be connected by a combination of series connections and parallel connections. In some embodiments, as shown, the respective connections between the packs 250 may be fixed. In other embodiments, one or more, or all, of the respective connections between the packs 250 may be adjustable or switchable. Within each of the packs 250, the cells 252 may be arranged in a plurality of modules 254 each including a plurality of the cells 252. As shown, each of the packs 250 may include a first module 254a, a second module 254b, and one or more additional modules 254c. Each of the packs 250 may include any number of modules 254 electrically coupled to one another. In some embodiments, as shown, all of the modules 254 of a particular pack 250 may be connected in series. In other embodiments, all of the modules 254 of a particular pack 250 may be connected in parallel. In still other embodiments, the modules 254 of a particular pack 250 may be connected by a combination of series connections and parallel connections. In some embodiments, as shown, the respective connections between the modules 254 may be fixed. In other embodiments, one or more, or all, of the respective connections between the modules 254 may be adjustable or switchable. As shown, each of the modules 254 may include a first cell 252a, a second cell 252b, a third cell 252c, and one or more additional cells 252d. Each of the modules 254 may include any number of cells 252 electrically coupled to one another. In some embodiments, as shown, all of the cells 252 of a particular module 254 may be connected in parallel. In other embodiments, all of the cells 252 of a particular module 254 may be connected in series. In still other embodiments, the cells 252 of a particular module 254 may be connected by a combination of series connections and parallel connections. In some embodiments, as shown, the respective connections between the cells 252 may be fixed. In other embodiments, one or more, or all, of the respective connections between the cells 252 may be adjustable or switchable.

The second battery 234 also may include a second battery management system (BMS) 256 electrically coupled to the cells 252 and configured to perform various battery management functions, as described above. The second BMS 256 may include one or more battery management unit(s) (BMU) 258 each including a controller to perform the battery management functions for respective cells 252 of the second battery 234 using one or more processor(s) of the controller. As shown, the second BMS 256 may include a plurality of BMUs 258. In some embodiments, as shown, the second BMS 256 may have a modular configuration, with the number of BMUs 258 corresponding to the number of packs 250 of the second battery 234. In this manner, the second BMS 256 may include a first BMU 258a electrically coupled to the cells 252 of the first pack 250a, a second BMU 258b electrically coupled to the cells 252 of the second pack 250b, a third BMU 258c electrically coupled to the cells 252 of the third pack 250c, and so forth. In other embodiments, the second BMS 256 may have a centralized configuration or a distributed configuration. The second BMS 256 may be configured to perform battery management functions, including one or more, or all, of the monitoring functions, energy recovery functions, computation functions, communication functions, connection functions, and optimization functions described above. In some embodiments, the second BMS 256 may be configured to perform battery balancing with respect to state of charge, voltage, current.

The third battery 236 may be configured in a manner similar to that of the first battery 232 and the second battery 234. The third battery 236 may include any number of the packs 260 electrically coupled to one another by series connections, parallel connections, or a combination of series connections and parallel connections. In various embodiments, the respective connections between the packs 260 may be fixed or may be adjustable or switchable. Within each of the packs 260, the cells 262 may be arranged in a plurality of modules each including a plurality of the cells 262. The modules of a particular pack 260 may be electrically coupled to one another by series connections, parallel connections, or a combination of series connections and parallel connections. In various embodiments, the respective connections between the modules of a particular pack 260 may be fixed or may be adjustable or switchable. Each of the modules may include any number of the cells 262 electrically coupled to one another. The cells 262 of a particular module may be electrically coupled to one another by series connections, parallel connections, or a combination of series connections and parallel connections. In various embodiments, the respective connections between the cells 262 of a particular module may be fixed or may be adjustable or switchable.

The third battery 236 also may include a third battery management system (BMS) 266 electrically coupled to the cells 262 and configured to perform various battery management functions, as described above. The third BMS 266 may include one or more battery management unit(s)

(BMU) each including a controller to perform the battery management functions for respective cells 262 of the third battery 236 using one or more processor(s) of the controller. In various embodiments, the third BMS 266 may have a modular configuration, a centralized configuration, or a distributed configuration. The third BMS 266 may be configured to perform battery management functions, including one or more, or all, of the monitoring functions, energy recovery functions, computation functions, communication functions, connection functions, and optimization functions described above. In some embodiments, the third BMS 266 may be configured to perform battery balancing with respect to state of charge, voltage, current.

The structural configuration of the first battery 232 may be different from or the same as the structural configuration of the second battery 234. In various embodiments, a number of the packs 240 of the first battery 232 may be greater than, less than, or the same as a number of the packs 250 of the second battery 234. In various embodiments, the types of connections (i.e., series or parallel) between the packs 240 of the first battery 232 may be different from or the same as the types of connections between the packs 250 of the second battery 234. In various embodiments, a number of the cells 242 of the first battery 232 may be greater than, less than, or the same as a number of the cells 252 of the second battery 234. In various embodiments, the types of connections between the cells 242 of the first battery 232 may be different from or the same as the types of connections between the cells 252 of the second battery 234. In a similar manner, the structural configuration of the third battery 236 may be different from or the same as the structural configuration of the first battery 232 and/or the structural configuration of the second battery 234.

As explained above, the battery system 230 may be a multiple chemistry battery system, such as a dual chemistry battery system, a triple chemistry battery system, or a quadruple chemistry battery system. According to a dual chemistry configuration, the battery system 230 may include one or more first cells having a first chemistry and one or more second cells having a second chemistry different from the first chemistry. According to a triple chemistry configuration, the battery system 230 may include one or more first cells having a first chemistry, one or more second cells having a second chemistry, and one or more third cells having a third chemistry, with the first chemistry, the second chemistry, and the third chemistry being different from one another. According to still other multiple chemistry configurations, the battery system 230 may include respective cells having four or more different battery chemistries. Throughout the figures, differences in battery chemistry of respective cells are indicated by different degrees of background shading of the depicted cells. In this manner, a cell having a white background has a different battery chemistry as compared to another cell having a light-shaded background. Further, a cell having a dark-shaded background has a different battery chemistry as compared to another cell having a white background or a light-shaded background. Various types of battery chemistries may be used in the cells of the battery system 230, including, but not limited to, lithium-ion (Li-ion), lithium-titanate (lithium titanium oxide) (LTO), nickel-metal hydride (NIMH), and nickel cadmium (NiCd).

As shown in FIG. 2A, the battery system 230 may have a dual chemistry configuration, including one or more first cells having a first chemistry and one or more second cells having a second chemistry different from the first chemistry. For example, one or more of the cells 242 of the first battery 232 may have a first chemistry, and one or more of the cells 252 of the second battery 234 may have a second chemistry different from the first chemistry. In some embodiments, as shown, all of the cells 242 of the first battery 232 may have the first chemistry, and all of the cells 252 of the second battery 234 may have the second chemistry. In other words, the first battery 232 may rely solely on the first battery chemistry, and the second battery 234 may rely solely on the second battery chemistry. In other embodiments, one or more of the cells 242 of the first battery 232 may have a first chemistry, one or more of the cells 242 of the first battery 232 may have a second chemistry different from the first chemistry, one or more of the cells 252 of the second battery 234 may have the second chemistry, and one or more of the cells 252 of the second battery 234 may have the first chemistry. In such embodiments, the battery chemistry distribution of the cells 242 of the first battery 232 may be different from or the same as the battery chemistry distribution of the cells 252 of the second battery 234. In other words, the number of the cells 242 having the first chemistry may be different from or the same as the number of the cells 252 having the first chemistry, and the number of the cells 242 having the second chemistry may be different from or the same as the number of the cells 252 having the second chemistry. In still other embodiments, the respective cells 242 of the first battery 232 may have three or more different battery chemistries, and/or the respective cells 252 of the second battery 234 may have three or more different battery chemistries. In such embodiments, one or more, or all, of the respective battery chemistries used in the cells 242 of the first battery 232 may be different from one or more, or all, of the respective battery chemistries used in the cells 252 of the second battery 234. In other words, one or more, or all, of the cells 242 of the first battery 232 may have a battery chemistry that that is not used in any of the cells 252 of the second battery 234.

Different combinations of battery chemistries may be used within the battery system 230. In various embodiments, the battery system 230 may have a multiple chemistry configuration that includes one or more lithium-ion cells, one or more lithium-titanate cells, one or more nickel-metal hydride cells, and/or one or more nickel cadmium cells, in any combination of at least two of such battery chemistries. Still other types of battery chemistries may be used in combination with such battery chemistries and/or additional battery chemistries. In some embodiments, one or more, or all, of the cells 242 of the first battery 232 may be lithium-ion cells, and one or more, or all, of the cells 252 of the second battery 234 may be lithium-titanate cells.

Figure 2E:
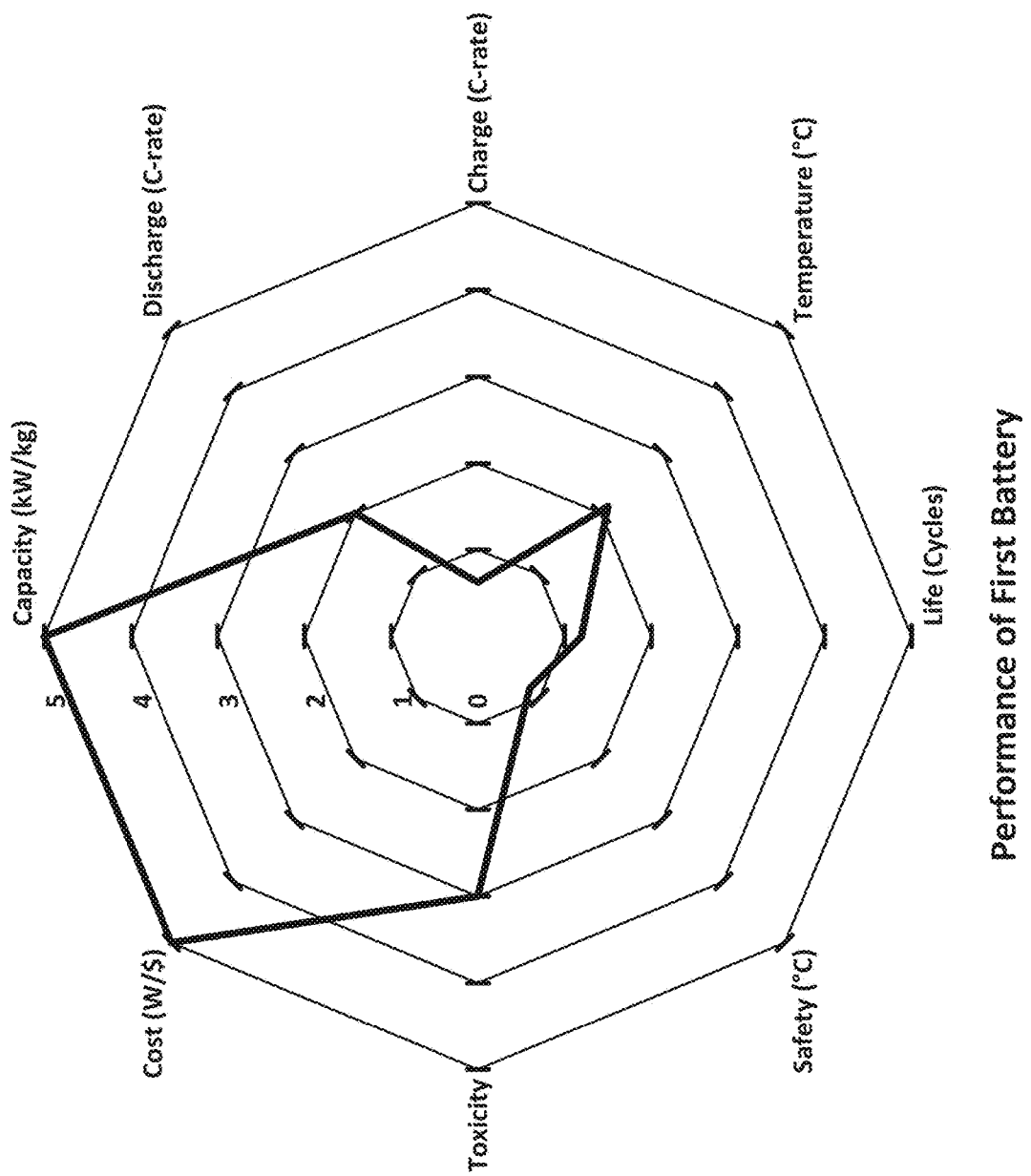
FIG. 2E is an example performance characteristic diagram for a first battery of a dual chemistry battery system for electric vehicles in accordance with one or more embodiments of the disclosure.
Figure 2F:
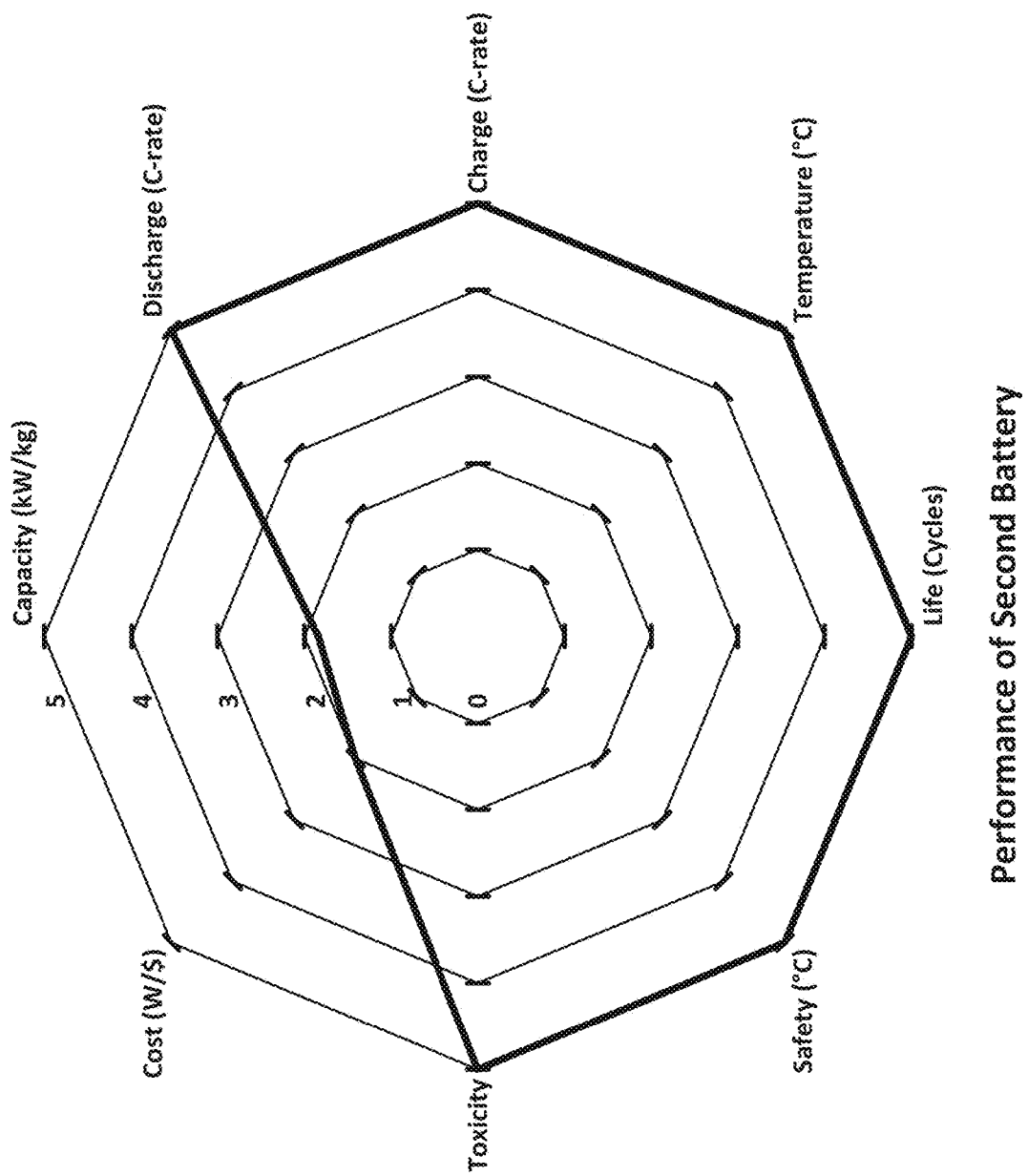
FIG. 2F is an example performance characteristic diagram for a second battery of a dual chemistry battery system for electric vehicles in accordance with one or more embodiments of the disclosure.
Figure 2G:
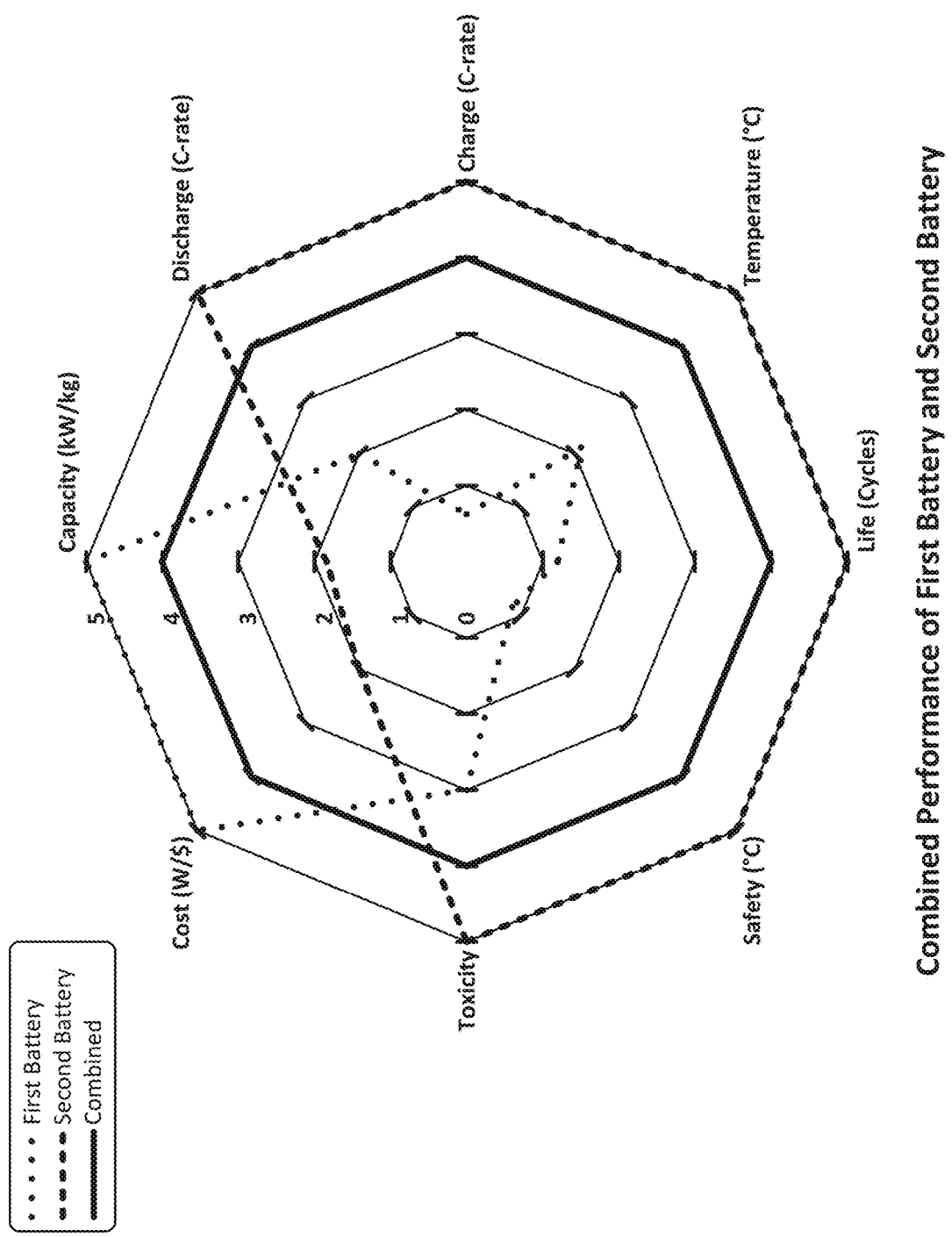
FIG. 2G is an example combined performance characteristic diagram for a dual chemistry battery system for electric vehicles in accordance with one or more embodiments of the disclosure.

FIGS. 2E-2G illustrate example performance characteristics for the first battery 232, the second battery 234, and the overall battery system 230 in accordance with one or more embodiments of the disclosure. In some embodiments, all of the cells 242 of the first battery 232 may have a first chemistry, and all of the cells 252 of the second battery 234 may have a second chemistry different from the first chemistry. For example, all of the cells 242 may be lithium-ion cells, and all of the cells 252 may be lithium-titanate cells. FIG. 2E depicts the performance of the first battery 232 with respect to the characteristics of capacity, discharge rate, charge rate, operating temperature, life, safety, toxicity, and cost. FIG. 2F depicts the performance of the second battery 234 with respect to the same characteristics. As shown, the first battery 232 and the second battery 234 may perform differently with respect to the respective performance characteristics. For example, the first battery 232 may have a relatively high capacity, while the second battery 234 may have a relatively low capacity. Further, the first battery 232 may have a relatively low discharge rate and a relatively low charge rate, while the second battery 234 may have a relatively high discharge rate and a relatively high charge rate. In this manner, the first battery 232 may be an energy-dense battery, and the second battery 234 may be a power-dense battery. Further, the cells 242 may be energy-dense cells, and the cells 252 may be power-dense cells. In some embodiments, the first battery 232 may have a first energy density, the second battery 234 may have a second energy density that is less than the first energy density, the first battery 232 may have a first power density, and the second battery 234 may have a second power density that is greater than the first power density. Similarly, each of the cells 242 may have a first energy density, each of the cells 252 may have a second energy density that is less than the first energy density, each of the cells 242 may have a first power density, and each of the cells 252 may have a second power density that is greater than the first power density. For example, all of the cells 242 may be lithium-ion cells, and all of the cells 252 may be lithium-titanate cells. FIG. 2E depicts the combined performance of the battery system 230, including the first battery 232 and the second battery 234, with respect to the characteristics of capacity, discharge rate, charge rate, operating temperature, life, safety, toxicity, and cost. As a result of the combined use of the cells 242 having the first chemistry and the cells 252 having the different second chemistry, the battery system 230 may provide improved performance with respect to one or more of the performance characteristics as compared to use of only the first chemistry or the second chemistry. For example, the battery system 230 may provide a combination of the benefits of energy-dense cells, such as lithium-ion cells, and power-dense cells, such as lithium-titanate cells. It will be appreciated that FIGS. 2E-2G illustrate merely one example of how the multiple chemistry configuration of the battery system 230 may perform due to the combined use of multiple battery chemistries, and that other multiple chemistry configurations may provide similar benefits.

Returning to FIGS. 2A and 2B, the controller(s) 270 may include the first motor controller 272, the second motor controller 274, and the third motor controller 276 for controlling delivery of electric current between the drive motors 222, 224, 226 and the batteries 232, 234, 236. In some embodiments, the controller(s) 270 also may include one or more of the additional types of controllers described above and/or additional controllers. The motor controllers 272, 274, 276 may be electrically coupled to the drive motors 222, 224, 226 and the batteries 232, 234, 236 and configured to control delivery of electric current between the drive motors 222, 224, 226 and the batteries 232, 234, 236. As shown, the first motor controller 272 may be electrically coupled to the first drive motor 222 and the first battery 232, the second motor controller 274 may be electrically coupled to the second drive motor 224 and the second battery 234, and the third motor controller 276 may be electrically coupled to the third drive motor 226 and the third battery 236. In this manner, the first motor controller 272 may control delivery of electric current between the first drive motor 222 and the first battery 232, the second motor controller 274 may control delivery of electric current between the second drive motor 224 and the second battery 234, and the third motor controller 276 may control delivery of electric current between the third drive motor 226 and the third battery 236.

In some embodiments, as shown, each of the motor controllers 272, 274, 276 may include, or may be electrically coupled to and in operable communication with, an inverter 278 configured to convert direct current into alternating current in the drive mode of operation. In this manner, a first inverter 278a associated with the first motor controller 272 may be configured to convert direct current delivered by the first battery 232 into alternating current for receipt by the first drive motor 222. Likewise, a second inverter 278b associated with the second motor controller 274 may be configured to convert direct current delivered by the second battery 234 into alternating current for receipt by the second drive motor 224. Further, a third inverter 278c associated with the third motor controller 276 may be configured to convert direct current delivered by the third battery 236 into alternating current for receipt by the third drive motor 226. In some embodiments, as shown, each of the motor controllers 272, 274, 276 may include, or may be electrically coupled to and in operable communication with, a rectifier configured to convert alternating current into direct current in the regeneration mode of operation. In this manner, a first rectifier 280a associated with the first motor controller 272 may be configured to convert alternating current delivered by first drive motor 222 into direct current for receipt by the first battery 232. Likewise, a second rectifier 280b associated with the second motor controller 274 may be configured to convert alternating current delivered by second drive motor 224 into direct current for receipt by the second battery 234. Further, a third rectifier 280c associated with the third motor controller 276 may be configured to convert alternating current delivered by third drive motor 226 into direct current for receipt by the third battery 236. In some embodiments, as shown, the motor controllers 272, 274, 276 may be provided as discrete, separate controllers. In other embodiments, the first motor controller 272 and the second motor controller 274 or all of the motor controllers 272, 274, 276 may be provided as a single controller.

The electric drive system 210 further may include one or more charger(s) 280 configured to facilitate charging of the battery system 230 when the electric vehicle is stopped and not in operation. For example, the charger(s) 280 may be temporarily connected to an external power source that provides electric current for charging the battery system 230. In some embodiments, as shown, a separate charger 280 may be provided for each of the batteries 232, 234, 236. In this manner, a first charger 280a may be electrically coupled to the first battery 232, a second charger 280b may be electrically coupled to the second battery 234, and a third charger 280c may be electrically coupled to the third battery 236. Each of the chargers 280a, 280b, 280c may be specifically configured for charging the respective battery 232, 234, 236 associated therewith. In other embodiments, the electric drive system 210 may include a single charger 280 configured to facilitate charging of all of the respective batteries 232, 234, 236. In various embodiments, the charger(s) 280 may be AC chargers or DC chargers.

Figure 2H:
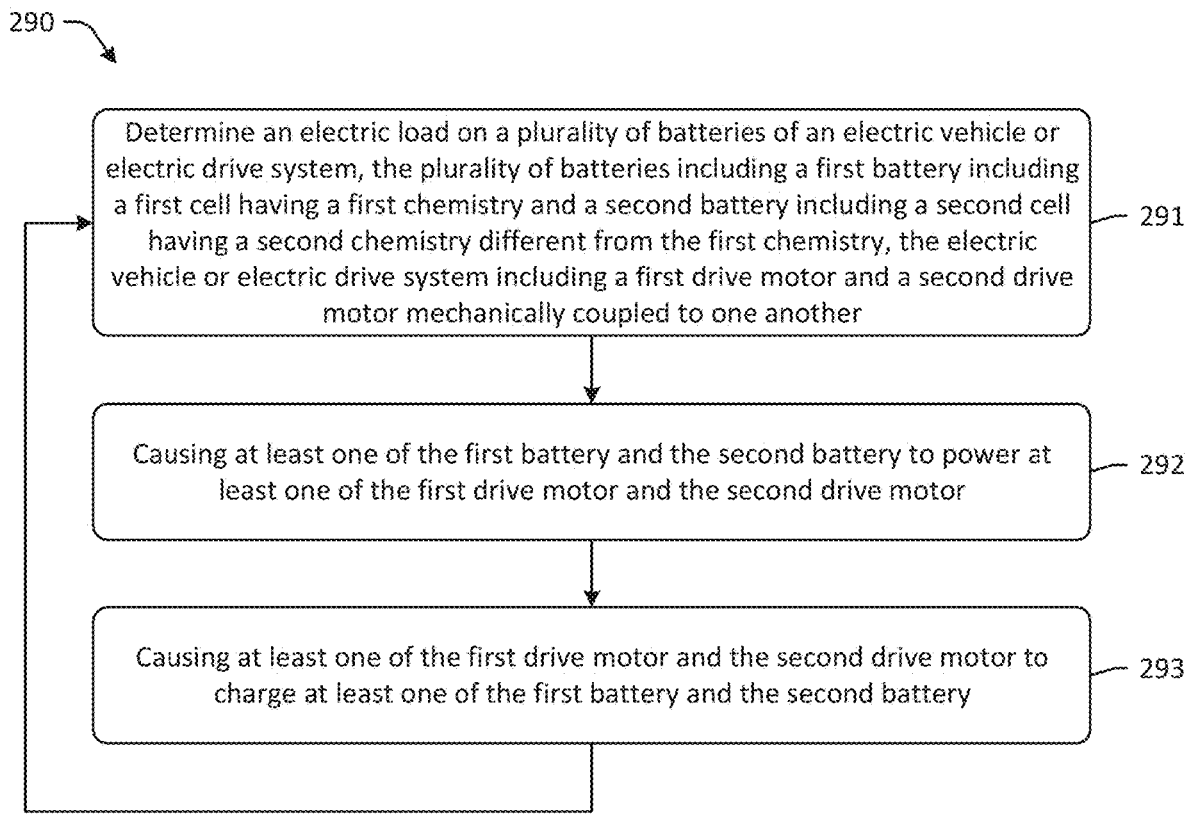
FIG. 2H is an example process flow for using a multiple chemistry battery system to power an electric vehicle in accordance with one or more embodiments of the disclosure.

FIG. 2H is an example process flow 290 for using a multiple chemistry battery system to power an electric vehicle in accordance with one or more embodiments of the disclosure. Although certain operations are illustrated as occurring separately in FIG. 2H, some or all of the operations may occur concurrently or partially concurrently. In some embodiments, the operations of the process flow 290 may be executed by one or more processor(s) of the electric drive system 210, such as processor(s) of the controller(s) 270 and/or the battery system(s) 230.

At block 291 of the process flow 290, an electric load on a plurality of batteries of an electric vehicle or electric drive system may be determined. For example, computer-executable instructions of a controller or processor of an electric drive system may be executed to determine an electric load on a plurality of batteries of the electric vehicle. The electric load may be an amount of power output or electric current flowing from the batteries and/or an amount of electric current requested and/or required to operate the electric vehicle under current operating conditions. For example, using an air conditioner system of the electric vehicle may increase the electric load on the batteries, as may heavy acceleration. In contrast, relatively slow acceleration or driving on a downhill surface may reduce an electric load on the batteries. The plurality of batteries may include a first battery and a second battery. The first battery may include a first cell having a first chemistry, and the second battery may include a second cell having a second chemistry different from the first chemistry. The electric vehicle or electric drive system may include a first drive motor and a second drive motor mechanically coupled to one another.

At block 292 of the process flow 290, at least one of the first battery and the second battery may be caused to power at least one of the first drive motor and the second drive motor. For example, computer-executable instructions of a controller or processor of the electric drive system may be executed to cause at least one of the first battery and the second battery to power at least one of the first drive motor and the second drive motor. In some instances, the at least one of the first battery and the second battery may be caused to power the at least one of the first drive motor and the second drive motor based at least in part on the determined electric load. In some instances, the first battery may be caused to power the first drive motor. In some instances, the second battery may be caused to power the second drive motor. In some instances, the first battery may be caused to power the first drive motor, and the second battery may be caused to power the second drive motor. In other words, the first battery may power the first drive motor while the second battery powers the second drive motor. Some embodiments may include one or more computer processors configured to implement one or more algorithms to (i) independently assess current state of charge of the first and second packs, (ii) evaluate application and/or drive motor demanded load, (iii) determine optimal efficiency, life, safety, power, temp, etc.) power balance between batteries to meet drive demand and achieve energy balance, and/or (iv) command first and second controllers to execute optimal power balance for first and second batteries.

At block 293 of the process flow 290, at least one of the first drive motor and the second drive motor may be caused to charge at least one of the first battery and the second battery. For example, computer-executable instructions of a controller or processor of the electric drive system may be executed to cause at least one of the first drive motor and the second drive motor to charge at least one of the first battery and the second battery. In some instances, the at least one of the first drive motor and the second drive motor may be caused to charge at least one of the first battery and the second battery based at least in part on the determined electric load. In some instances, the at least one of the first drive motor and the second drive motor may be caused to charge at least one of the first battery and the second battery based at least in part on a charge level of the first battery and/or a charge level of the second battery. In some instances, the at least one of the first drive motor and the second drive motor may be caused to charge at least one of the first battery and the second battery based at least in part on a mechanical coupling between the first drive motor and the second drive motor. In some instances, the first drive motor may be caused to charge the first battery. In some instances, the first drive motor may be caused to charge the first battery while the second battery powers the second drive motor. In some instances, the second drive motor may be caused to charge the second battery. In some instances, the second drive motor may be caused to charge the second battery while the first battery powers the first drive motor. The process flow 290 may return to block 291 in an iterative process that may be performed during operation of the electric vehicle. Accordingly, power and energy balance may be optimized between batteries.

Figure 3A:
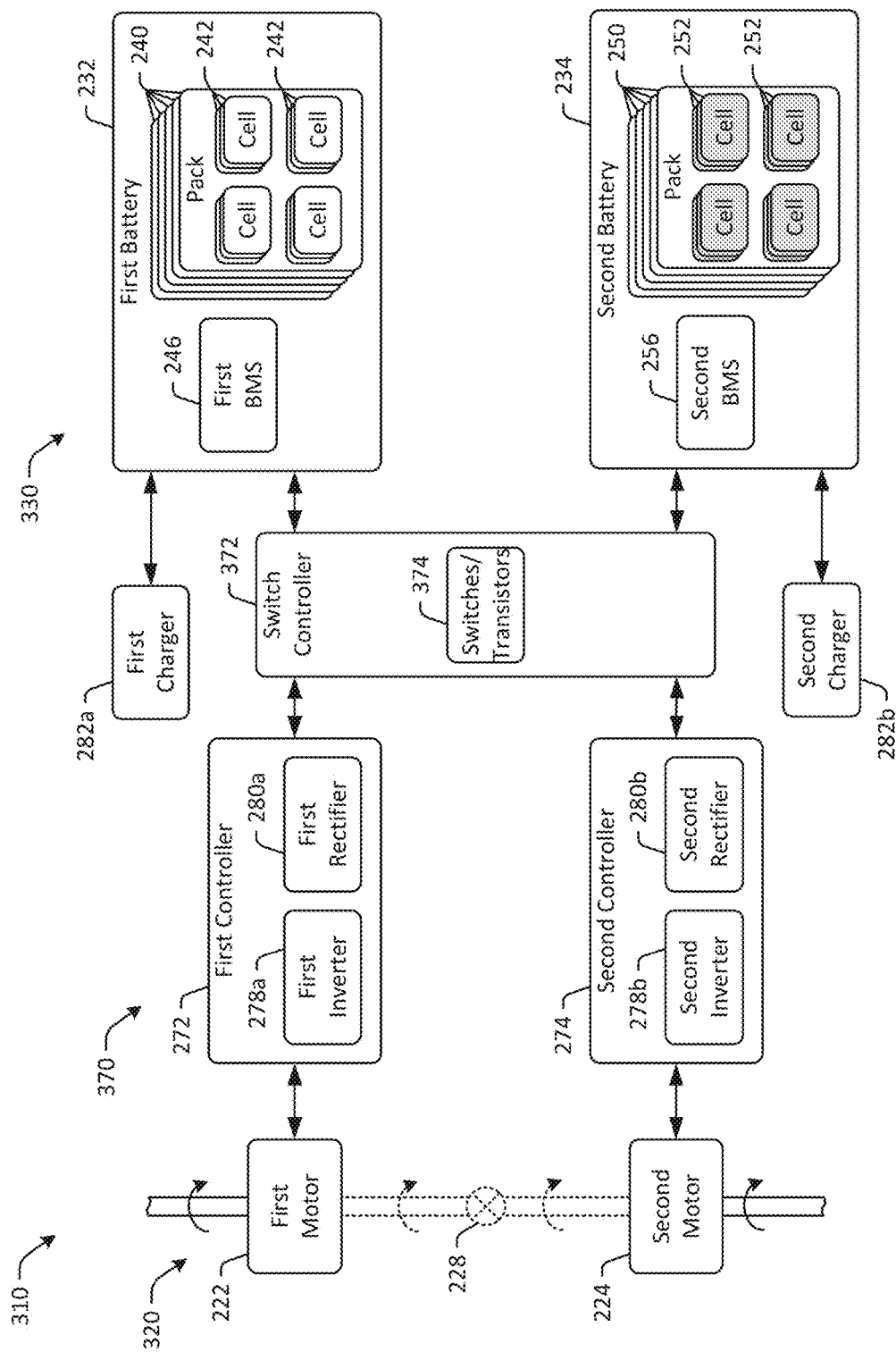
FIG. 3A schematically illustrates an example mechanically coupled electric drive system with a multiple chemistry battery system for electric vehicles in accordance with one or more embodiments of the disclosure.

FIG. 3A schematically illustrates an electric drive system 310 in accordance with one or more embodiments of the disclosure. The electric drive system 310 may be used as a part of an electric vehicle, such as the electric vehicle 100 described above. The electric drive system 310 may be configured to propel the electric vehicle 100 during operation of the electric drive system 310. As shown, the electric drive system 310 may include one or more drive motor(s) 320, one or more battery system(s) 330, and one or more controller(s) 370. The drive motor(s) 320, the battery system(s) 330, and the controller(s) 370 of the electric drive system 310 generally may be configured in a manner similar to the corresponding components and systems of the electric drive system 110 described above, although particular aspects of the electric drive system 310 are described below. Certain similarities and differences between the electric drive system 310 and the electric drive system 210 will be appreciated from the respective figures and the following description. Further, it will be appreciated that the drive motor(s) 320, the battery system(s) 330, and the controller(s) 370 may include other features and/or components in addition to those illustrated in FIG. 3A, such as any of those described above with respect to the electric drive system 110, where applicable.

As shown, the drive motor(s) 320 may include the first drive motor 222 configured to impart motion to one or more of the wheel(s) 102 of the electric vehicle 100. In some embodiments, the drive motor(s) 320 also may include the second drive motor 224 configured to impart motion to one or more of the wheel(s) 102. In other embodiments, the second drive motor 224 may be omitted. When present, the second drive motor 224 may be mechanically coupled to the first drive motor 222 by the mechanical coupling 228, or may be mechanically uncoupled from the first drive motor 222, according to various embodiments. The first drive motor 222 and the second drive motor 224 generally may be configured in the manner described above. In some instances, the first drive motor 222 and the second drive motor 224 simultaneously may operate in the drive mode of operation. In some instances, the first drive motor 222 and the second drive motor 224 simultaneously may operate in the regeneration mode of operation. In some instances, one of the first drive motor 222 and the second drive motor 224 may operate in the drive mode of operation, while the other of the first drive motor 222 and the second drive motor 224 operates in the regeneration mode of operation. The second, third, fourth, etc. motors may be optional in this embodiment (e.g., switch controller 372 may be configured to energy and power balance, etc.).

The battery system(s) 330 may be or may include a multiple chemistry battery system, such as a dual chemistry battery system, that includes a plurality of batteries configured to power the drive motor(s) 320. The plurality of batteries may include the first battery 232 and the second battery 234, which generally may be configured in the manner described above. The first battery 232 and the second battery 234 may be configured to power the first drive motor 222. When the second drive motor 224 is present, the first battery 232 and the second battery 234 also may be configured to power the second drive motor 224.

The controller(s) 370 may include the first motor controller 272 configured to control delivery of electric current between the first drive motor 222 and the batteries 232, 234. In some embodiments, the controller(s) 370 also may include the second motor controller 274 configured to control delivery of electric current between the second drive motor 224 and the batteries 232, 234. In other embodiments, the second motor controller 274 may be omitted, for example, when the second drive motor 224 is omitted.

As shown in FIG. 3A, the controller(s) 370 also may include a switch controller 372 configured to change or adjust connections between the first battery 232 and the second battery 234. The switch controller 372 may be electrically coupled to the first battery 232, the second battery 234, and the first motor controller 272. When the second motor controller 274 is present, the switch controller 372 also may be electrically coupled to the second motor controller 274. As shown, the switch controller 372 may include one or more switch(es), transistor(s), or solid state relay(s) 374, or the switch controller 372 may be electrically coupled to and in operable communication with the one or more switch(es), transistor(s), or solid state relay(s) 374. In some embodiments, the switch(es), transistor(s), or solid state relay(s) 374 may be or may include one or more metal-oxide-semiconductor field-effect transistor(s) (MOSFETs). The switch(es), transistor(s), or solid state relay(s) 374 may be configured to transition between a plurality of states to form a plurality of different connections between the first battery 232 and the second battery 234. In some embodiments, the switch(es), transistor(s), or solid state relay(s) 374 may be configured to transition between a first state, a second state, and a third state. In the first state, the switch(es), transistor(s), or solid state relay(s) 374 may form a series connection between the first battery 232 and the second battery 234. In the second state, the switch(es), transistor(s), or solid state relay(s) 374 may form a parallel connection between the first battery 232 and the second battery 234. In the third state, the first battery 232 and the second battery 234 may be disconnected from one another. The switch controller 372 may cause the switch(es), transistor(s), or solid state relay(s) 374 to transition between first state, the second state, and the third state based at least in part on an electric load on the batteries 232, 234, a charge level of the first battery 232, and/or a charge level of the second battery 234.

As explained above, in some embodiments, the second drive motor 224 may be omitted, and the first drive motor 222 may be the sole drive motor of the electric drive system 310. In other words, the electric drive system 310 may be a single drive motor system. In such embodiments, the switch controller 372 may cause the switch(es), transistor(s), or solid state relay(s) 374 to transition between the first state, the second state, and the third state based at least in part on the current mode of operation of the first drive motor 222. In some instances, the switch controller 372 may cause the switch(es), transistor(s), or solid state relay(s) 374 to assume the first state while the first drive motor 222 is in the drive mode of operation. In this manner, the batteries 232, 234 may power the first drive motor 222 while the batteries 232, 234 are connected in series. In some instances, the switch controller 372 may cause the switch(es), transistor(s), or solid state relay(s) 374 to assume the second state while the first drive motor 222 is in the drive mode of operation. In this manner, the batteries 232, 234 may power the first drive motor 222 while the batteries 232, 234 are connected in parallel. In some instances, the switch controller 372 may cause the switch(es), transistor(s), or solid state relay(s) 374 to assume the third state while the first drive motor 222 is in the drive mode of operation. In this manner, one of the batteries 232, 234 may power the first drive motor 222 while the batteries 232, 234 are disconnected from one another. It will be appreciated that such instances of the third state may include multiple different sub-states, one in which the first battery 232 powers the first drive motor 222, and another in which the second battery 234 powers the first drive motor 222. In some instances, the switch controller 372 may cause the switch(es), transistor(s), or solid state relay(s) 374 to assume the first state while the first drive motor 222 is in the regeneration mode of operation. In this manner, the first drive motor 222 may charge the batteries 232, 234 while the batteries 232, 234 are connected in series. In some instances, the switch controller 372 may cause the switch(es), transistor(s), or solid state relay(s) 374 to assume the second state while the first drive motor 222 is in the regeneration mode of operation. In this manner, the first drive motor 222 may charge the batteries 232, 234 while the batteries 232, 234 are connected in parallel. In some instances, the switch controller 372 may cause the switch(es), transistor(s), or solid state relay(s) 374 to assume the third state while the first drive motor 222 is in the regeneration mode of operation. In this manner, the first drive motor 222 may charge one of the batteries 232, 234 while the batteries 232, 234 are disconnected from one another. It will be appreciated that such instances of the third state may include multiple different sub-states, one in which the first drive motor 222 charges the first battery 232, and another in which the first drive motor 222 charges the second battery 234.

As explained above, in some embodiments, the drive motor(s) 320 may include both the first drive motor 222 and the second drive motor 224. In other words, the electric drive system 310 may be a dual drive motor system. In such embodiments, the switch controller 372 may cause the switch(es), transistor(s), or solid state relay(s) 374 to transition between the first state, the second state, and the third state based at least in part on the current mode of operation of the first drive motor 222 and/or the current mode of operation of the second drive motor 224. In some instances, the switch controller 372 may cause the switch(es), transistor(s), or solid state relay(s) 374 to assume the first state while the first drive motor 222 is in the drive mode of operation and the second drive motor 224 is in the drive mode of operation. In this manner, the batteries 232, 234 may power the first drive motor 222 and the second drive motor 224 while the batteries 232, 234 are connected in series. In some instances, the switch controller 372 may cause the switch(es), transistor(s), or solid state relay(s) 374 to assume the second state while the first drive motor 222 is in the drive mode of operation and the second drive motor 224 is in the drive mode of operation. In this manner, the batteries 232, 234 may power the first drive motor 222 and the second drive motor 224 while the batteries 232, 234 are connected in parallel. In some instances, the switch controller 372 may cause the switch(es), transistor(s), or solid state relay(s) 374 to assume the third state while the first drive motor 222 is in the drive mode of operation and the second drive motor 224 is in the drive mode of operation. In this manner, one of the batteries 232, 234 may power the first drive motor 222 and the other of the batteries 232, 234 may power the second drive motor 224 while the batteries 232, 234 are disconnected from one another. For example, the first battery 232 may power the first drive motor 222, and the second battery 234 may power the second drive motor 224.

In some instances, the switch controller 372 may cause the switch(es), transistor(s), or solid state relay(s) 374 to assume the first state while the first drive motor 222 is in the regeneration mode of operation and the second drive motor 224 is in the regeneration mode of operation. In this manner, the first drive motor 222 and the second drive motor 224 may charge the batteries 232, 234 while the batteries 232, 234 are connected in series. In some instances, the switch controller 372 may cause the switch(es), transistor(s), or solid state relay(s) 374 to assume the second state while the first drive motor 222 is in the regeneration mode of operation and the second drive motor 224 is in the regeneration mode of operation. In this manner, the first drive motor 222 and the second drive motor 224 may charge the batteries 232, 234 while the batteries 232, 234 are connected in parallel. In some instances, the switch controller 372 may cause the switch(es), transistor(s), or solid state relay(s) 374 to assume the third state while the first drive motor 222 is in the regeneration mode of operation and the second drive motor 224 is in the regeneration mode of operation. In this manner, the first drive motor 222 may charge one of the batteries 232, 234 and the second drive motor 224 may charge the other of the batteries 232, 234 while the batteries 232, 234 are disconnected from one another. For example, the first drive motor 222 may charge the first battery 232, and the second drive motor 224 may charge the second battery 234. In some instances, the switch controller 372 may cause the switch(es), transistor(s), or solid state relay(s) 374 to assume the third state while one of the first drive motor 222 and the second drive motor 224 is in the drive mode of operation and the other of the first drive motor 222 and second drive motor 224 is in the regeneration mode of operation. In this manner, one of the batteries 232, 234 may power the one of the first drive motor 222 and the second drive motor 224, and the other of the first drive motor 222 and second drive motor 224 may charge the other of the batteries 232, 234 while the batteries 232, 234 are disconnected from one another. For example, the first battery 232 may power the first drive motor 222, and the second drive motor 224 may charge the second battery 234. Alternatively, the first drive motor 222 may charge the first battery 232, and the second battery 234 may power the second drive motor 224.

Figure 3B:
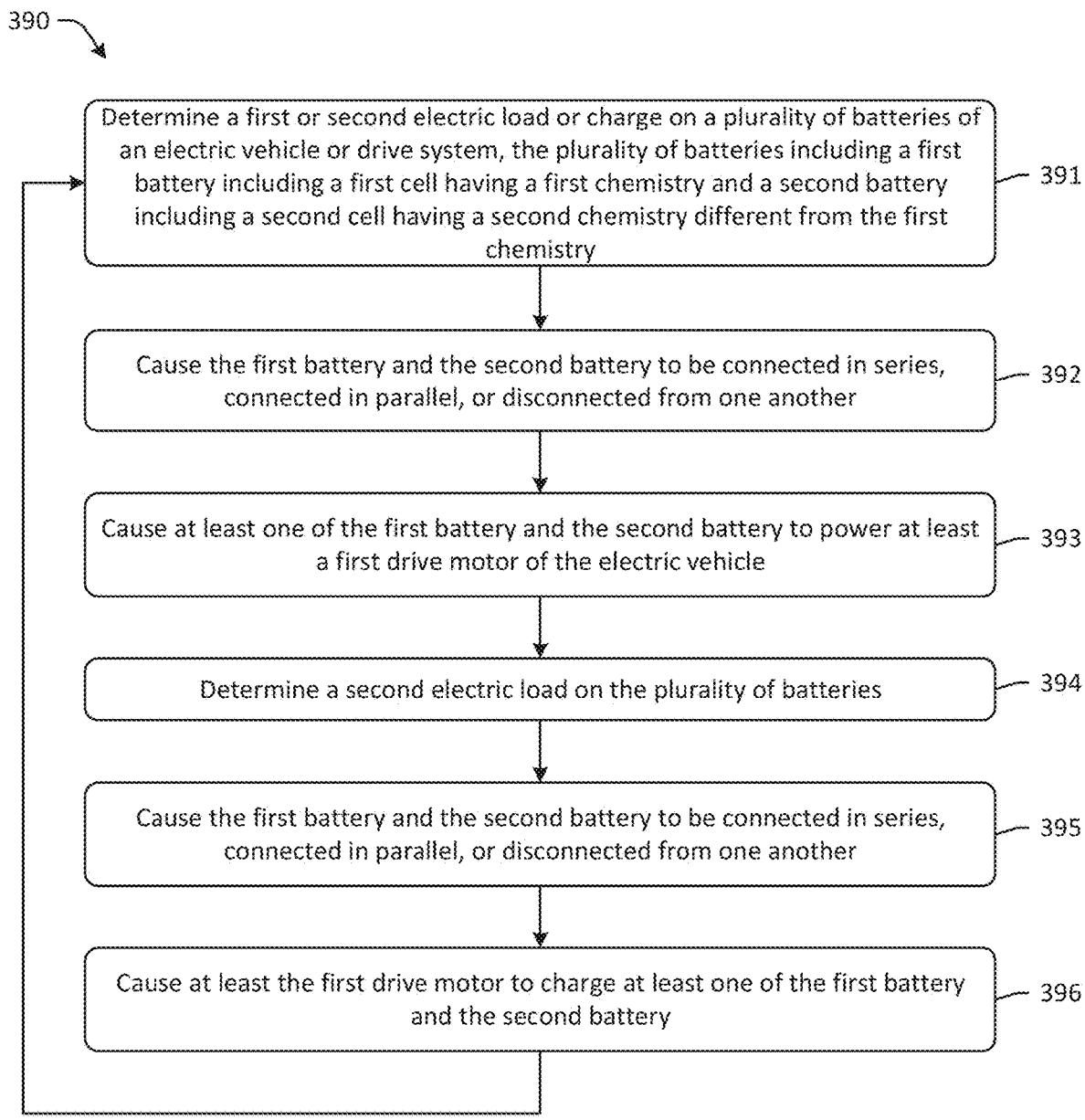
FIG. 3B is an example process flow for using a multiple chemistry battery system to power an electric vehicle in accordance with one or more embodiments of the disclosure.

FIG. 3B is an example process flow 390 for using a multiple chemistry battery system to power an electric vehicle in accordance with one or more embodiments of the disclosure. Although certain operations are illustrated as occurring separately in FIG. 3B, some or all of the operations may occur concurrently or partially concurrently. In some embodiments, the operations of the process flow 390 may be executed by one or more processor(s) of the electric drive system 310, such as processor(s) of the controller(s) 370 and/or the battery system(s) 330.

At block 391 of the process flow 390, a first electric load on a plurality of batteries of an electric vehicle may be determined. For example, computer-executable instructions of a controller or processor of an electric drive system may be executed to determine a first or second electric load or charge on a plurality of batteries from the electric drive system or electric vehicle. The first electric load may be an amount of power output or electric current flowing from the batteries and/or an amount of electric current requested and/or required to operate the electric vehicle under current operating conditions at a first time. The plurality of batteries may include a first battery and a second battery. The first battery may include a first cell having a first chemistry, and the second battery may include a second cell having a second chemistry different from the first chemistry.

At block 392 of the process flow 390, the first battery and the second battery may be caused to be connected in series, connected in parallel, or disconnected from one another. For example, computer-executable instructions of a controller or processor of the electric drive system may be executed to cause the first battery and the second battery to be connected in series, connected in parallel, or disconnected from one another. The series connection, the parallel connection, or the disconnection of the first battery and the second battery may be formed by one or more switch(es), transistor(s), or solid state relay(s), as described above. In some instances, the first battery and the second battery may be caused to be connected in series, connected in parallel, or disconnected from one another, based at least in part on the determined first electric load. In some instances, the first battery and the second battery may be caused to be connected in series, connected in parallel, or disconnected from one another, based at least in part on a charge level of the first battery and/or a charge level of the second battery at the first time. Power and/or energy balancing may also be performed, for example, using the system described in FIG. 2H.

At block 393 of the process flow 390, at least one of the first battery and the second battery may be caused to power at least a first drive motor of the electric vehicle. For example, computer-executable instructions of a controller or processor of the electric drive system may be executed to cause the at least one of the first battery and the second battery to power at least the first drive motor of the electric vehicle. In some instances, the at least one of the first battery and the second battery may be caused to power at least the first drive motor based at least in part on the determined first electric load. In some instances, the at least one of the first battery and the second battery may be caused to power at least the first drive motor based at least in part on a charge level of the first battery and/or a charge level of the second battery at the first time. In some instances, the at least one of the first battery and the second battery may be caused to power at least the first drive motor while the first battery and the second battery are connected in series. In some instances, the at least one of the first battery and the second battery may be caused to power at least the first drive motor while the first battery and the second battery are connected in parallel. In some instances, the at least one of the first battery and the second battery may be caused to power at least the first drive motor while the first battery and the second battery are disconnected from one another. In some embodiments, the first drive motor may be the only drive motor of the electric vehicle. In other embodiments, the electric vehicle may include the first drive motor and a second drive motor. In some instances, the first battery and the second battery may be caused to power the first drive motor and the second drive motor while the first battery and the second battery are connected in series. In some instances, the first battery and the second battery may be caused to power the first drive motor and the second drive motor while the first battery and the second battery are connected in parallel. In some instances, the first battery may be caused to power the first drive motor and the second battery may be caused to power the second drive motor while the first battery and the second battery are disconnected from one another.

At block 394 of the process flow 390, a second electric load on the plurality of batteries may be determined. For example, computer-executable instructions of a controller or processor of an electric drive system may be executed to determine a second electric load on the plurality of batteries. The second electric load may be an amount of power output or electric current flowing from the batteries and/or an amount of electric current requested and/or required to operate the electric vehicle under current operating conditions at a second time different from the first time. In some embodiments, the second time may be after the first time. In some embodiments, the second time may be before the first time.

At block 395 of the process flow 390, the first battery and the second battery may be caused to be connected in series, connected in parallel, or disconnected from one another. For example, computer-executable instructions of a controller or processor of the electric drive system may be executed to cause the first battery and the second battery to be connected in series, connected in parallel, or disconnected from one another. The series connection, the parallel connection, or the disconnection of the first battery and the second battery may be formed by the one or more switch(es), transistor(s), or solid state relay(s), as described above. In some instances, the first battery and the second battery may be caused to be connected in series, connected in parallel, or disconnected from one another, based at least in part on the determined second electric load. In some instances, the first battery and the second battery may be caused to be connected in series, connected in parallel, or disconnected from one another, based at least in part on a charge level of the first battery and/or a charge level of the second battery at the second time.

At block 396 of the process flow 390, at least the first drive motor may be caused to charge at least one of the first battery and the second battery. For example, computer-executable instructions of a controller or processor of the electric drive system may be executed to cause at least the first drive motor to charge at least one of the first battery and the second battery. In some instances, the at least the first drive motor may be caused to charge at least one of the first battery and the second battery based at least in part on the determined second electric load. In some instances, the at least the first drive motor may be caused to charge at least one of the first battery and the second battery based at least in part on a charge level of the first battery and/or a charge level of the second battery at the second time. In some instances, the first drive motor may be caused to charge the first battery. In some instances, the first drive motor may be caused to charge the first battery while the second battery powers the second drive motor and while the first battery and the second battery are disconnected from one another. In some instances, the first drive motor may be caused to charge the first battery and the second battery. In some instances, the first drive motor may be caused to charge the first battery and the second battery while the first battery and the second battery are connected in series. In some instances, the first drive motor may be caused to charge the first battery and the second battery while the first battery and the second battery are connected in parallel. In some instances, the first drive motor may be caused to charge the first battery while the second drive motor charges the second battery and while the first battery and the second battery are disconnected from one another. In some instances, the first drive motor and the second drive motor may be caused to charge the first battery and the second battery while the first battery and the second battery are connected in series. In some instances, the first drive motor and the second drive motor may be caused to charge the first battery and the second battery while the first battery and the second battery are connected in parallel. The process flow 390 may return to block 391 in an iterative process that may be performed during operation of the electric vehicle.

Figure 4A:
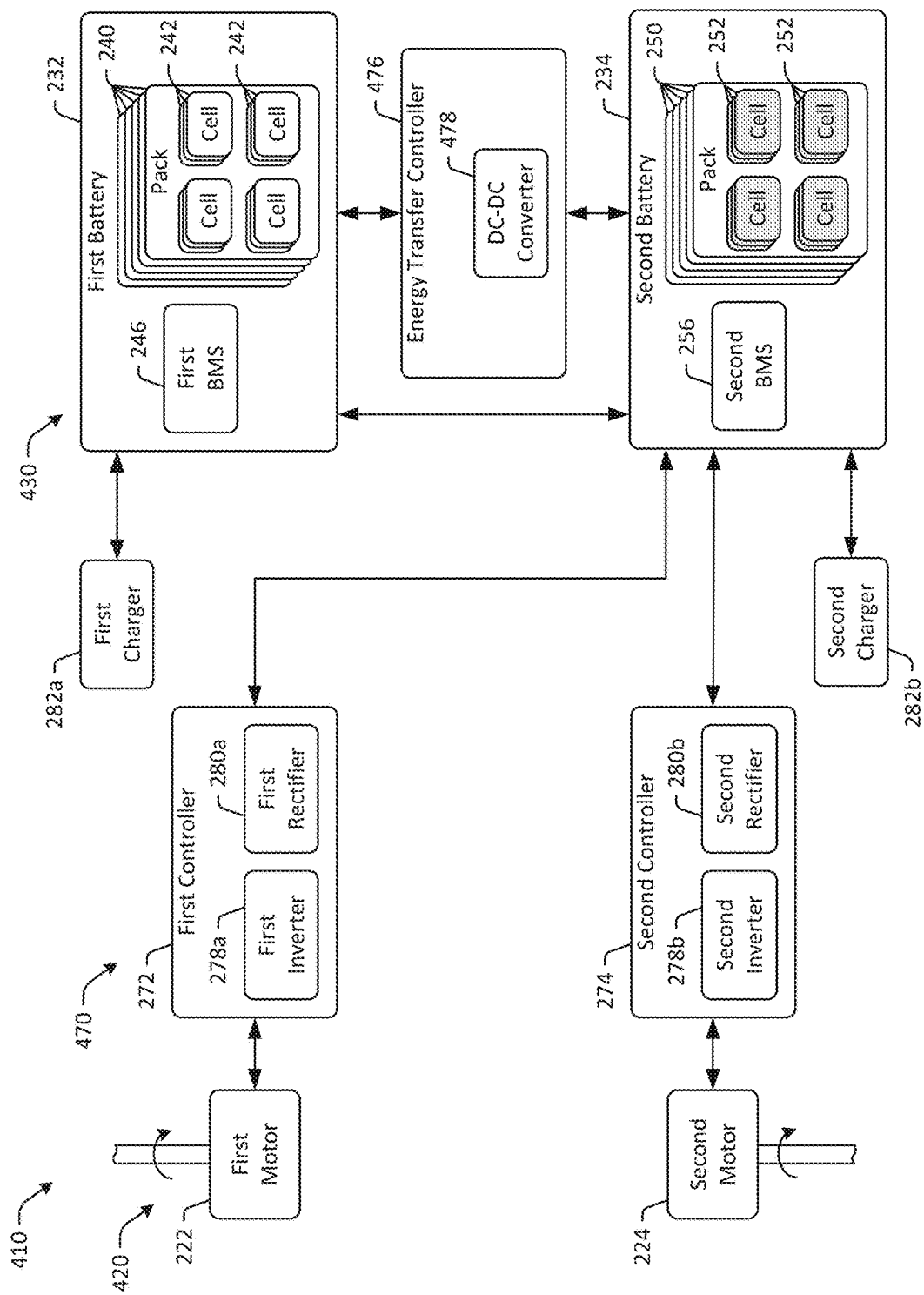
FIG. 4A schematically illustrates an example electric drive system with a multiple chemistry battery system for electric vehicles in accordance with one or more embodiments of the disclosure.

FIG. 4A schematically illustrates an electric drive system 410 in accordance with one or more embodiments of the disclosure. The electric drive system 410 may be used as a part of an electric vehicle, such as the electric vehicle 100 described above. The electric drive system 410 may be configured to propel the electric vehicle 100 during operation of the electric drive system 410. As shown, the electric drive system 410 may include one or more drive motor(s) 420, one or more battery system(s) 430, and one or more controller(s) 470. The drive motor(s) 420, the battery system(s) 430, and the controller(s) 470 of the electric drive system 410 generally may be configured in a manner similar to the corresponding components and systems of the electric drive system 110 described above, although particular aspects of the electric drive system 410 are described below. Certain similarities and differences between the electric drive system 410 and the electric drive system 210 will be appreciated from the respective figures and the following description. Further, it will be appreciated that the drive motor(s) 420, the battery system(s) 430, and the controller(s) 470 may include other features and/or components in addition to those illustrated in FIG. 4A, such as any of those described above with respect to the electric drive system 110, where applicable.

As shown, the drive motor(s) 420 may include the first drive motor 222 configured to impart motion to one or more of the wheel(s) 102 of the electric vehicle 100. In some embodiments, the drive motor(s) 420 also may include the second drive motor 224 configured to impart motion to one or more of the wheel(s) 102. In other embodiments, the second drive motor 224 may be omitted. When present, the second drive motor 224 may be mechanically uncoupled from the first drive motor 222. The first drive motor 222 and the second drive motor 224 generally may be configured in the manner described above. In some instances, the first drive motor 222 and the second drive motor 224 simultaneously may operate in the drive mode of operation. In some instances, the first drive motor 222 and the second drive motor 224 simultaneously may operate in the regeneration mode of operation. In some instances, one of the first drive motor 222 and the second drive motor 224 may operate in the drive mode of operation, while the other of the first drive motor 222 and the second drive motor 224 operates in the regeneration mode of operation. In some embodiments, the second motor 224, second controller 274, etc. may be optional The battery system(s) 430 may be or may include a multiple chemistry battery system, such as a dual chemistry battery system, that includes a plurality of batteries configured to power the drive motor(s) 420. The plurality of batteries may include the first battery 232 and the second battery 234, which generally may be configured in the manner described above. The first battery 232 and the second battery 234 may be configured to power the first drive motor 222. When the second drive motor 224 is present, the first battery 232 and the second battery 234 also may be configured to power the second drive motor 224. As shown, the first battery 232 and the second battery 234 may be connected in series. In some embodiments, as shown, the series connection between the first battery 232 and the second battery 234 may be a fixed connection.

The controller(s) 470 may include the first motor controller 272 configured to control delivery of electric current between the first drive motor 222 and the batteries 232, 234. In some embodiments, the controller(s) 470 also may include the second motor controller 274 configured to control delivery of electric current between the second drive motor 224 and the batteries 232, 234. In other embodiments, the second motor controller 274 may be omitted, for example, when the second drive motor 224 is omitted.

As shown, the second battery 234 may be electrically coupled to the first motor controller 272, and the first battery 232 may be electrically coupled to the first motor controller 272 indirectly through the series connection between the first battery 232 and the second battery 234. In some embodiments, as shown, the connection between the second battery 234 and the first motor controller 272 may be a fixed connection. When the second drive motor 224 and the second motor controller 274 are present, the second battery 234 may be electrically coupled to the second motor controller 274, and the first battery 232 may be electrically coupled to the second motor controller 274 indirectly through the series connection between the first battery 232 and the second battery 234.

As shown in FIG. 4A, the controller(s) 470 also may include an energy transfer controller 476 configured to control transfer of energy between the first battery 232 and the second battery 234. For example, the energy transfer controller 476 may be configured to control transfer of energy from the first battery 232 to the second battery 234 and/or from the second battery 234 to the first battery 232. In some embodiments, the energy transfer controller 476 may include one or more DC-DC converter(s) 478, or the energy transfer controller 476 may be electrically coupled to and in operable communication with the one or more DC-DC converter(s) 478. The DC-DC converter(s) 478 may be configured to convert a source of direct current from a first voltage level, such as a voltage level suitable for the first battery 232, to a second voltage level, such as a voltage level suitable for the second battery 234, and/or to convert a source of direct current from the second voltage level to the first voltage level. In some embodiments, the DC-DC converter(s) 478 may include one or more unidirectional DC-DC converters. In some embodiments, the DC-DC converter(s) 478 may include one or more bidirectional DC-DC converters. The energy transfer controller 476 may cause the DC-DC converter(s) 478 to transfer energy between the first battery 232 and the second battery 234 based at least in part on an electric load on the batteries 232, 234, a charge level of the first battery 232, and/or a charge level of the second battery 234. In some instances, the energy transfer controller 476 may cause the DC-DC converter(s) 478 to transfer energy from the first battery 232 to the second battery 234. In other instances, the energy transfer controller 476 may cause the DC-DC converter(s) 478 to transfer energy from the second battery 234 to the first battery 232.

Figure 4B:
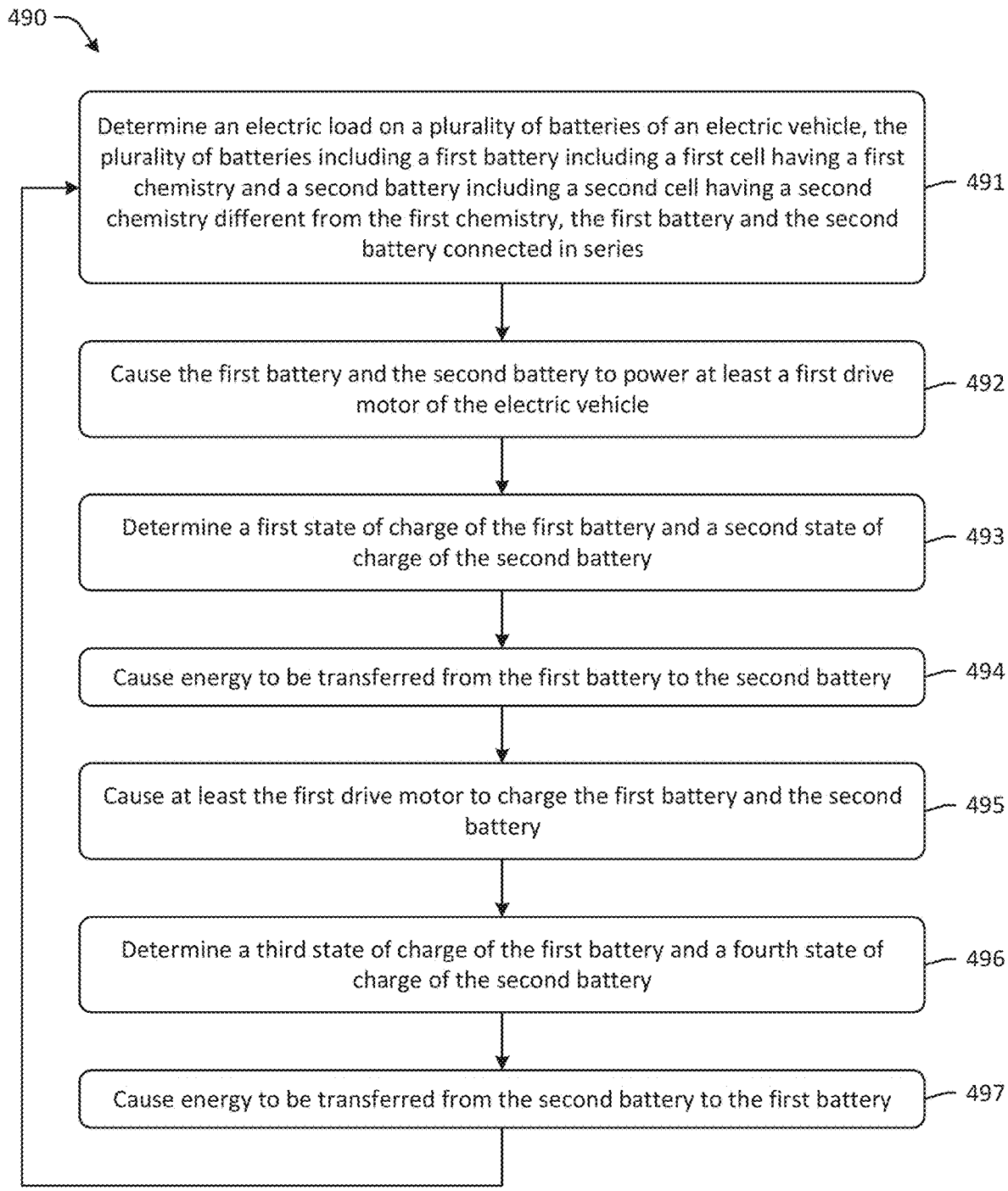
FIG. 4B is an example process flow for using a multiple chemistry battery system to power an electric vehicle in accordance with one or more embodiments of the disclosure.

FIG. 4B is an example process flow 490 for using a multiple chemistry battery system to power an electric vehicle in accordance with one or more embodiments of the disclosure. Although certain operations are illustrated as occurring separately in FIG. 4B, some or all of the operations may occur concurrently or partially concurrently. In some embodiments, the operations of the process flow 490 may be executed by one or more processor(s) of the electric drive system 410, such as processor(s) of the controller(s) 470 and/or the battery system(s) 430.

At block 491 of the process flow 490, an electric load on a plurality of batteries of an electric vehicle may be determined. For example, computer-executable instructions of a controller or processor of an electric drive system may be executed to determine an electric load or a charge on a plurality of batteries of the electric vehicle. The electric load may be an amount of power output or electric current flowing from the batteries and/or an amount of electric current requested and/or required to operate the electric vehicle under current operating conditions. The plurality of batteries may include a first battery and a second battery. The first battery may include a first cell having a first chemistry, and the second battery may include a second cell having a second chemistry different from the first chemistry. The first battery and the second battery may be connected in series. In some embodiments, the series connection may be a fixed connection. In some embodiments, a load or charge may be determined from an electric drive system, battery energy balance may be assessed (e.g., state of charge 1, state of charge 2, etc.), the desired optimal energy balance rate of change may be determined, the optimal power transfer requested to meet demand and/or rate of charge may be determined, the first and second battery to supply may be determined, and the power transfer may be initiated.

At block 492 of the process flow 490, the first battery and the second battery may be caused to power at least a first drive motor of the electric vehicle. For example, computer-executable instructions of a controller or processor of the electric drive system may be executed to cause the first battery and the second battery to power at least the first drive motor of the electric vehicle. In some instances, the first battery and the second battery may be caused to power the at least the first drive motor based at least in part on the determined electric load. In some embodiments, the first drive motor may be the only drive motor of the electric vehicle. In other embodiments, the electric vehicle may include the first drive motor and a second drive motor. In some instances, the first battery and the second battery may be caused to power the first drive motor and the second drive motor.

At block 493 of the process flow 490, a first state of charge of the first battery and a second state of charge of the second battery may be determined. For example, computer-executable instructions of a controller or processor of the electric drive system may be executed to determine the first state of charge of the first battery and the second state of charge of the second battery. The first state of charge of the first battery and the second state of charge of the second battery may be determined at a first time.

At block 494 of the process flow 490, energy may be caused to be transferred from the first battery to the second battery. For example, computer-executable instructions of a controller or processor of the electric drive system may be executed to cause energy to be transferred from the first battery to the second battery. In some instances, energy may be caused to be transferred from the first battery to the second battery based at least in part on the first state of charge of the first battery and/or the second state of charge of the second battery. In some instances, energy may be caused to be transferred from the first battery to the second battery based at least in part on an electric load on the plurality of batteries under current operating conditions.

At block 495 of the process flow 490, at least the first drive motor may be caused to charge the first battery and the second battery. For example, computer-executable instructions of a controller or processor of the electric drive system may be executed to cause at least the first drive motor to charge the first battery and the second battery. In some instances, the at least the first drive motor may be caused to charge the first battery and the second battery based at least in part on an electric load on the plurality of batteries under current operating conditions. In some instances, the at least the first drive motor may be caused to charge the first battery and the second battery based at least in part on a state of charge of the first battery and/or a state of charge of the second battery. In some instances, the first drive motor and the second drive motor may be caused to charge the first battery and the second battery.

At block 496 of the process flow 490, a third state of charge of the first battery and a fourth state of charge of the second battery may be determined. For example, computer-executable instructions of a controller or processor of the electric drive system may be executed to determine the third state of charge of the first battery and the fourth state of charge of the second battery. The third state of charge of the first battery and the fourth state of charge of the second battery may be determined at a second time. In some instances, the second time may be after the first time. In other instances, the second time may be before the first time.

At block 497 of the process flow 490, energy may be caused to be transferred from the second battery to the first battery. For example, computer-executable instructions of a controller or processor of the electric drive system may be executed to cause energy to be transferred from the second battery to the first battery. In some instances, energy may be caused to be transferred from the second battery to the first battery based at least in part on the third state of charge of the first battery and/or the fourth state of charge of the second battery. In some instances, energy may be caused to be transferred from the second battery to the first battery based at least in part on an electric load on the plurality of batteries under current operating conditions. The process flow 490 may return to block 491 in an iterative process that may be performed during operation of the electric vehicle.

Figure 5A:
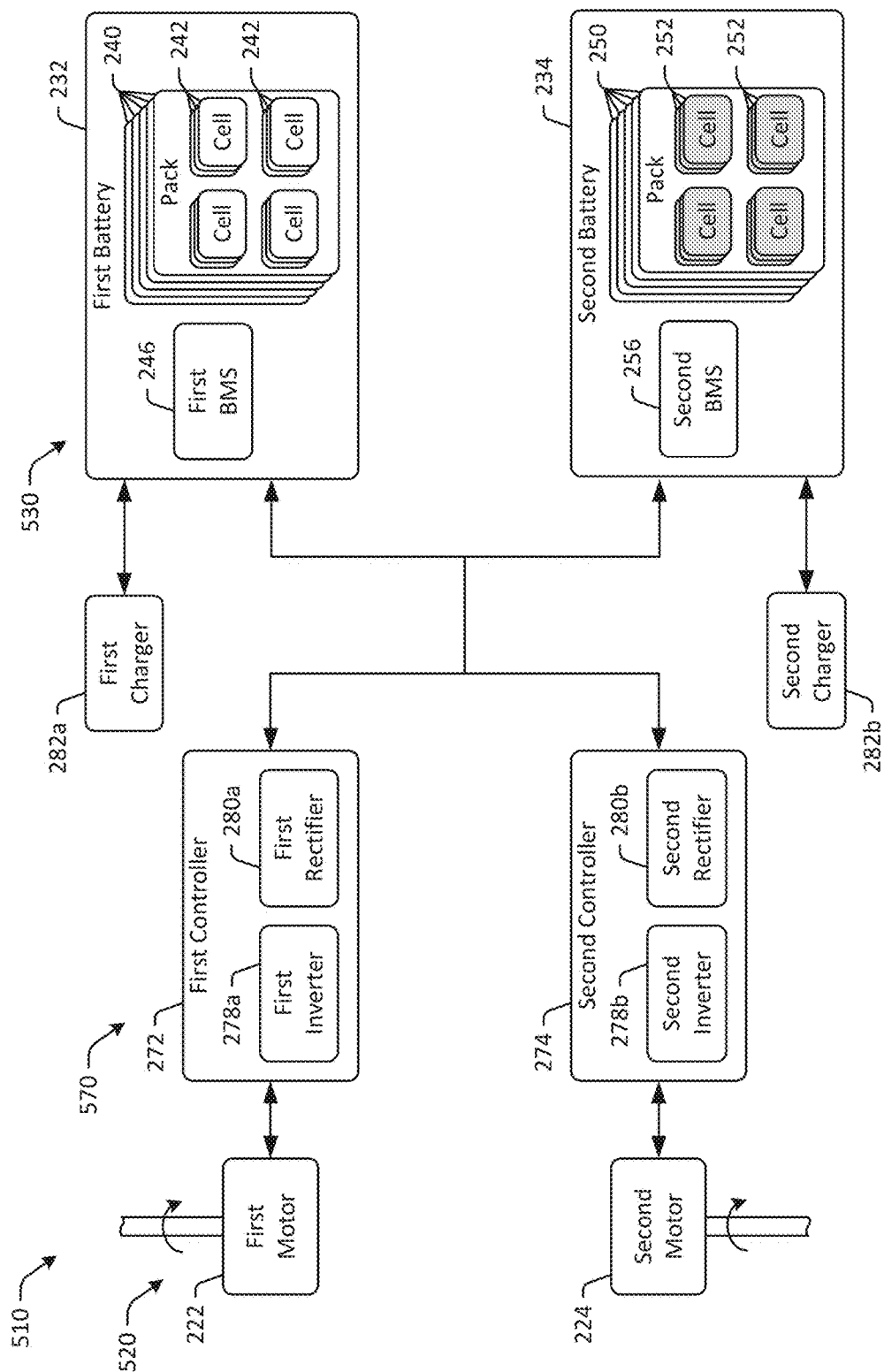
FIG. 5A schematically illustrates an example electric drive system with a multiple chemistry battery system for electric vehicles in accordance with one or more embodiments of the disclosure.

FIG. 5A schematically illustrates an electric drive system 510 in accordance with one or more embodiments of the disclosure. The electric drive system 510 may be used as a part of an electric vehicle, such as the electric vehicle 100 described above. The electric drive system 510 may be configured to propel the electric vehicle 100 during operation of the electric drive system 510. As shown, the electric drive system 510 may include one or more drive motor(s) 520, one or more battery system(s) 530, and one or more controller(s) 570. The drive motor(s) 520, the battery system(s) 530, and the controller(s) 570 of the electric drive system 510 generally may be configured in a manner similar to the corresponding components and systems of the electric drive system 110 described above, although particular aspects of the electric drive system 510 are described below. Certain similarities and differences between the electric drive system 510 and the electric drive system 210 will be appreciated from the respective figures and the following description. Further, it will be appreciated that the drive motor(s) 520, the battery system(s) 530, and the controller(s) 570 may include other features and/or components in addition to those illustrated in FIG. 5A, such as any of those described above with respect to the electric drive system 110, where applicable.

As shown, the drive motor(s) 520 may include the first drive motor 222 configured to impart motion to one or more of the wheel(s) 102 of the electric vehicle 100. In some embodiments, the drive motor(s) 520 also may include the second drive motor 224 configured to impart motion to one or more of the wheel(s) 102. In other embodiments, the second drive motor 224 may be omitted. When present, the second drive motor 224 may be mechanically uncoupled from the first drive motor 222. The first drive motor 222 and the second drive motor 224 generally may be configured in the manner described above. In some instances, the first drive motor 222 and the second drive motor 224 simultaneously may operate in the drive mode of operation. In some instances, the first drive motor 222 and the second drive motor 224 simultaneously may operate in the regeneration mode of operation. In some instances, one of the first drive motor 222 and the second drive motor 224 may operate in the drive mode of operation, while the other of the first drive motor 222 and the second drive motor 224 operates in the regeneration mode of operation. The second motor 224, second controller 274, etc. may be optional.

The battery system(s) 530 may be or may include a multiple chemistry battery system, such as a dual chemistry battery system, that includes a plurality of batteries configured to power the drive motor(s) 520. The plurality of batteries may include the first battery 232 and the second battery 234, which generally may be configured in the manner described above. The first battery 232 and the second battery 234 may be configured to power the first drive motor 222. When the second drive motor 224 is present, the first battery 232 and the second battery 234 also may be configured to power the second drive motor 224. As shown, the first battery 232 and the second battery 234 may be connected in parallel. In some embodiments, as shown, the parallel connection between the first battery 232 and the second battery 234 may be a fixed connection.

The controller(s) 570 may include the first motor controller 272 configured to control delivery of electric current between the first drive motor 222 and the batteries 232, 234. In some embodiments, the controller(s) 570 also may include the second motor controller 274 configured to control delivery of electric current between the second drive motor 224 and the batteries 232, 234. In other embodiments, the second motor controller 274 may be omitted, for example, when the second drive motor 224 is omitted.

As shown, the first battery 232 and the second battery 234 may be electrically coupled to the first motor controller 272. In some embodiments, as shown, the connections between the first battery 232, the second battery 234, and the first motor controller 272 may be fixed connections. When the second drive motor 224 and the second motor controller 274 are present, the first battery 232 and the second battery 234 may be electrically coupled to the second motor controller 274. In some embodiments, as shown, the connections between the first battery 232, the second battery 234, and the second motor controller 274 may be fixed connections.

Figure 5B:
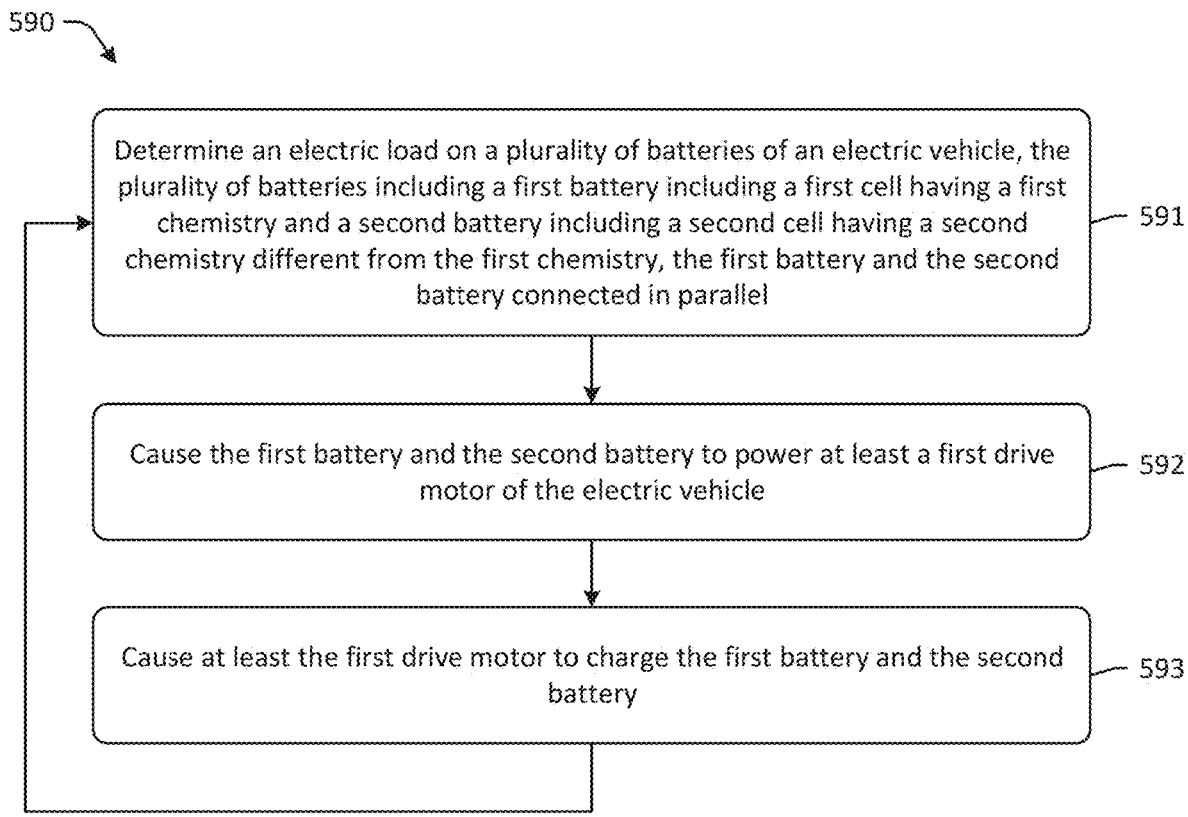
FIG. 5B is an example process flow for using a multiple chemistry battery system to power an electric vehicle in accordance with one or more embodiments of the disclosure.

FIG. 5B is an example process flow 590 for using a multiple chemistry battery system to power an electric vehicle in accordance with one or more embodiments of the disclosure. Although certain operations are illustrated as occurring separately in FIG. 5B, some or all of the operations may occur concurrently or partially concurrently. In some embodiments, the operations of the process flow 590 may be executed by one or more processor(s) of the electric drive system 510, such as processor(s) of the controller(s) 570 and/or the battery system(s) 530.

At block 591 of the process flow 590, an electric load on a plurality of batteries of an electric vehicle may be determined. For example, computer-executable instructions of a controller or processor of an electric drive system may be executed to determine an electric load on a plurality of batteries of the electric vehicle. The electric load may be an amount of power output or electric current flowing from the batteries and/or an amount of electric current requested and/or required to operate the electric vehicle under current operating conditions. The plurality of batteries may include a first battery and a second battery. The first battery may include a first cell having a first chemistry, and the second battery may include a second cell having a second chemistry different from the first chemistry. The first battery and the second battery may be connected in parallel. In some embodiments, the parallel connection may be a fixed connection.

At block 592 of the process flow 590, the first battery and the second battery may be caused to power at least a first drive motor of the electric vehicle. For example, computer-executable instructions of a controller or processor of the electric drive system may be executed to cause the first battery and the second battery to power at least the first drive motor of the electric vehicle. In some instances, the first battery and the second battery may be caused to power the at least the first drive motor based at least in part on the determined electric load. In some embodiments, the first drive motor may be the only drive motor of the electric vehicle. In other embodiments, the electric vehicle may include the first drive motor and a second drive motor. In some instances, the first battery and the second battery may be caused to power the first drive motor and the second drive motor.

At block 593 of the process flow 590, at least the first drive motor may be caused to charge the first battery and the second battery. For example, computer-executable instructions of a controller or processor of the electric drive system may be executed to cause at least the first drive motor to charge the first battery and the second battery. In some instances, the at least the first drive motor may be caused to charge the first battery and the second battery based at least in part on an electric load on the plurality of batteries under current operating conditions. In some instances, the at least the first drive motor may be caused to charge the first battery and the second battery based at least in part on a state of charge of the first battery and/or a state of charge of the second battery. In some instances, the first drive motor and the second drive motor may be caused to charge the first battery and the second battery. The process flow 590 may return to block 591 in an iterative process that may be performed during operation of the electric vehicle.

Figure 6A:
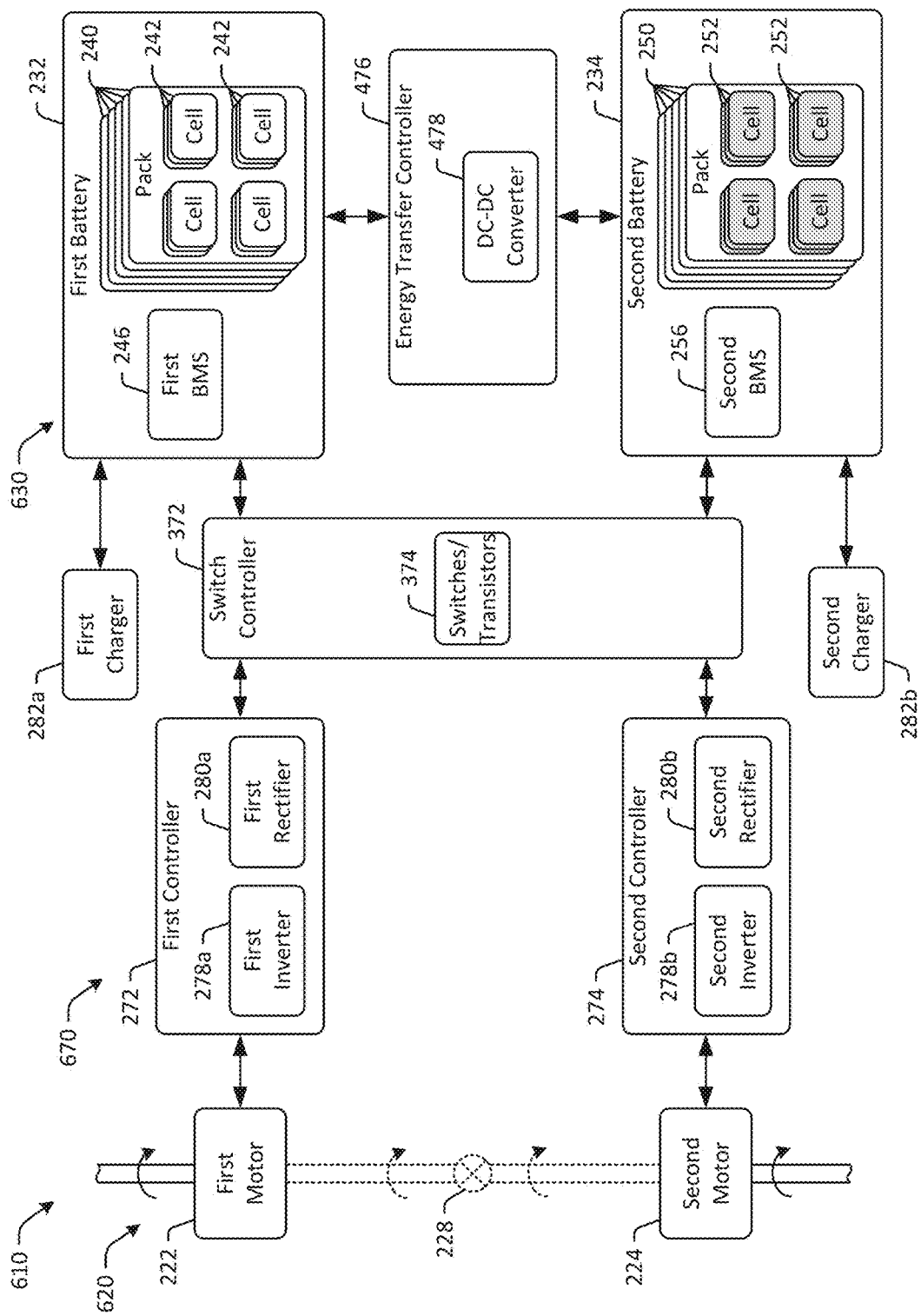
FIG. 6A schematically illustrates an example electric drive system with a multiple chemistry battery system for electric vehicles in accordance with one or more embodiments of the disclosure.

FIG. 6A schematically illustrates an electric drive system 610 in accordance with one or more embodiments of the disclosure. The electric drive system 610 may be used as a part of an electric vehicle, such as the electric vehicle 100 described above. The electric drive system 610 may be configured to propel the electric vehicle 100 during operation of the electric drive system 610. As shown, the electric drive system 610 may include one or more drive motor(s) 620, one or more battery system(s) 630, and one or more controller(s) 670. The drive motor(s) 620, the battery system(s) 630, and the controller(s) 670 of the electric drive system 610 generally may be configured in a manner similar to the corresponding components and systems of the electric drive system 110 described above, although particular aspects of the electric drive system 610 are described below. Certain similarities and differences between the electric drive system 610 and the electric drive systems 210, 310, 410 will be appreciated from the respective figures and the following description. Further, it will be appreciated that the drive motor(s) 620, the battery system(s) 630, and the controller(s) 670 may include other features and/or components in addition to those illustrated in FIG. 6A, such as any of those described above with respect to the electric drive system 110, where applicable.

As shown, the drive motor(s) 620 may include the first drive motor 222 configured to impart motion to one or more of the wheel(s) 102 of the electric vehicle 100. In some embodiments, the drive motor(s) 620 also may include the second drive motor 224 configured to impart motion to one or more of the wheel(s) 102. In other embodiments, the second drive motor 224 may be omitted. When present, the second drive motor 224 may be mechanically coupled to the first drive motor 222 by the mechanical coupling 228, or may be mechanically uncoupled from the first drive motor 222, according to various embodiments. The first drive motor 222 and the second drive motor 224 generally may be configured in the manner described above. In some instances, the first drive motor 222 and the second drive motor 224 simultaneously may operate in the drive mode of operation. In some instances, the first drive motor 222 and the second drive motor 224 simultaneously may operate in the regeneration mode of operation. In some instances, one of the first drive motor 222 and the second drive motor 224 may operate in the drive mode of operation, while the other of the first drive motor 222 and the second drive motor 224 operates in the regeneration mode of operation. The second motor 224, second controller 274, etc. may be optional.

The battery system(s) 630 may be or may include a multiple chemistry battery system, such as a dual chemistry battery system, that includes a plurality of batteries configured to power the drive motor(s) 620. The plurality of batteries may include the first battery 232 and the second battery 234, which generally may be configured in the manner described above. The first battery 232 and the second battery 234 may be configured to power the first drive motor 222. When the second drive motor 224 is present, the first battery 232 and the second battery 234 also may be configured to power the second drive motor 224.

The controller(s) 670 may include the first motor controller 272 configured to control delivery of electric current between the first drive motor 222 and the batteries 232, 234. In some embodiments, the controller(s) 670 also may include the second motor controller 274 configured to control delivery of electric current between the second drive motor 224 and the batteries 232, 234. In other embodiments, the second motor controller 274 may be omitted, for example, when the second drive motor 224 is omitted.

As shown in FIG. 6A, the controller(s) 670 also may include the switch controller 372 configured to change or adjust connections between the first battery 232 and the second battery 234. The switch controller 372 may be electrically coupled to the first battery 232, the second battery 234, and the first motor controller 272. When the second motor controller 274 is present, the switch controller 372 also may be electrically coupled to the second motor controller 274. As shown, the switch controller 372 may include the one or more switch(es), transistor(s), or solid state relay(s) 374, or the switch controller 372 may be electrically coupled to and in operable communication with the one or more switch(es), transistor(s), or solid state relay(s) 374. The switch controller 372 generally may be configured in the manner described above. As shown, the controller(s) 670 also may include the energy transfer controller 476 configured to control transfer of energy between the first battery 232 and the second battery 234. For example, the energy transfer controller 476 may be configured to control transfer of energy from the first battery 232 to the second battery 234 and/or from the second battery 234 to the first battery 232. The energy transfer controller 476 may include the one or more DC-DC converter(s) 478, or the energy transfer controller 476 may be electrically coupled to and in operable communication with the one or more DC-DC converter(s) 478. The energy transfer controller 476 may cause the DC-DC converter(s) 478 to transfer energy between the first battery 232 and the second battery 234 based at least in part on an electric load on the batteries 232, 234, a charge level of the first battery 232, and/or a charge level of the second battery 234. The energy transfer controller 476 generally may be configured in the manner described above.

Figure 6B:
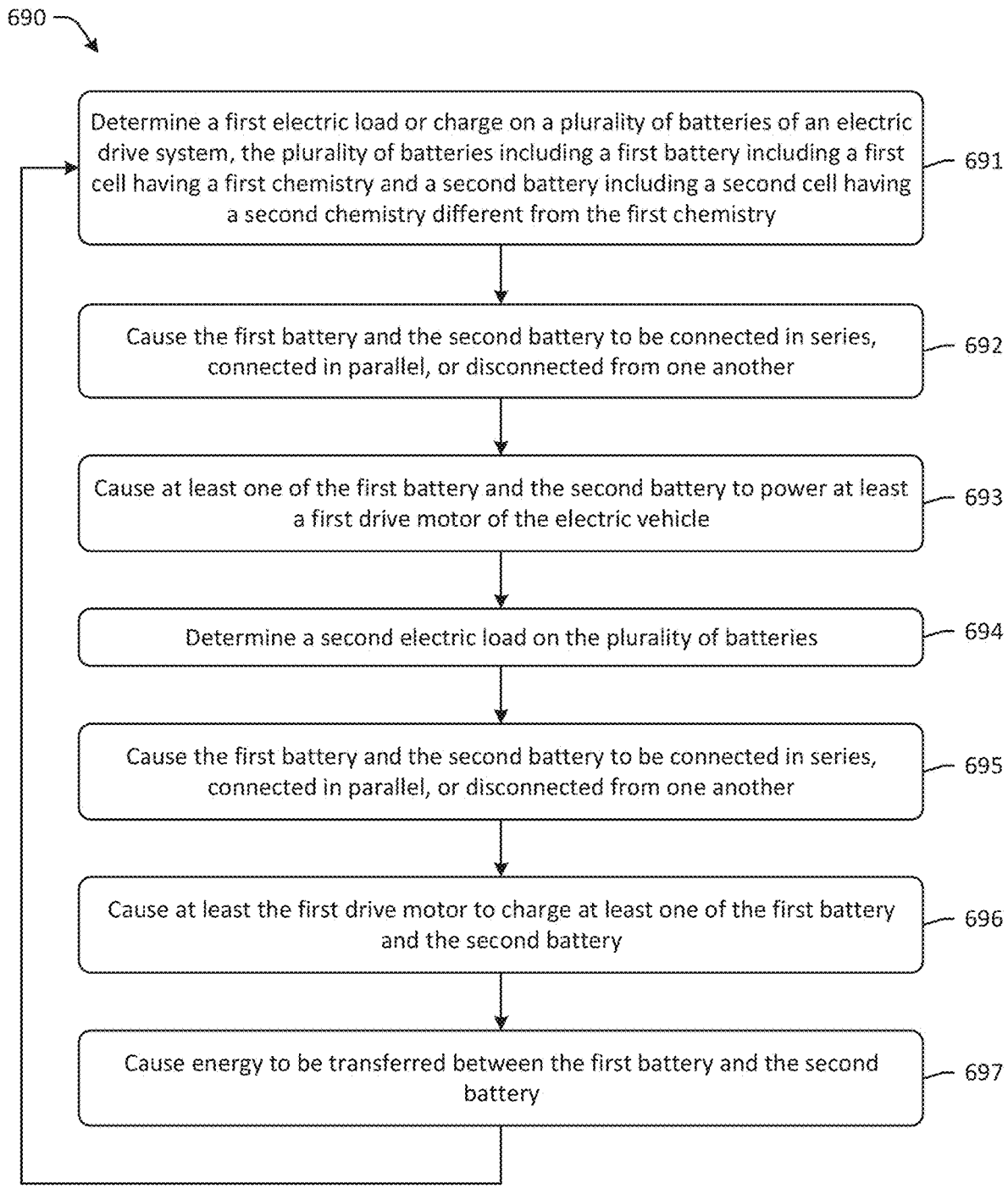
FIG. 6B is an example process flow for using a multiple chemistry battery system to power an electric vehicle in accordance with one or more embodiments of the disclosure.

FIG. 6B is an example process flow 690 for using a multiple chemistry battery system to power an electric vehicle in accordance with one or more embodiments of the disclosure. Although certain operations are illustrated as occurring separately in FIG. 6B, some or all of the operations may occur concurrently or partially concurrently. In some embodiments, the operations of the process flow 690 may be executed by one or more processor(s) of the electric drive system 610, such as processor(s) of the controller(s) 670 and/or the battery system(s) 630.

At block 691 of the process flow 690, a first electric load or charge on a plurality of batteries of an electric vehicle or an electric drive system may be determined. For example, computer-executable instructions of a controller or processor of an electric drive system may be executed to determine a first electric load on a plurality of batteries of the electric vehicle. The first electric load may be an amount of power output or electric current flowing from the batteries and/or an amount of electric current requested and/or required to operate the electric vehicle under current operating conditions at a first time. The plurality of batteries may include a first battery and a second battery. The first battery may include a first cell having a first chemistry, and the second battery may include a second cell having a second chemistry different from the first chemistry.

At block 692 of the process flow 690, the first battery and the second battery may be caused to be connected in series, connected in parallel, or disconnected from one another. For example, computer-executable instructions of a controller or processor of the electric drive system may be executed to cause the first battery and the second battery to be connected in series, connected in parallel, or disconnected from one another. The series connection, the parallel connection, or the disconnection of the first battery and the second battery may be formed by one or more switch(es), transistor(s), or solid state relay(s), as described above. In some instances, the first battery and the second battery may be caused to be connected in series, connected in parallel, or disconnected from one another, based at least in part on the determined first electric load. In some instances, the first battery and the second battery may be caused to be connected in series, connected in parallel, or disconnected from one another, based at least in part on a charge level of the first battery and/or a charge level of the second battery at the first time.

At block 693 of the process flow 690, at least one of the first battery and the second battery may be caused to power at least a first drive motor of the electric vehicle. For example, computer-executable instructions of a controller or processor of the electric drive system may be executed to cause the at least one of the first battery and the second battery to power at least the first drive motor of the electric vehicle. In some instances, the at least one of the first battery and the second battery may be caused to power at least the first drive motor based at least in part on the determined first electric load. In some instances, the at least one of the first battery and the second battery may be caused to power at least the first drive motor based at least in part on a charge level of the first battery and/or a charge level of the second battery at the first time. In some instances, the at least one of the first battery and the second battery may be caused to power at least the first drive motor while the first battery and the second battery are connected in series. In some instances, the at least one of the first battery and the second battery may be caused to power at least the first drive motor while the first battery and the second battery are connected in parallel. In some instances, the at least one of the first battery and the second battery may be caused to power at least the first drive motor while the first battery and the second battery are disconnected from one another. In some embodiments, the first drive motor may be the only drive motor of the electric vehicle. In other embodiments, the electric vehicle may include the first drive motor and a second drive motor. In some instances, the first battery and the second battery may be caused to power the first drive motor and the second drive motor while the first battery and the second battery are connected in series. In some instances, the first battery and the second battery may be caused to power the first drive motor and the second drive motor while the first battery and the second battery are connected in parallel. In some instances, the first battery may be caused to power the first drive motor and the second battery may be caused to power the second drive motor while the first battery and the second battery are disconnected from one another.

At block 694 of the process flow 690, a second electric load on the plurality of batteries may be determined. For example, computer-executable instructions of a controller or processor of an electric drive system may be executed to determine a second electric load on the plurality of batteries. The second electric load may be an amount of power output or electric current flowing from the batteries and/or an amount of electric current requested and/or required to operate the electric vehicle under current operating conditions at a second time different from the first time. In some embodiments, the second time may be after the first time. In some embodiments, the second time may be before the first time.

At block 695 of the process flow 690, the first battery and the second battery may be caused to be connected in series, connected in parallel, or disconnected from one another. For example, computer-executable instructions of a controller or processor of the electric drive system may be executed to cause the first battery and the second battery to be connected in series, connected in parallel, or disconnected from one another. The series connection, the parallel connection, or the disconnection of the first battery and the second battery may be formed by the one or more switch(es), transistor(s), or solid state relay(s), as described above. In some instances, the first battery and the second battery may be caused to be connected in series, connected in parallel, or disconnected from one another, based at least in part on the determined second electric load. In some instances, the first battery and the second battery may be caused to be connected in series, connected in parallel, or disconnected from one another, based at least in part on a charge level of the first battery and/or a charge level of the second battery at the second time.

At block 696 of the process flow 690, at least the first drive motor may be caused to charge at least one of the first battery and the second battery. For example, computer-executable instructions of a controller or processor of the electric drive system may be executed to cause at least the first drive motor to charge at least one of the first battery and the second battery. In some instances, the at least the first drive motor may be caused to charge at least one of the first battery and the second battery based at least in part on the determined second electric load. In some instances, the at least the first drive motor may be caused to charge at least one of the first battery and the second battery based at least in part on a charge level of the first battery and/or a charge level of the second battery at the second time. In some instances, the first drive motor may be caused to charge the first battery. In some instances, the first drive motor may be caused to charge the first battery while the second battery powers the second drive motor and while the first battery and the second battery are disconnected from one another. In some instances, the first drive motor may be caused to charge the first battery and the second battery. In some instances, the first drive motor may be caused to charge the first battery and the second battery while the first battery and the second battery are connected in series. In some instances, the first drive motor may be caused to charge the first battery and the second battery while the first battery and the second battery are connected in parallel. In some instances, the first drive motor may be caused to charge the first battery while the second drive motor charges the second battery and while the first battery and the second battery are disconnected from one another. In some instances, the first drive motor and the second drive motor may be caused to charge the first battery and the second battery while the first battery and the second battery are connected in series. In some instances, the first drive motor and the second drive motor may be caused to charge the first battery and the second battery while the first battery and the second battery are connected in parallel.

At block 697 of the process flow 690, energy may be caused to be transferred between the first battery and the second battery. For example, computer-executable instructions of a controller or processor of the electric drive system may be executed to cause energy to be transferred between the first battery and the second battery. In some instances, energy may be caused to be transferred between the first battery and the second battery based at least in part on a state of charge of the first battery and/or a state of charge of the second battery. In some instances, energy may be caused to be transferred between the first battery and the second battery based at least in part on an electric load on the plurality of batteries under current operating conditions. In some instances, energy may be caused to be transferred from the first battery to the second battery. In other instances, energy may be caused to be transferred from the second battery to the first battery. The process flow 690 may return to block 691 in an iterative process that may be performed during operation of the electric vehicle.

Figure 7A:
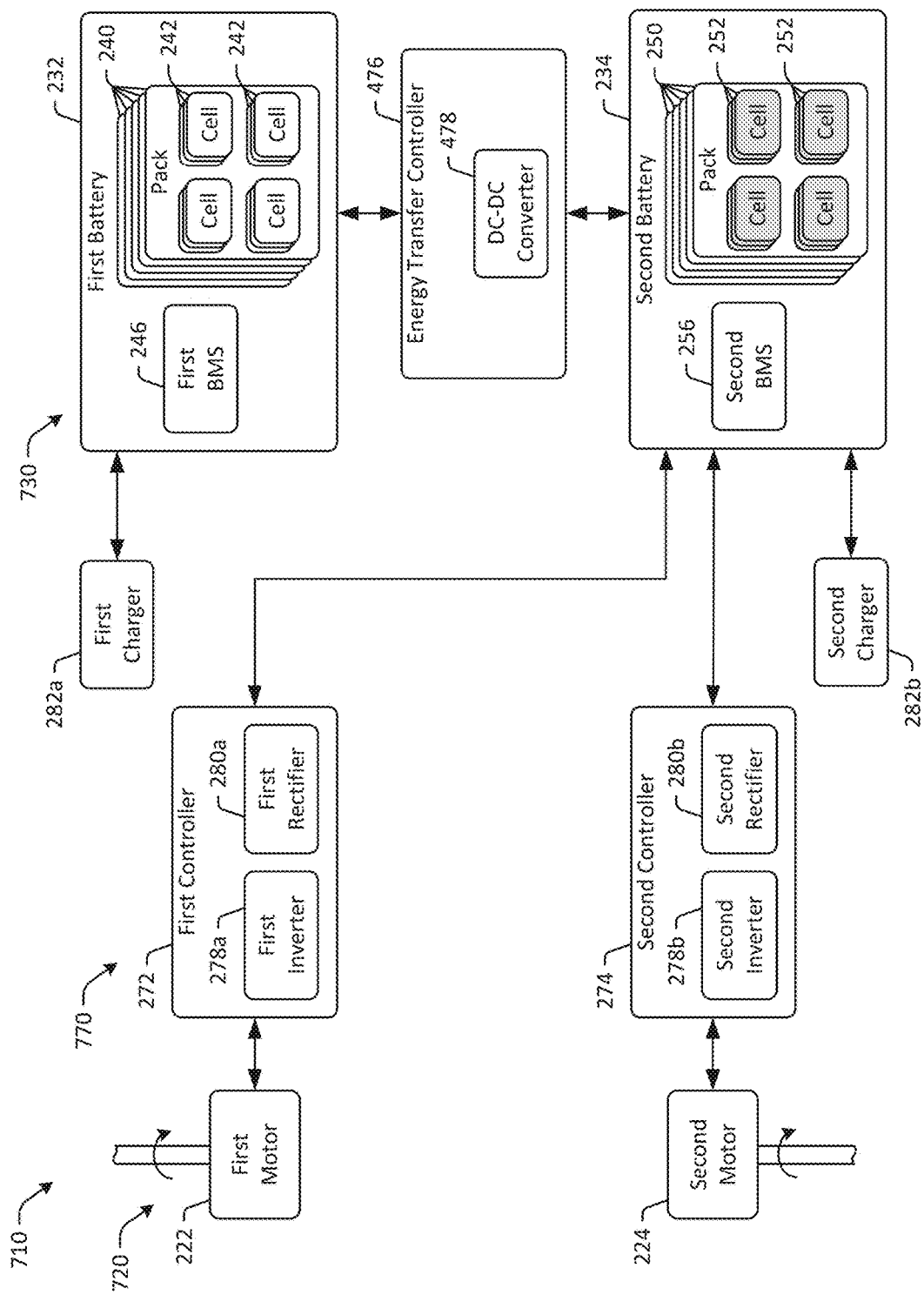
FIG. 7A schematically illustrates an example electric drive system with a multiple chemistry battery system for electric vehicles in accordance with one or more embodiments of the disclosure.

FIG. 7A schematically illustrates an electric drive system 710 in accordance with one or more embodiments of the disclosure. The electric drive system 710 may be used as a part of an electric vehicle, such as the electric vehicle 100 described above. The electric drive system 710 may be configured to propel the electric vehicle 100 during operation of the electric drive system 710. As shown, the electric drive system 710 may include one or more drive motor(s) 720, one or more battery system(s) 730, and one or more controller(s) 770. The drive motor(s) 720, the battery system(s) 730, and the controller(s) 770 of the electric drive system 710 generally may be configured in a manner similar to the corresponding components and systems of the electric drive system 110 described above, although particular aspects of the electric drive system 710 are described below. Certain similarities and differences between the electric drive system 710 and the electric drive systems 210, 410 will be appreciated from the respective figures and the following description. Further, it will be appreciated that the drive motor(s) 720, the battery system(s) 730, and the controller(s) 770 may include other features and/or components in addition to those illustrated in FIG. 7A, such as any of those described above with respect to the electric drive system 110, where applicable.

As shown, the drive motor(s) 720 may include the first drive motor 222 configured to impart motion to one or more of the wheel(s) 102 of the electric vehicle 100. In some embodiments, the drive motor(s) 720 also may include the second drive motor 224 configured to impart motion to one or more of the wheel(s) 102. In other embodiments, the second drive motor 224 may be omitted. When present, the second drive motor 224 may be mechanically uncoupled from the first drive motor 222. The first drive motor 222 and the second drive motor 224 generally may be configured in the manner described above. In some instances, the first drive motor 222 and the second drive motor 224 simultaneously may operate in the drive mode of operation. In some instances, the first drive motor 222 and the second drive motor 224 simultaneously may operate in the regeneration mode of operation. In some instances, one of the first drive motor 222 and the second drive motor 224 may operate in the drive mode of operation, while the other of the first drive motor 222 and the second drive motor 224 operates in the regeneration mode of operation.

The battery system(s) 730 may be or may include a multiple chemistry battery system, such as a dual chemistry battery system, that includes a plurality of batteries configured to power the drive motor(s) 720. The plurality of batteries may include the first battery 232 and the second battery 234, which generally may be configured in the manner described above. The first battery 232 and the second battery 234 may be configured to power the first drive motor 222. When the second drive motor 224 is present, the first battery 232 and the second battery 234 also may be configured to power the second drive motor 224. As shown, the first battery 232 and the second battery 234 may be connected indirectly in series.

The controller(s) 770 may include the first motor controller 272 configured to control delivery of electric current between the first drive motor 222 and the batteries 232, 234. In some embodiments, the controller(s) 770 also may include the second motor controller 274 configured to control delivery of electric current between the second drive motor 224 and the batteries 232, 234. In other embodiments, the second motor controller 274 may be omitted, for example, when the second drive motor 224 is omitted.

As shown in FIG. 7A, the controller(s) 770 also may include the energy transfer controller 476 configured to control transfer of energy between the first battery 232 and the second battery 234. For example, the energy transfer controller 476 may be configured to control transfer of energy from the first battery 232 to the second battery 234 and from the second battery 234 to the first battery 232. The energy transfer controller 476 may include the one or more DC-DC converter(s) 478, or the energy transfer controller 476 may be electrically coupled to and in operable communication with the one or more DC-DC converter(s) 478. The energy transfer controller 476 may cause the DC-DC converter(s) 478 to transfer energy between the first battery 232 and the second battery 234 based at least in part on an electric load on the batteries 232, 234, a charge level of the first battery 232, and/or a charge level of the second battery 234. The energy transfer controller 476 generally may be configured in the manner described above.

As shown, the second battery 234 may be electrically coupled directly to the first motor controller 272, and the first battery 232 may be electrically coupled to the second battery 234 indirectly through the energy transfer controller 476. The first battery 232 may be electrically coupled to the first motor controller 272 indirectly through the energy transfer controller 476 and the second battery 234. In this manner, the second battery 234 may operate as an energy buffer between the first battery 232 and the first motor controller 272 during operation of the electric drive system

710. In some embodiments, as shown, the respective connections between the second battery 234 and the first motor controller 272, between the energy transfer controller 476 and the second battery 234, and between the first battery 232 and the energy transfer controller 476 may be fixed connections. When the second drive motor 224 and the second motor controller 274 are present, the second battery 234 may be electrically coupled directly to the second motor controller 274, and the first battery 232 may be electrically coupled to the second motor controller 274 indirectly through the energy transfer controller 476 and the second battery 234. In this manner, the second battery 234 also may operate as an energy buffer between the first battery 232 and the second motor controller 274 during operation of the electric drive system 710. In some embodiments, the connection between the second battery 234 and the second motor controller 274 may be a fixed connection.

Figure 7B:
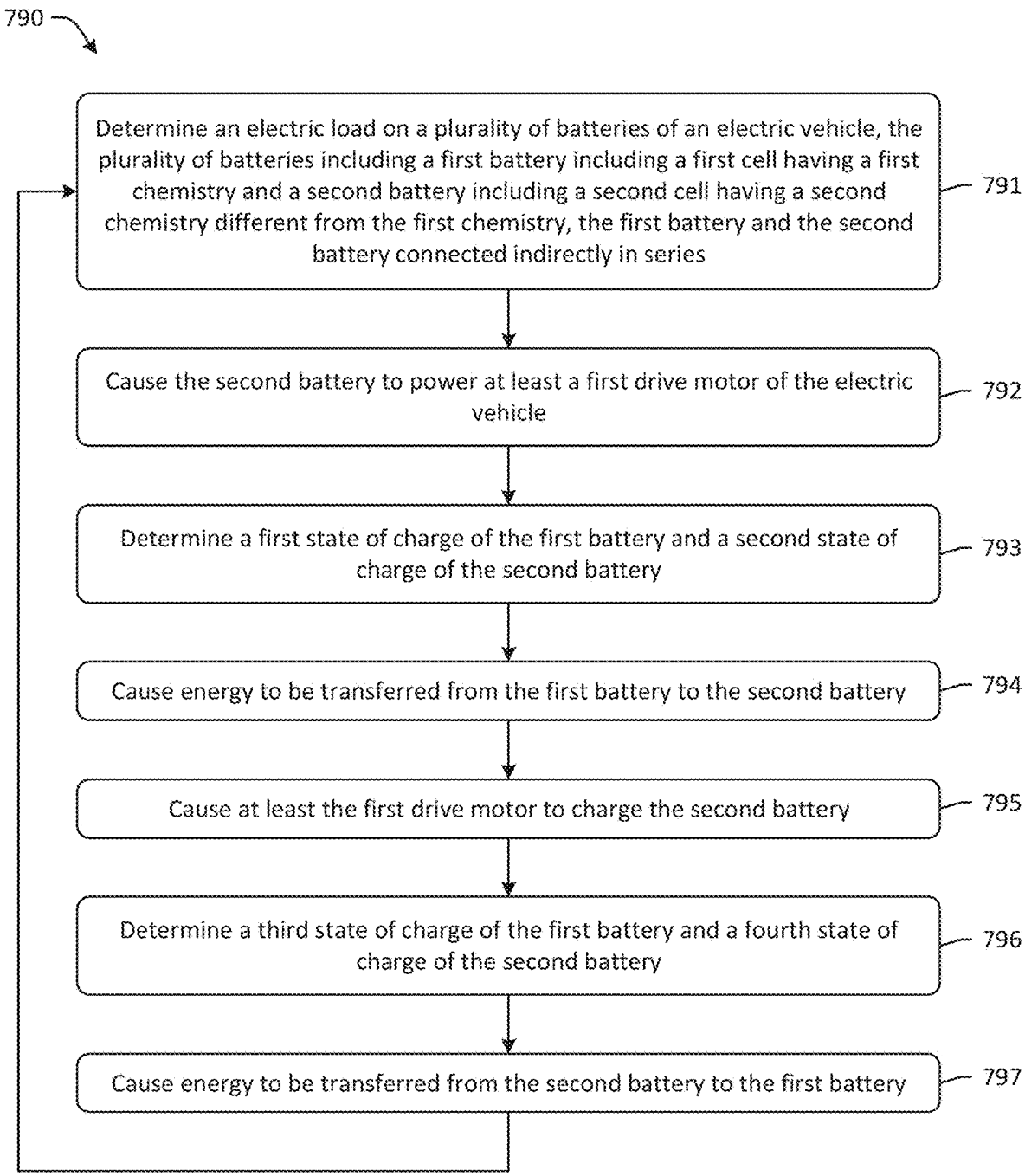
FIG. 7B is an example process flow for using a multiple chemistry battery system to power an electric vehicle in accordance with one or more embodiments of the disclosure.

FIG. 7B is an example process flow 790 for using a multiple chemistry battery system to power an electric vehicle in accordance with one or more embodiments of the disclosure. Although certain operations are illustrated as occurring separately in FIG. 7B, some or all of the operations may occur concurrently or partially concurrently. In some embodiments, the operations of the process flow 790 may be executed by one or more processor(s) of the electric drive system 710, such as processor(s) of the controller(s) 770 and/or the battery system(s) 730.

At block 791 of the process flow 790, an electric load or charge on a plurality of batteries of an electric vehicle may be determined, for example, using the controller. For example, computer-executable instructions of a controller or processor of an electric drive system may be executed to determine an electric load on a plurality of batteries of the electric vehicle. The electric load may be an amount of power output or electric current flowing from the batteries and/or an amount of electric current requested and/or required to operate the electric vehicle under current operating conditions. The plurality of batteries may include a first battery and a second battery. The first battery may include a first cell having a first chemistry, and the second battery may include a second cell having a second chemistry different from the first chemistry. The first battery and the second battery may be connected indirectly in series. For example, the first battery may be electrically coupled to the second battery indirectly through an energy transfer controller.

At block 792 of the process flow 790, the second battery may be caused to power at least a first drive motor of the electric vehicle. For example, computer-executable instructions of a controller or processor of the electric drive system may be executed to cause the second battery to power at least the first drive motor of the electric vehicle. In some instances, the second battery may be caused to power the at least the first drive motor based at least in part on the determined electric load. In some embodiments, the first drive motor may be the only drive motor of the electric vehicle. In other embodiments, the electric vehicle may include the first drive motor and a second drive motor. In some instances, the second battery may be caused to power the first drive motor and the second drive motor.

At block 793 of the process flow 790, a first state of charge of the first battery and a second state of charge of the second battery may be determined. For example, computer-executable instructions of a controller or processor of the electric drive system may be executed to determine the first state of charge of the first battery and the second state of charge of the second battery. The first state of charge of the first battery and the second state of charge of the second battery may be determined at a first time.

At block 794 of the process flow 790, energy may be caused to be transferred from the first battery to the second battery. For example, computer-executable instructions of a controller or processor of the electric drive system may be executed to cause energy to be transferred from the first battery to the second battery. In some instances, energy may be caused to be transferred from the first battery to the second battery based at least in part on the first state of charge of the first battery and/or the second state of charge of the second battery. In some instances, energy may be caused to be transferred from the first battery to the second battery based at least in part on an electric load on the plurality of batteries under current operating conditions.

At block 795 of the process flow 790, at least the first drive motor may be caused to charge the second battery. For example, computer-executable instructions of a controller or processor of the electric drive system may be executed to cause at least the first drive motor to charge the second battery. In some instances, the at least the first drive motor may be caused to charge the second battery based at least in part on an electric load on the plurality of batteries under current operating conditions. In some instances, the at least the first drive motor may be caused to charge the second battery based at least in part on a state of charge of the first battery and/or a state of charge of the second battery. In some instances, the first drive motor and the second drive motor may be caused to charge the second battery.

At block 796 of the process flow 790, a third state of charge of the first battery and a fourth state of charge of the second battery may be determined. For example, computer-executable instructions of a controller or processor of the electric drive system may be executed to determine the third state of charge of the first battery and the fourth state of charge of the second battery. The third state of charge of the first battery and the fourth state of charge of the second battery may be determined at a second time. In some instances, the second time may be after the first time. In other instances, the second time may be before the first time.

At block 797 of the process flow 790, energy may be caused to be transferred from the second battery to the first battery. For example, computer-executable instructions of a controller or processor of the electric drive system may be executed to cause energy to be transferred from the second battery to the first battery. In some instances, energy may be caused to be transferred from the second battery to the first battery based at least in part on the third state of charge of the first battery and/or the fourth state of charge of the second battery. In some instances, energy may be caused to be transferred from the second battery to the first battery based at least in part on an electric load on the plurality of batteries under current operating conditions. The process flow 790 may return to block 791 in an iterative process that may be performed during operation of the electric vehicle.

Figure 8A:
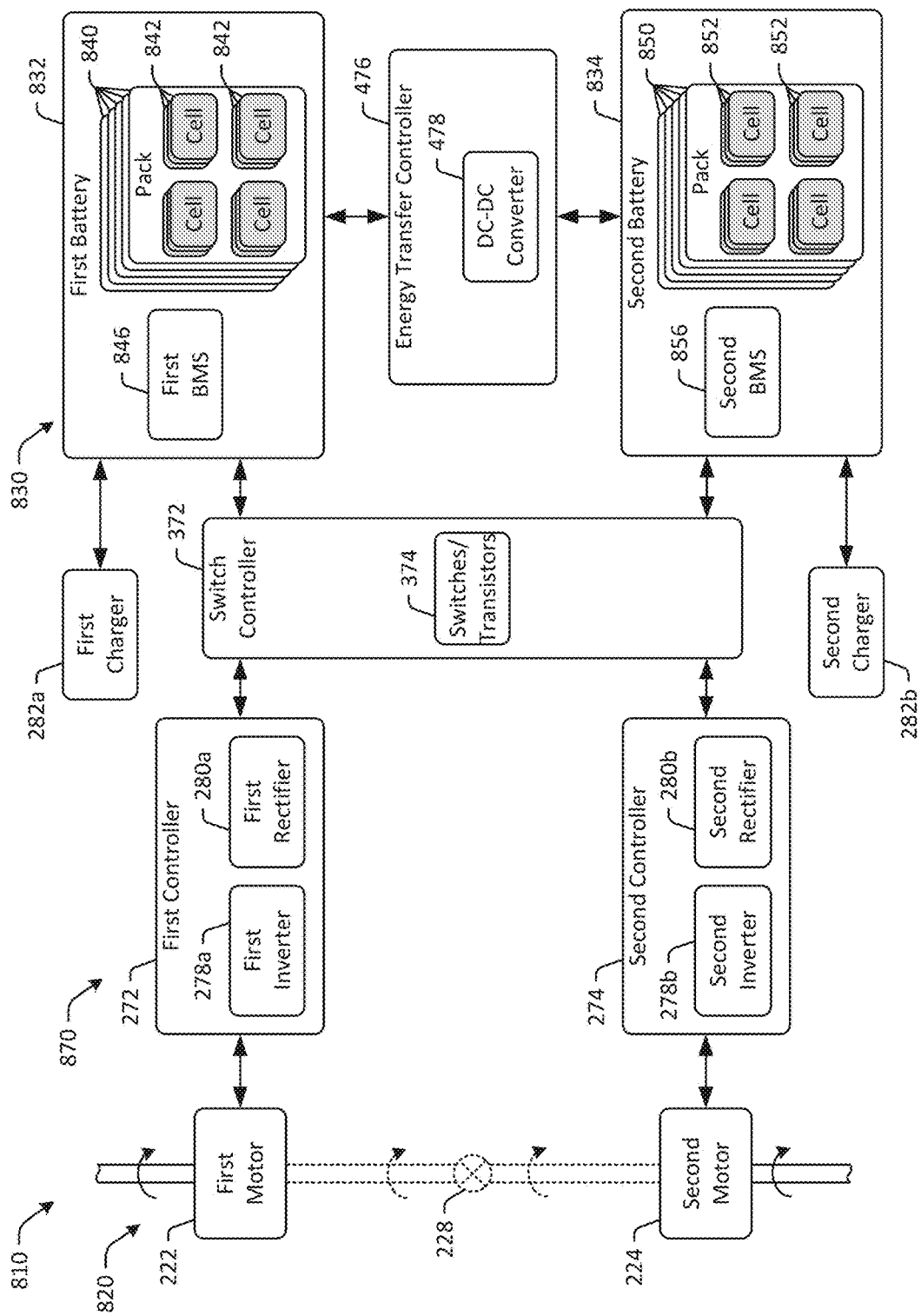
FIG. 8A schematically illustrates an example electric drive system with a multiple chemistry battery system for electric vehicles in accordance with one or more embodiments of the disclosure.

FIG. 8A schematically illustrates an electric drive system 810 in accordance with one or more embodiments of the disclosure. The electric drive system 810 may be used as a part of an electric vehicle, such as the electric vehicle 100 described above. The electric drive system 810 may be configured to propel the electric vehicle 100 during operation of the electric drive system 810. As shown, the electric drive system 810 may include one or more drive motor(s) 820, one or more battery system(s) 830, and one or more controller(s) 870. The drive motor(s) 820, the battery system(s) 830, and the controller(s) 870 of the electric drive system 810 generally may be configured in a manner similar to the corresponding components and systems of the electric drive system 110 described above, although particular aspects of the electric drive system 810 are described below. Certain similarities and differences between the electric drive system 810 and the electric drive systems 210, 310, 410, 610 will be appreciated from the respective figures and the following description. Further, it will be appreciated that the drive motor(s) 820, the battery system(s) 830, and the controller(s) 870 may include other features and/or components in addition to those illustrated in FIG. 8A, such as any of those described above with respect to the electric drive system 110, where applicable.

As shown, the drive motor(s) 820 may include the first drive motor 222 configured to impart motion to one or more of the wheel(s) 102 of the electric vehicle 100. In some embodiments, the drive motor(s) 820 also may include the second drive motor 224 configured to impart motion to one or more of the wheel(s) 102. In other embodiments, the second drive motor 224 may be omitted. When present, the second drive motor 224 may be mechanically coupled to the first drive motor 222 by the mechanical coupling 228, or may be mechanically uncoupled from the first drive motor 222, according to various embodiments. The first drive motor 222 and the second drive motor 224 generally may be configured in the manner described above. In some instances, the first drive motor 222 and the second drive motor 224 simultaneously may operate in the drive mode of operation. In some instances, the first drive motor 222 and the second drive motor 224 simultaneously may operate in the regeneration mode of operation. In some instances, one of the first drive motor 222 and the second drive motor 224 may operate in the drive mode of operation, while the other of the first drive motor 222 and the second drive motor 224 operates in the regeneration mode of operation. The second motor 224, second controller 274, etc. may be optional.

The battery system(s) 830 may be or may include a multiple chemistry battery system, such as a dual chemistry battery system, that includes a plurality of batteries configured to power the drive motor(s) 820. The plurality of batteries may include a first battery 832 and a second battery 834. The first battery 832 and the second battery 834 may be configured to power the first drive motor 222. When the second drive motor 224 is present, the first battery 832 and the second battery 834 also may be configured to power the second drive motor 224.

The batteries 832, 834 may be configured to store energy and to power the drive motors 222, 224. In other words, in the drive mode of operation, the batteries 832, 834 may be configured to deliver electric current to the drive motors 222, 224. The batteries 832, 834 also may be configured to be charged by the drive motors 222, 224. In other words, in the regeneration mode of operation, the batteries 832, 834 may be configured to receive electric current from the drive motors 222, 224.

Each of the batteries 832, 834 may include one or more pack(s) each including one or more cell(s). As shown, the first battery 832 may include a plurality of packs 840, and each of the packs 840 may include a plurality of cells 842. Likewise, the second battery 834 may include a plurality of packs 850, and each of the packs 850 may include a plurality of cells 852.

Figure 8B:
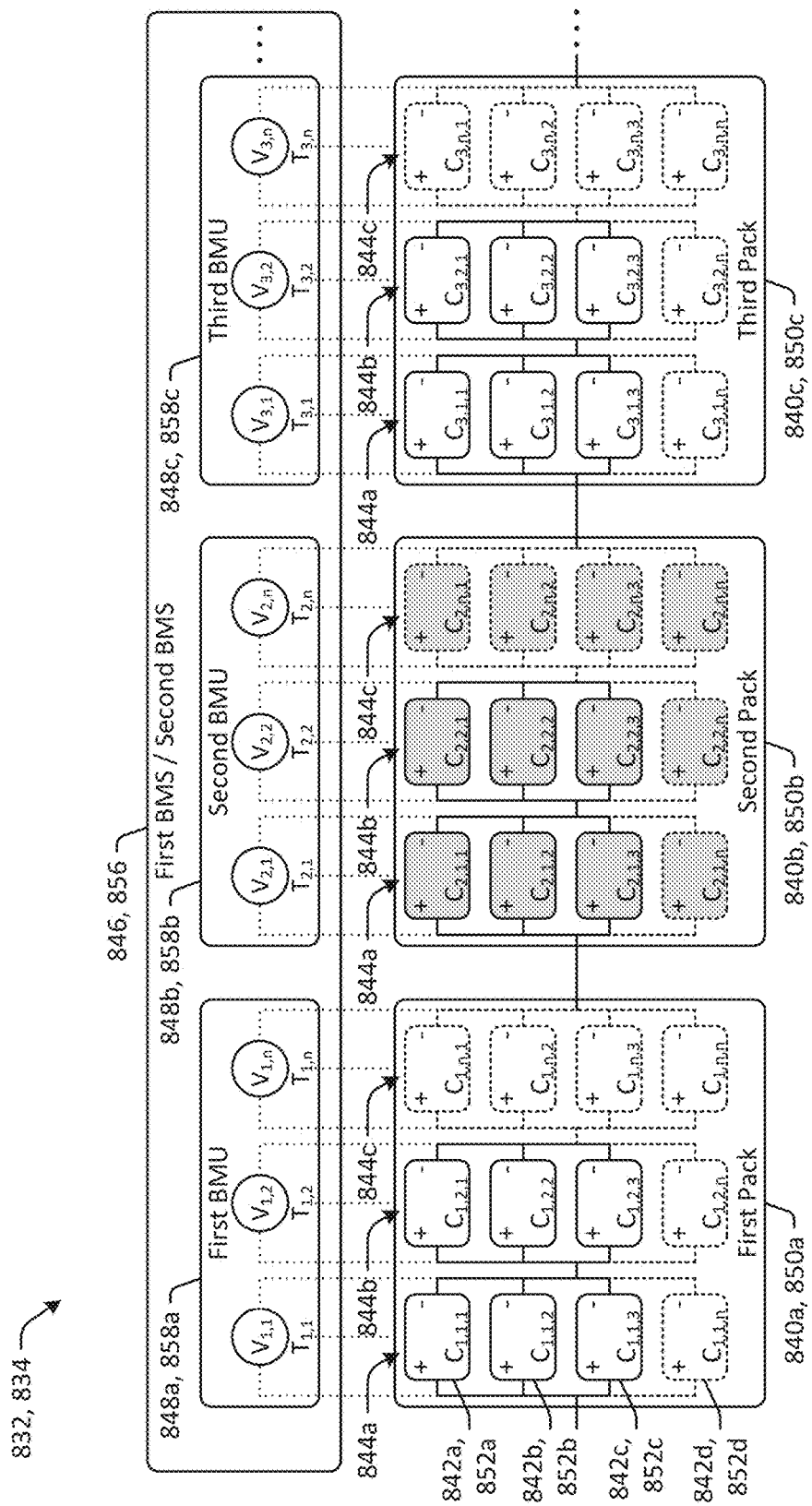
FIG. 8B schematically illustrates an example battery for multiple chemistry battery systems for electric vehicles in accordance with one or more embodiments of the disclosure.

In some embodiments, as shown in FIG. 8B, the first battery 832 may include a first pack 840a, a second pack 840b, and a third pack 840c electrically coupled to one another. The first battery 832 also may include one or more other packs 840 in addition to the packs 840a, 840b, 840c depicted in FIG. 8B. The first battery 832 may include any number of packs 840 electrically coupled to one another. In some embodiments, as shown, all of the packs 840 may be connected in series. In other embodiments, all of the packs 840 may be connected in parallel. In still other embodiments, the packs 840 may be connected by a combination of series connections and parallel connections. In some embodiments, as shown, the respective connections between the packs 840 may be fixed. In other embodiments, one or more, or all, of the respective connections between the packs 840 may be adjustable or switchable. Within each of the packs 840, the cells 842 may be arranged in a plurality of modules 844 each including a plurality of the cells 842. As shown, each of the packs 840 may include a first module 844a, a second module 844b, and one or more additional modules 844c. Each of the packs 840 may include any number of modules 844 electrically coupled to one another. In some embodiments, as shown, all of the modules 844 of a particular pack 840 may be connected in series. In other embodiments, all of the modules 844 of a particular pack 840 may be connected in parallel. In still other embodiments, the modules 844 of a particular pack 840 may be connected by a combination of series connections and parallel connections. In some embodiments, as shown, the respective connections between the modules 844 may be fixed. In other embodiments, one or more, or all, of the respective connections between the modules 844 may be adjustable or switchable. As shown, each of the modules 844 may include a first cell 842a, a second cell 842b, a third cell 842c, and one or more additional cells 842d. Each of the modules 844 may include any number of cells 842 electrically coupled to one another. In some embodiments, as shown, all of the cells 842 of a particular module 844 may be connected in parallel. In other embodiments, all of the cells 842 of a particular module 844 may be connected in series. In still other embodiments, the cells 842 of a particular module 844 may be connected by a combination of series connections and parallel connections. In some embodiments, as shown, the respective connections between the cells 842 may be fixed. In other embodiments, one or more, or all, of the respective connections between the cells 842 may be adjustable or switchable.

The first battery 832 also may include a first battery management system (BMS) 846 electrically coupled to the cells 842 and configured to perform various battery management functions, as described above. The first BMS 846 may include one or more battery management unit(s) (BMU) 848 each including a controller to perform the battery management functions for respective cells 842 of the first battery 832 using one or more processor(s) of the controller. As shown, the first BMS 846 may include a plurality of BMUs 848. In some embodiments, as shown, the first BMS 846 may have a modular configuration, with the number of BMUs 848 corresponding to the number of packs 840 of the first battery 832. In this manner, the first BMS 846 may include a first BMU 848a electrically coupled to the cells 842 of the first pack 840a, a second BMU 848b electrically coupled to the cells 842 of the second pack 840b, a third BMU 848c electrically coupled to the cells 842 of the third pack 840c, and so forth. In other embodiments, the first BMS 846 may have a centralized configuration or a distributed configuration. The first BMS 846 may be configured to perform battery management functions, including one or more, or all, of the monitoring functions, energy recovery functions, computation functions, communication functions, connection functions, and optimization functions described above. In some embodiments, the first BMS 846 may be configured to perform battery balancing with respect to state of charge, voltage, current.

In some embodiments, as shown in FIG. 8B, the second battery 834 similarly may include a first pack 850a, a second pack 850b, and a third pack 850c electrically coupled to one another. In some embodiments, as shown, all of the packs 850 may be connected in series. In some embodiments, as shown, the respective connections between the packs 850 may be fixed. Within each of the packs 850, the cells 852 may be arranged in a plurality of modules 844 each including a plurality of the cells 852. As shown, each of the packs 850 may include a first module 844a, a second module 844b, and one or more additional modules 844c. In some embodiments, as shown, all of the modules 844 of a particular pack 850 may be connected in series. In some embodiments, as shown, the respective connections between the modules 844 may be fixed. As shown, each of the modules 844 may include a first cell 852a, a second cell 852b, a third cell 852c, and one or more additional cells 852d. In some embodiments, as shown, all of the cells 852 of a particular module 844 may be connected in parallel. In some embodiments, as shown, the respective connections between the cells 852 may be fixed.

The second battery 834 also may include a second battery management system (BMS) 856 electrically coupled to the cells 852 and configured to perform various battery management functions, as described above. The second BMS 856 may include one or more battery management unit(s) (BMU) 858 each including a controller to perform the battery management functions for respective cells 852 of the second battery 834 using one or more processor(s) of the controller. In some embodiments, as shown, the second BMS 856 may have a modular configuration, with the number of BMUs 858 corresponding to the number of packs 850 of the second battery 834. In this manner, the second BMS 856 may include a first BMU 858a electrically coupled to the cells 852 of the first pack 850a, a second BMU 858b electrically coupled to the cells 852 of the second pack 850b, a third BMU 858c electrically coupled to the cells 852 of the third pack 850c, and so forth. In other embodiments, the second BMS 856 may have a centralized configuration or a distributed configuration. The second BMS 856 may be configured to perform battery management functions, including one or more, or all, of the monitoring functions, energy recovery functions, computation functions, communication functions, connection functions, and optimization functions described above. In some embodiments, the second BMS 856 may be configured to perform battery balancing with respect to state of charge, voltage, current.

The structural configuration of the first battery 832 may be the same as or different from the structural configuration of the second battery 834. In various embodiments, a number of the packs 840 of the first battery 832 may be the same as, greater than, or less than a number of the packs 850 of the second battery 834. In various embodiments, the types of connections (i.e., series or parallel) between the packs 840 of the first battery 832 may be the same as or different from the types of connections between the packs 850 of the second battery 834. In various embodiments, a number of the cells 842 of the first battery 832 may be the same as, greater than, or less than a number of the cells 852 of the second battery 834. In various embodiments, the types of connections between the cells 842 of the first battery 832 may be the same as or different from the types of connections between the cells 852 of the second battery 834.

As explained above, the battery system 830 may be a multiple chemistry battery system, such as a dual chemistry battery system, a triple chemistry battery system, or a quadruple chemistry battery system. According to a dual chemistry configuration, the battery system 830 may include one or more first cells having a first chemistry and one or more second cells having a second chemistry different from the first chemistry. According to a triple chemistry configuration, the battery system 830 may include one or more first cells having a first chemistry, one or more second cells having a second chemistry, and one or more third cells having a third chemistry, with the first chemistry, the second chemistry, and the third chemistry being different from one another. According to still other multiple chemistry configurations, the battery system 830 may include respective cells having four or more different battery chemistries. Various types of battery chemistries may be used in the cells of the battery system 830, including, but not limited to, lithium-ion (Li-ion), lithium-titanate (lithium titanium oxide) (LTO), nickel-metal hydride (NIMH), and nickel cadmium (NiCd).

In some embodiments, as shown in FIG. 8B, one or both of the batteries 832, 834 of the battery system 830 may have a multiple chemistry configuration, such as a dual chemistry configuration. For example, one or more of the cells 842 of the first battery 832 may have a first chemistry, and one or more of the cells 842 may have a second chemistry different from the first chemistry. Likewise, one or more of the cells 852 of the second battery 834 may have a first chemistry, and one or more of the cells 852 may have a second chemistry different from the first chemistry. According to the configuration of FIG. 8B, the one or more of the cells 842, 852 having the first chemistry may be positioned in one of the packs 840, 850 of the respective battery 832, 834, and the one or more cells 842, 852 having the second chemistry may be positioned in another one of the packs 840, 850 of the respective battery 832, 834. For example, the one or more of the cells 842, 852 having the first chemistry may be positioned in the first pack 840a, 850a of the respective battery 832, 834, and the one or more cells 842, 852 having the second chemistry may be positioned in the second pack 840b, 850b of the respective battery 832, 834. In some embodiments, all of the cells 842, 852 of the first pack 840a, 850a may have the first chemistry, and all of the cells 842, 852 of the second pack 840b, 850b may have the second chemistry, as shown.

Figure 8C:
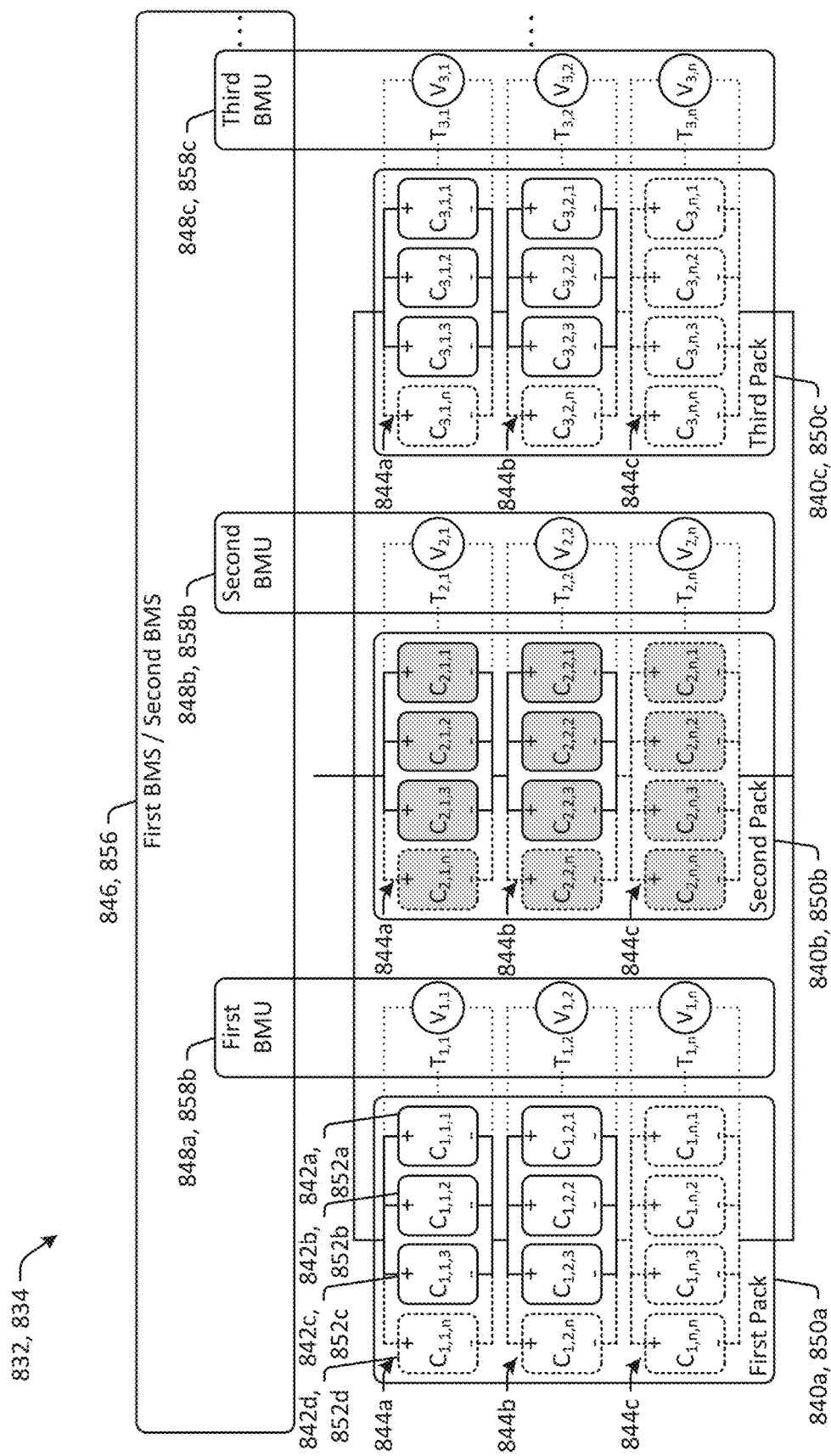
FIG. 8C schematically illustrates an example battery for multiple chemistry battery systems for electric vehicles in accordance with one or more embodiments of the disclosure.

In some embodiments, as shown in FIG. 8C, the first battery 832 may include the first pack 840a, the second pack 840b, and the third pack 840c electrically coupled to one another. In some embodiments, as shown, all of the packs 840 may be connected in parallel. In some embodiments, as shown, the respective connections between the packs 840 may be fixed. In some embodiments, as shown, all of the modules 844 of a particular pack 840 may be connected in series. In some embodiments, as shown, the respective connections between the modules 844 may be fixed. In some embodiments, as shown, all of the cells 842 of a particular module 844 may be connected in parallel. In some embodiments, as shown, the respective connections between the cells 842 may be fixed.

In some embodiments, as shown in FIG. 8C, the second battery 834 similarly may include the first pack 850a, the second pack 850b, and the third pack 850c electrically coupled to one another. In some embodiments, as shown, all of the packs 850 may be connected in parallel. In some embodiments, as shown, the respective connections between the packs 850 may be fixed. In some embodiments, as shown, all of the modules 844 of a particular pack 850 may be connected in series. In some embodiments, as shown, the respective connections between the modules 844 may be fixed. In some embodiments, as shown, all of the cells 852 of a particular module 844 may be connected in parallel. In some embodiments, as shown, the respective connections between the cells 852 may be fixed.

In some embodiments, as shown in FIG. 8C, one or both of the batteries 832, 834 of the battery system 830 may have a multiple chemistry configuration, such as a dual chemistry configuration. For example, one or more of the cells 842 of the first battery 832 may have a first chemistry, and one or more of the cells 842 may have a second chemistry different from the first chemistry. Likewise, one or more of the cells 852 of the second battery 834 may have a first chemistry, and one or more of the cells 852 may have a second chemistry different from the first chemistry. According to the configuration of FIG. 8C, the one or more of the cells 842, 852 having the first chemistry may be positioned in one of the packs 840, 850 of the respective battery 832, 834, and the one or more cells 842, 852 having the second chemistry may be positioned in another one of the packs 840, 850 of the respective battery 832, 834. For example, the one or more of the cells 842, 852 having the first chemistry may be positioned in the first pack 840*a*, 850*a* of the respective battery 832, 834, and the one or more cells 842, 852 having the second chemistry may be positioned in the second pack 840*b*, 850*b* of the respective battery 832, 834.

Figure 8D:
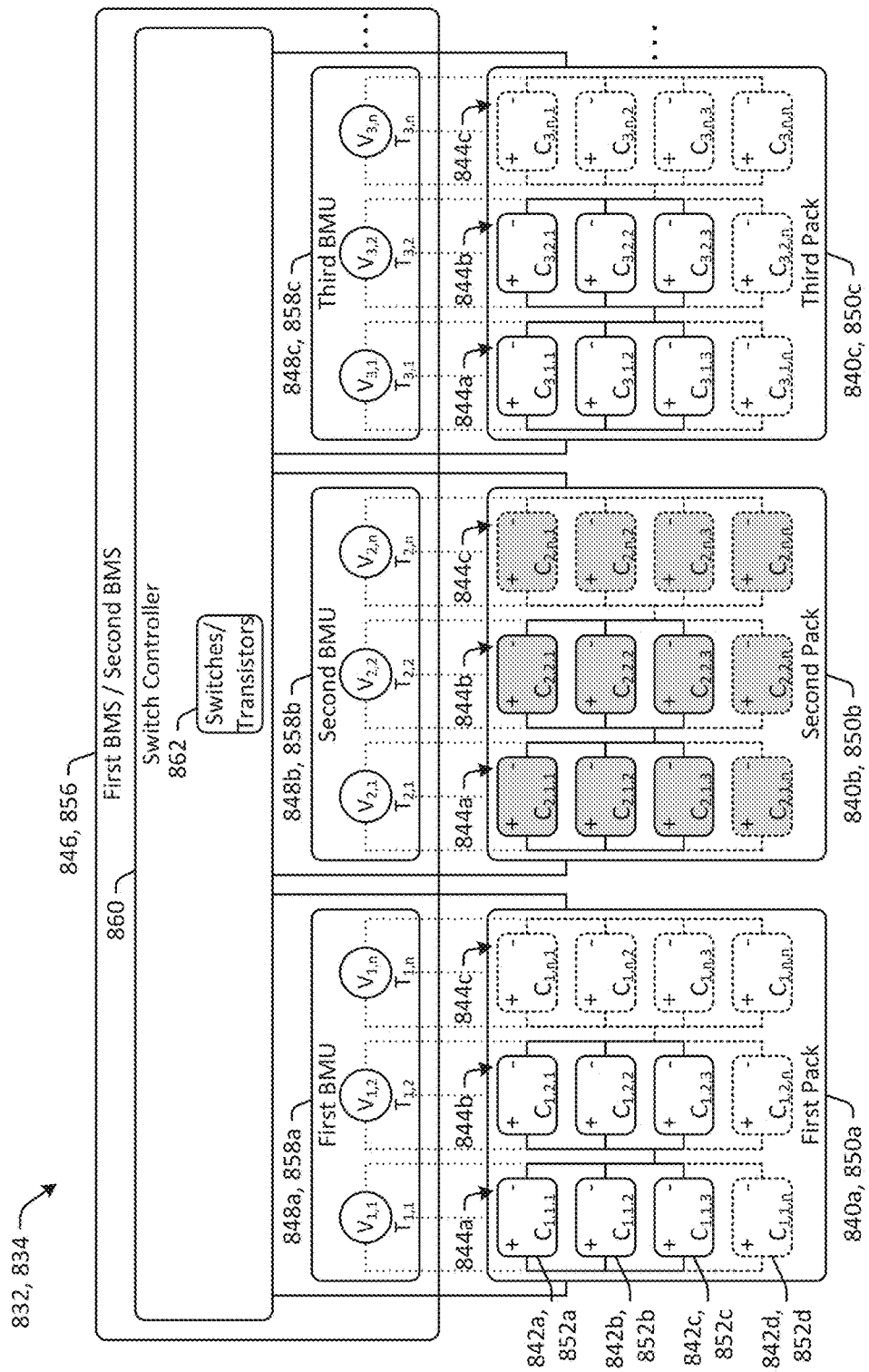
FIG. 8D schematically illustrates an example battery for multiple chemistry battery systems for electric vehicles in accordance with one or more embodiments of the disclosure.

In some embodiments, as shown in FIG. 8D, the first battery 832 may include the first pack 840*a*, the second pack 840*b*, and the third pack 840*c* electrically coupled to one another. In some embodiments, as shown, the packs 840 may be electrically coupled to one another by a switch controller 860 of the first BMS 846. The switch controller 860 may be configured to change or adjust connections between the respective packs 840 of the first battery 832. As shown, the switch controller 860 may include one or more switch(es), transistor(s), or solid state relay(s) 862, or the switch controller 820 may be electrically coupled to and in operable communication with the one or more switch(es), transistor(s), or solid state relay(s) 862. In some embodiments, the switch(es), transistor(s), or solid state relay(s) 862 may be or may include one or more metal-oxide-semiconductor field-effect transistor(s) (MOSFETs). The switch(es), transistor(s), or solid state relay(s) 862 may be configured to transition between a plurality of states to form a plurality of different connections between the packs 840 of the first battery 832. In some embodiments, the switch(es), transistor(s), or solid state relay(s) 862 may be configured to transition between a first state, a second state, a third state, and a fourth state. In the first state, the switch(es), transistor(s), or solid state relay(s) 862 may form series connections between all of the packs 840. In the second state, the switch(es), transistor(s), or solid state relay(s) 862 may form parallel connections between all of the packs 840. In the third state, the switch(es), transistor(s), or solid state relay(s) 862 may form series connections between some of the packs 840 and parallel connections between some of the packs 840. In the fourth state, the switch(es), transistor(s), or solid state relay(s) 862 may form series or parallel connections between some of the packs 840, and some of the packs 840 may be disconnected from one another. The switch controller 860 may cause the switch(es), transistor(s), or solid state relay(s) 862 to transition between the first state, the second state, the third state, and the fourth state based at least in part on an electric load on the first battery 832 or the batteries 832, 234 and/or a charge level of the first battery 832.

In some embodiments, as shown in FIG. 8D, the second battery 834 similarly may include the first pack 850*a*, the second pack 850*b*, and the third pack 850*c* electrically coupled to one another. In some embodiments, as shown, the packs 850 may be electrically coupled to one another by a switch controller 860 of the second BMS 856. The switch controller 860 may be configured to change or adjust connections between the respective packs 850 of the second battery 834. As shown, the switch controller 860 may include one or more switch(es), transistor(s), or solid state relay(s) 862 configured in the manner described above, or the switch controller 820 may be electrically coupled to and in operable communication with the one or more switch(es), transistor(s), or solid state relay(s) 862. In a first state, the switch(es), transistor(s), or solid state relay(s) 862 may form series connections between all of the packs 850. In a second state, the switch(es), transistor(s), or solid state relay(s) 862 may form parallel connections between all of the packs 850. In a third state, the switch(es), transistor(s), or solid state relay(s) 862 may form series connections between some of the packs 850 and parallel connections between some of the packs 850. In a fourth state, the switch(es), transistor(s), or solid state relay(s) 862 may form series or parallel connections between some of the packs 850, and some of the packs 850 may be disconnected from one another. The switch controller 860 may cause the switch(es), transistor(s), or solid state relay(s) 862 to transition between the first state, the second state, the third state, and the fourth state based at least in part on an electric load on the second battery 834 or the batteries 832, 234 and/or a charge level of the second battery 834.

In some embodiments, as shown in FIG. 8D, one or both of the batteries 832, 834 of the battery system 830 may have a multiple chemistry configuration, such as a dual chemistry configuration. For example, one or more of the cells 842 of the first battery 832 may have a first chemistry, and one or more of the cells 842 may have a second chemistry different from the first chemistry. Likewise, one or more of the cells 852 of the second battery 834 may have a first chemistry, and one or more of the cells 852 may have a second chemistry different from the first chemistry. According to the configuration of FIG. 8D, the one or more of the cells 842, 852 having the first chemistry may be positioned in one of the packs 840, 850 of the respective battery 832, 834, and the one or more cells 842, 852 having the second chemistry may be positioned in another one of the packs 840, 850 of the respective battery 832, 834. For example, the one or more of the cells 842, 852 having the first chemistry may be positioned in the first pack 840*a*, 850*a* of the respective battery 832, 834, and the one or more cells 842, 852 having the second chemistry may be positioned in the second pack 840*b*, 850*b* of the respective battery 832, 834.

Different combinations of battery chemistries may be used within the battery system 830. In various embodiments, the battery system 830 may have a multiple chemistry configuration that includes one or more lithium-ion cells, one or more lithium-titanate cells, one or more nickel-metal hydride cells, and/or one or more nickel cadmium cells, in any combination of at least two of such battery chemistries. Still other types of battery chemistries may be used in combination with such battery chemistries and/or additional battery chemistries. In some embodiments, one or more of the cells 842 of the first battery 832 may be lithium-ion cells, one or more of the cells 842 of the first battery 832 may be lithium-titanate cells, and such cells may be positioned in different packs 840 thereof. Likewise, in some embodiments, one or more of the cells 852 of the second battery 834 may be lithium-ion cells, one or more of the cells 852 of the second battery 834 may be lithium-titanate cells, and such cells may be positioned in different packs 850 thereof.

The controller(s) 870 may include the first motor controller 272 configured to control delivery of electric current between the first drive motor 222 and the batteries 832, 834. In some embodiments, the controller(s) 870 also may include the second motor controller 274 configured to control delivery of electric current between the second drive motor 224 and the batteries 832, 834. In other embodiments, the second motor controller 274 may be omitted, for example, when the second drive motor 224 is omitted.

As shown in FIG. 8A, the controller(s) 870 also may include the switch controller 372 configured to change or adjust connections between the first battery 832 and the second battery 834. The switch controller 372 may be electrically coupled to the first battery 832, the second battery 834, and the first motor controller 272. When the second motor controller 274 is present, the switch controller 372 also may be electrically coupled to the second motor controller 274. As shown, the switch controller 372 may include the one or more switch(es), transistor(s), or solid state relay(s) 374, or the switch controller 372 may be electrically coupled to and in operable communication with the one or more switch(es), transistor(s), or solid state relay(s) 374. The switch controller 372 generally may be configured in the manner described above. As shown, the controller(s) 870 also may include the energy transfer controller 476 configured to control transfer of energy between the first battery 832 and the second battery 834. For example, the energy transfer controller 476 may be configured to control transfer of energy from the first battery 832 to the second battery 834 and/or from the second battery 834 to the first battery 832. The energy transfer controller 476 may include the one or more DC-DC converter(s) 478, or the energy transfer controller 476 may be electrically coupled to and in operable communication with the one or more DC-DC converter(s) 478. The energy transfer controller 476 may cause the DC-DC converter(s) 478 to transfer energy between the first battery 832 and the second battery 834 based at least in part on an electric load on the batteries 832, 834, a charge level of the first battery 832, and/or a charge level of the second battery 834. The energy transfer controller 476 generally may be configured in the manner described above.

In various embodiments, the first battery 832 and the second battery 834 may be used in any of the electric drive systems 210, 310, 410, 510, 610, 710 described above instead of the first battery 232 and the second battery 234. In such embodiments, the first battery 832 and the second battery 834 may be used in carrying out any of the process flows 290, 390, 490, 590, 690, 790 described above.

Figure 9A:
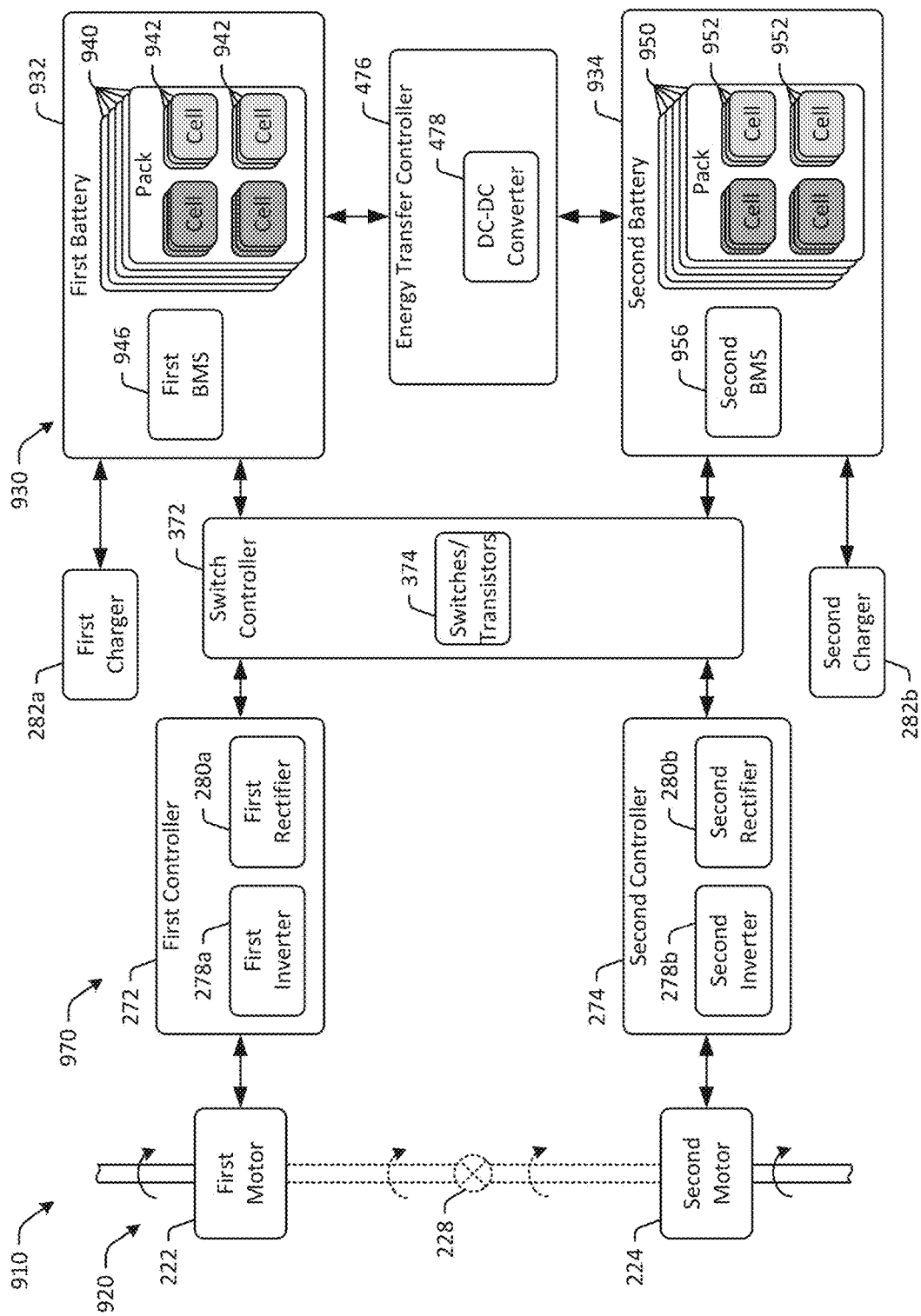
FIG. 9A schematically illustrates an example electric drive system with a multiple chemistry battery system for electric vehicles in accordance with one or more embodiments of the disclosure.

FIG. 9A schematically illustrates an electric drive system 910 in accordance with one or more embodiments of the disclosure. The electric drive system 910 may be used as a part of an electric vehicle, such as the electric vehicle 100 described above. The electric drive system 910 may be configured to propel the electric vehicle 100 during operation of the electric drive system 910. As shown, the electric drive system 910 may include one or more drive motor(s) 920, one or more battery system(s) 930, and one or more controller(s) 970. The drive motor(s) 920, the battery system(s) 930, and the controller(s) 970 of the electric drive system 910 generally may be configured in a manner similar to the corresponding components and systems of the electric drive system 110 described above, although particular aspects of the electric drive system 910 are described below.

Certain similarities and differences between the electric drive system 910 and the electric drive systems 210, 310, 410, 610, 810 will be appreciated from the respective figures and the following description. Further, it will be appreciated that the drive motor(s) 920, the battery system(s) 930, and the controller(s) 970 may include other features and/or components in addition to those illustrated in FIG. 9A, such as any of those described above with respect to the electric drive system 110, where applicable.

As shown, the drive motor(s) 920 may include the first drive motor 222 configured to impart motion to one or more of the wheel(s) 102 of the electric vehicle 100. In some embodiments, the drive motor(s) 920 also may include the second drive motor 224 configured to impart motion to one or more of the wheel(s) 102. In other embodiments, the second drive motor 224 may be omitted. When present, the second drive motor 224 may be mechanically coupled to the first drive motor 222 by the mechanical coupling 228, or may be mechanically uncoupled from the first drive motor 222, according to various embodiments. The first drive motor 222 and the second drive motor 224 generally may be configured in the manner described above. In some instances, the first drive motor 222 and the second drive motor 224 simultaneously may operate in the drive mode of operation. In some instances, the first drive motor 222 and the second drive motor 224 simultaneously may operate in the regeneration mode of operation. In some instances, one of the first drive motor 222 and the second drive motor 224 may operate in the drive mode of operation, while the other of the first drive motor 222 and the second drive motor 224 operates in the regeneration mode of operation.

The battery system(s) 930 may be or may include a multiple chemistry battery system, such as a triple chemistry battery system, that includes a plurality of batteries configured to power the drive motor(s) 920. The plurality of batteries may include a first battery 932 and a second battery 934. The first battery 932 and the second battery 934 may be configured to power the first drive motor 222. When the second drive motor 224 is present, the first battery 932 and the second battery 934 also may be configured to power the second drive motor 224.

The batteries 932, 934 may be configured to store energy and to power the drive motors 222, 224. In other words, in the drive mode of operation, the batteries 932, 934 may be configured to deliver electric current to the drive motors 222, 224. The batteries 932, 934 also may be configured to be charged by the drive motors 222, 224. In other words, in the regeneration mode of operation, the batteries 932, 934 may be configured to receive electric current from the drive motors 222, 224.

Each of the batteries 932, 934 may include one or more pack(s) each including one or more cell(s). As shown, the first battery 932 may include a plurality of packs 940, and each of the packs 940 may include a plurality of cells 942. Likewise, the second battery 934 may include a plurality of packs 950, and each of the packs 950 may include a plurality of cells 952.

Figure 9B:
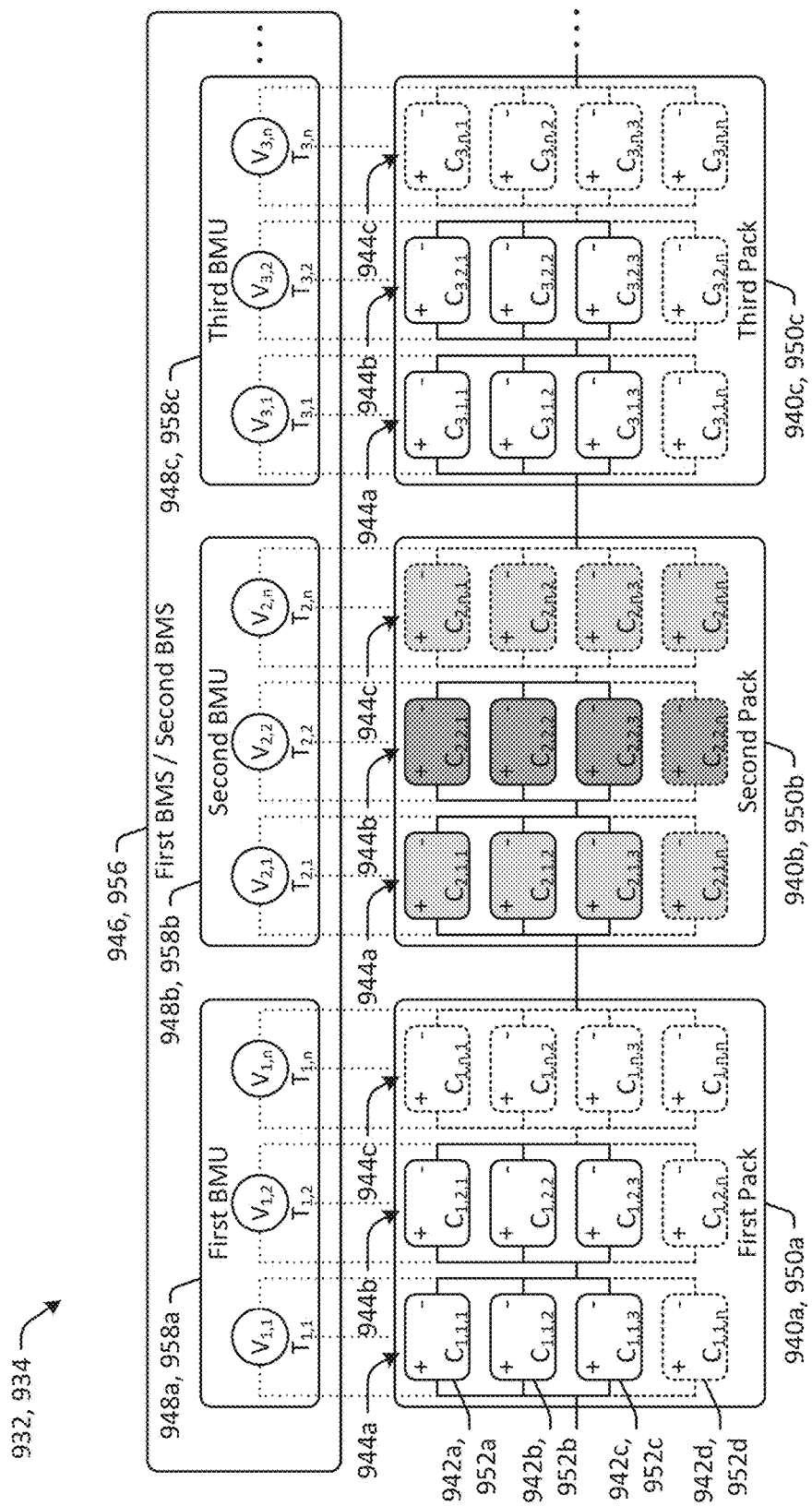
FIG. 9B schematically illustrates an example battery for multiple chemistry battery systems for electric vehicles in accordance with one or more embodiments of the disclosure.

In some embodiments, as shown in FIG. 9B, the first battery 932 may include a first pack 940a, a second pack 940b, and a third pack 940c electrically coupled to one another. The first battery 932 also may include one or more other packs 940 in addition to the packs 940a, 940b, 940c depicted in FIG. 9B. The first battery 932 may include any number of packs 940 electrically coupled to one another. In some embodiments, as shown, all of the packs 940 may be connected in series. In other embodiments, all of the packs 940 may be connected in parallel. In still other embodiments, the packs 940 may be connected by a combination of series connections and parallel connections. In some embodiments, as shown, the respective connections between the packs 940 may be fixed. In other embodiments, one or more, or all, of the respective connections between the packs 940 may be adjustable or switchable. Within each of the packs 940, the cells 942 may be arranged in a plurality of modules 944 each including a plurality of the cells 942. As shown, each of the packs 940 may include a first module 944*a*, a second module 944*b*, and one or more additional modules 944*c*. Each of the packs 940 may include any number of modules 944 electrically coupled to one another. In some embodiments, as shown, all of the modules 944 of a particular pack 940 may be connected in series. In other embodiments, all of the modules 944 of a particular pack 940 may be connected in parallel. In still other embodiments, the modules 944 of a particular pack 940 may be connected by a combination of series connections and parallel connections. In some embodiments, as shown, the respective connections between the modules 944 may be fixed. In other embodiments, one or more, or all, of the respective connections between the modules 944 may be adjustable or switchable. As shown, each of the modules 944 may include a first cell 942*a*, a second cell 942*b*, a third cell 942*c*, and one or more additional cells 942*d*. Each of the modules 944 may include any number of cells 942 electrically coupled to one another. In some embodiments, as shown, all of the cells 942 of a particular module 944 may be connected in parallel. In other embodiments, all of the cells 942 of a particular module 944 may be connected in series. In still other embodiments, the cells 942 of a particular module 944 may be connected by a combination of series connections and parallel connections. In some embodiments, as shown, the respective connections between the cells 942 may be fixed. In other embodiments, one or more, or all, of the respective connections between the cells 942 may be adjustable or switchable.

The first battery 932 also may include a first battery management system (BMS) 946 electrically coupled to the cells 942 and configured to perform various battery management functions, as described above. The first BMS 946 may include one or more battery management unit(s) (BMU) 948 each including a controller to perform the battery management functions for respective cells 942 of the first battery 932 using one or more processor(s) of the controller. As shown, the first BMS 946 may include a plurality of BMUs 948. In some embodiments, as shown, the first BMS 946 may have a modular configuration, with the number of BMUs 948 corresponding to the number of packs 940 of the first battery 932. In this manner, the first BMS 946 may include a first BMU 948*a* electrically coupled to the cells 942 of the first pack 940*a*, a second BMU 948*b* electrically coupled to the cells 942 of the second pack 940*b*, a third BMU 948*c* electrically coupled to the cells 942 of the third pack 940*c*, and so forth. In other embodiments, the first BMS 946 may have a centralized configuration or a distributed configuration. The first BMS 946 may be configured to perform battery management functions, including one or more, or all, of the monitoring functions, energy recovery functions, computation functions, communication functions, connection functions, and optimization functions described above. In some embodiments, the first BMS 946 may be configured to perform battery balancing with respect to state of charge, voltage, current.

In some embodiments, as shown in FIG. 9B, the second battery 934 similarly may include a first pack 950*a*, a second pack 950*b*, and a third pack 950*c* electrically coupled to one another. In some embodiments, as shown, all of the packs 950 may be connected in series. In some embodiments, as shown, the respective connections between the packs 950 may be fixed. Within each of the packs 950, the cells 952 may be arranged in a plurality of modules 944 each including a plurality of the cells 952. As shown, each of the packs 950 may include a first module 944*a*, a second module 944*b*, and one or more additional modules 944*c*. In some embodiments, as shown, all of the modules 944 of a particular pack 950 may be connected in series. In some embodiments, as shown, the respective connections between the modules 944 may be fixed. As shown, each of the modules 944 may include a first cell 952*a*, a second cell 952*b*, a third cell 952*c*, and one or more additional cells 952*d*. In some embodiments, as shown, all of the cells 952 of a particular module 944 may be connected in parallel. In some embodiments, as shown, the respective connections between the cells 952 may be fixed.

The second battery 934 also may include a second battery management system (BMS) 956 electrically coupled to the cells 952 and configured to perform various battery management functions, as described above. The second BMS 956 may include one or more battery management unit(s) (BMU) 958 each including a controller to perform the battery management functions for respective cells 952 of the second battery 934 using one or more processor(s) of the controller. In some embodiments, as shown, the second BMS 956 may have a modular configuration, with the number of BMUs 958 corresponding to the number of packs 950 of the second battery 934. In this manner, the second BMS 956 may include a first BMU 958*a* electrically coupled to the cells 952 of the first pack 950*a*, a second BMU 958*b* electrically coupled to the cells 952 of the second pack 950*b*, a third BMU 958*c* electrically coupled to the cells 952 of the third pack 950*c*, and so forth. In other embodiments, the second BMS 956 may have a centralized configuration or a distributed configuration. The second BMS 956 may be configured to perform battery management functions, including one or more, or all, of the monitoring functions, energy recovery functions, computation functions, communication functions, connection functions, and optimization functions described above. In some embodiments, the second BMS 956 may be configured to perform battery balancing with respect to state of charge, voltage, current.

The structural configuration of the first battery 932 may be the same as or different from the structural configuration of the second battery 934. In various embodiments, a number of the packs 940 of the first battery 932 may be the same as, greater than, or less than a number of the packs 950 of the second battery 934. In various embodiments, the types of connections (i.e., series or parallel) between the packs 940 of the first battery 932 may be the same as or different from the types of connections between the packs 950 of the second battery 934. In various embodiments, a number of the cells 942 of the first battery 932 may be the same as, greater than, or less than a number of the cells 952 of the second battery 934. In various embodiments, the types of connections between the cells 942 of the first battery 932 may be the same as or different from the types of connections between the cells 952 of the second battery 934.

As explained above, the battery system 930 may be a multiple chemistry battery system, such as a dual chemistry battery system, a triple chemistry battery system, or a quadruple chemistry battery system. According to a dual chemistry configuration, the battery system 930 may include one or more first cells having a first chemistry and one or more second cells having a second chemistry different from the first chemistry. According to a triple chemistry configuration, the battery system 930 may include one or more first cells having a first chemistry, one or more second cells having a second chemistry, and one or more third cells having a third chemistry, with the first chemistry, the second chemistry, and the third chemistry being different from one another. According to still other multiple chemistry configurations, the battery system 930 may include respective cells having four or more different battery chemistries. Various types of battery chemistries may be used in the cells of the battery system 930, including, but not limited to, lithium-ion (Li-ion), lithium-titanate (lithium titanium oxide) (LTO), nickel-metal hydride (NIMH), and nickel cadmium (NiCd).

In some embodiments, as shown in FIG. 9B, one or both of the batteries 932, 934 of the battery system 930 may have a multiple chemistry configuration, such as a triple chemistry configuration. For example, one or more of the cells 942 of the first battery 932 may have a first chemistry, one or more of the cells 942 may have a second chemistry, and one or more of the cells 942 may have a third chemistry, with the first chemistry, the second chemistry, and the third chemistry being different from one another. Likewise, one or more of the cells 952 of the second battery 934 may have a first chemistry, one or more of the cells 952 may have a second chemistry, and one or more of the cells 952 may have a third chemistry, with the first chemistry, the second chemistry, and the third chemistry being different from one another. According to the configuration of FIG. 9B, the one or more of the cells 942, 952 having the first chemistry may be positioned in one of the packs 940, 950 of the respective battery 932, 934, the one or more cells 942, 952 having the second chemistry may be positioned in another one of the packs 940, 950 of the respective battery 932, 934, and the one or more cells 942, 952 having the third chemistry may be positioned in the same pack 940, 950 of the respective battery 932, 934 as the one or more cells 942, 952 having the second chemistry. For example, the one or more of the cells 942, 952 having the first chemistry may be positioned in the first pack 940a, 950a of the respective battery 932, 934, the one or more cells 942, 952 having the second chemistry may be positioned in the second pack 940b, 950b of the respective battery 932, 934, and the one or more cells 942, 952 having the third chemistry may be positioned in the second pack 940b, 950b of the respective battery 932, 934. In some embodiments, as shown, the one or more cells 942, 952 having the second chemistry and the one or more cells 942, 952 having the third chemistry may be positioned in different modules 944 of the same pack 940, 950 of the respective battery 932, 934. For example, the one or more cells 942, 952 having the second chemistry may be positioned in the first module 944a of the pack 940, 950, and the one or more cells 942, 952 having the third chemistry may be positioned in the second modules 944b of the same pack 940, 950, as shown. In such embodiments, all of the cells 942, 952 of the first module 944a may have the second chemistry, and all of the cells 942, 952 of the second module 944b may have the third chemistry, as shown.

Figure 9C:
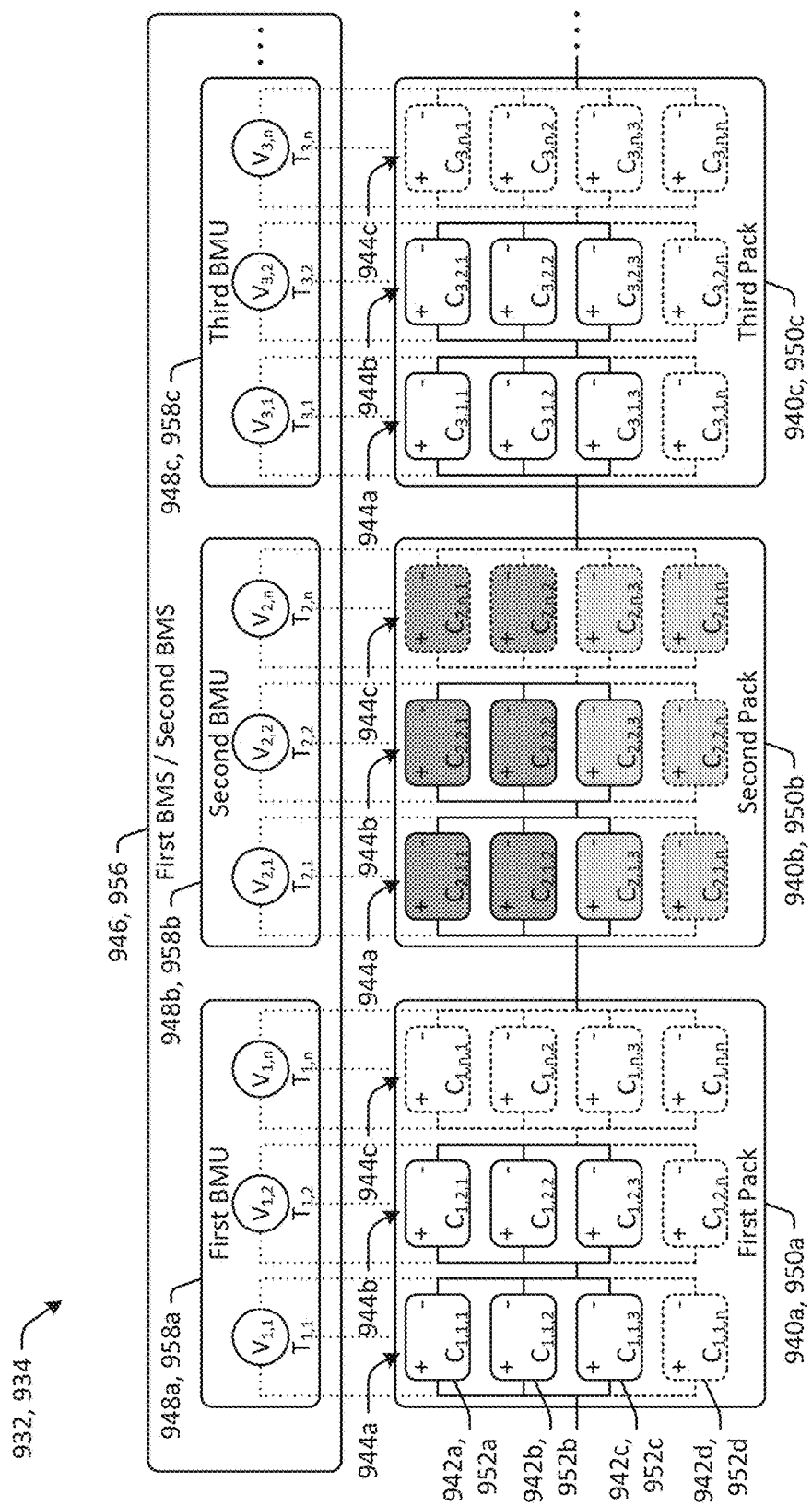
FIG. 9C schematically illustrates an example battery for multiple chemistry battery systems for electric vehicles in accordance with one or more embodiments of the disclosure.

In some embodiments, as shown in FIG. 9C, the first battery 932 may include the first pack 940a, the second pack 940b, and the third pack 940c electrically coupled to one another. In some embodiments, as shown, all of the packs 940 may be connected in parallel. In some embodiments, as shown, the respective connections between the packs 940 may be fixed. In some embodiments, as shown, all of the modules 944 of a particular pack 940 may be connected in series. In some embodiments, as shown, the respective connections between the modules 944 may be fixed. In some embodiments, as shown, all of the cells 942 of a particular module 944 may be connected in parallel. In some embodiments, as shown, the respective connections between the cells 942 may be fixed.

In some embodiments, as shown in FIG. 9C, the second battery 934 similarly may include the first pack 950a, the second pack 950b, and the third pack 950c electrically coupled to one another. In some embodiments, as shown, all of the packs 950 may be connected in parallel. In some embodiments, as shown, the respective connections between the packs 950 may be fixed. In some embodiments, as shown, all of the modules 944 of a particular pack 950 may be connected in series. In some embodiments, as shown, the respective connections between the modules 944 may be fixed. In some embodiments, as shown, all of the cells 952 of a particular module 944 may be connected in parallel. In some embodiments, as shown, the respective connections between the cells 952 may be fixed.

In some embodiments, as shown in FIG. 9C, one or both of the batteries 932, 934 of the battery system 930 may have a multiple chemistry configuration, such as a triple chemistry configuration. For example, one or more of the cells 942 of the first battery 932 may have a first chemistry, one or more of the cells 942 may have a second chemistry, and one or more of the cells 942 may have a third chemistry, with the first chemistry, the second chemistry, and the third chemistry being different from one another. Likewise, one or more of the cells 952 of the second battery 934 may have a first chemistry, one or more of the cells 952 may have a second chemistry, and one or more of the cells 952 may have a third chemistry, with the first chemistry, the second chemistry, and the third chemistry being different from one another. According to the configuration of FIG. 9C, the one or more of the cells 942, 952 having the first chemistry may be positioned in one of the packs 940, 950 of the respective battery 932, 934, the one or more cells 942, 952 having the second chemistry may be positioned in another one of the packs 940, 950 of the respective battery 932, 934, and the one or more cells 942, 952 having the third chemistry may be positioned in the same pack 940, 950 of the respective battery 932, 934 as the one or more cells 942, 952 having the second chemistry. For example, the one or more of the cells 942, 952 having the first chemistry may be positioned in the first pack 940a, 950a of the respective battery 932, 934, the one or more cells 942, 952 having the second chemistry may be positioned in the second pack 940b, 950b of the respective battery 932, 934, and the one or more cells 942, 952 having the third chemistry may be positioned in the second pack 940b, 950b of the respective battery 932, 934. In some embodiments, as shown, the one or more cells 942, 952 having the second chemistry and the one or more cells 942, 952 having the third chemistry may be positioned in the same module 944 of the same pack 940, 950 of the respective battery 932, 934. For example, the one or more cells 942, 952 having the second chemistry may be positioned in the first module 944a of the pack 940, 950, and the one or more cells 942, 952 having the third chemistry may be positioned in the first module 944b of the same pack 940, 950, as shown. In some embodiments, each of the modules 944 of the particular pack may include one or more of the cells 942, 952 having the second chemistry and one or more of the cells 942, 952 having the third chemistry, as shown.

Figure 9D:
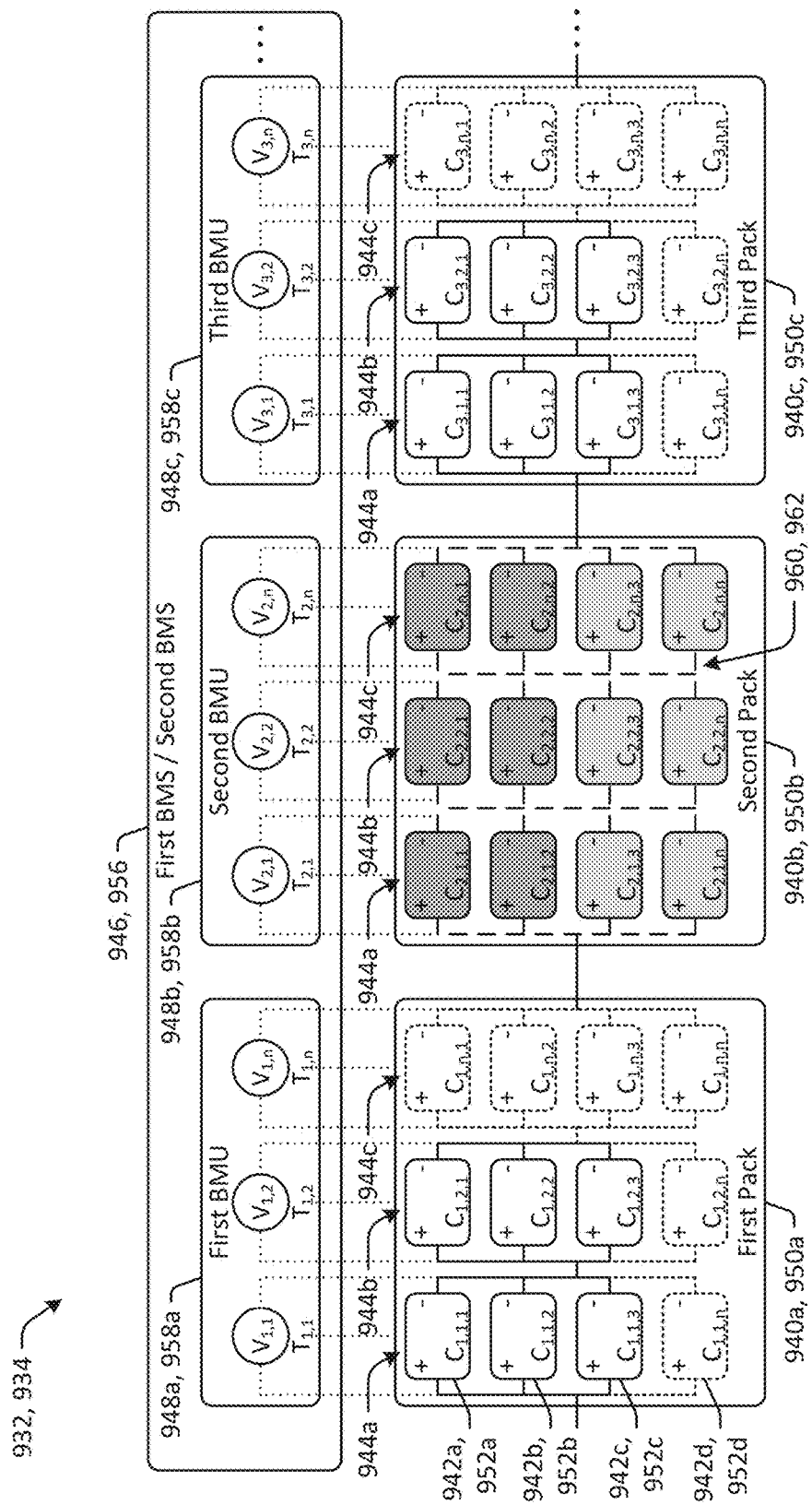
FIG. 9D schematically illustrates an example battery for multiple chemistry battery systems for electric vehicles in accordance with one or more embodiments of the disclosure.

In some embodiments, as shown in FIG. 9D, the first battery 932 may include the first pack 940a, the second pack 940b, and the third pack 940c electrically coupled to one another. In some embodiments, as shown, all of the packs 940 may be connected in parallel. In some embodiments, as shown, the respective connections between the packs 940 may be fixed. In some embodiments, as shown, all of the modules 944 of a particular pack 940 may be connected in series. In some embodiments, as shown, the respective connections between the modules 944 of a particular pack 940 may be fixed, while the respective connections between the modules 944 of a different pack 940 may be changeable or adjustable. In some embodiments, as shown, all of the cells 942 of a particular module 944 may be connected in parallel. In some embodiments, as shown, the respective connections between the cells 942 of a particular module 944 may be fixed, while the respective connections between the cells 942 of a different module 944 may be changeable or adjustable.

In some embodiments, as shown in FIG. 9D, the second battery 934 similarly may include the first pack 950a, the second pack 950b, and the third pack 950c electrically coupled to one another. In some embodiments, as shown, all of the packs 950 may be connected in parallel. In some embodiments, as shown, the respective connections between the packs 950 may be fixed. In some embodiments, as shown, all of the modules 944 of a particular pack 950 may be connected in series. In some embodiments, as shown, the respective connections between the modules 944 of a particular pack 950 may be fixed, while the respective connections between the modules 944 of a different pack 950 may be changeable or adjustable. In some embodiments, as shown, all of the cells 952 of a particular module 944 may be connected in parallel. In some embodiments, as shown, the respective connections between the cells 952 of a particular module 944 may be fixed, while the respective connections between the cells 952 of a different module 944 may be changeable or adjustable.

In some embodiments, as shown in FIG. 9D, one or both of the batteries 932, 934 of the battery system 930 may have a multiple chemistry configuration, such as a triple chemistry configuration. For example, one or more of the cells 942 of the first battery 932 may have a first chemistry, one or more of the cells 942 may have a second chemistry, and one or more of the cells 942 may have a third chemistry, with the first chemistry, the second chemistry, and the third chemistry being different from one another. Likewise, one or more of the cells 952 of the second battery 934 may have a first chemistry, one or more of the cells 952 may have a second chemistry, and one or more of the cells 952 may have a third chemistry, with the first chemistry, the second chemistry, and the third chemistry being different from one another. According to the configuration of FIG. 9D, the one or more of the cells 942, 952 having the first chemistry may be positioned in one of the packs 940, 950 of the respective battery 932, 934, the one or more cells 942, 952 having the second chemistry may be positioned in another one of the packs 940, 950 of the respective battery 932, 934, and the one or more cells 942, 952 having the third chemistry may be positioned in the same pack 940, 950 of the respective battery 932, 934 as the one or more cells 942, 952 having the second chemistry. For example, the one or more of the cells 942, 952 having the first chemistry may be positioned in the first pack 940a, 950a of the respective battery 932, 934, the one or more cells 942, 952 having the second chemistry may be positioned in the second pack 940b, 950b of the respective battery 932, 934, and the one or more cells 942, 952 having the third chemistry may be positioned in the second pack 940b, 950b of the respective battery 932, 934. In some embodiments, as shown, the one or more cells 942, 952 having the second chemistry and the one or more cells 942, 952 having the third chemistry may be positioned in the same module 944 of the same pack 940, 950 of the respective battery 932, 934. For example, the one or more cells 942, 952 having the second chemistry may be positioned in the first module 944a of the pack 940, 950, and the one or more cells 942, 952 having the third chemistry may be positioned in the first module 944b of the same pack 940, 950, as shown. In some embodiments, each of the modules 944 of the particular pack may include one or more of the cells 942, 952 having the second chemistry and one or more of the cells 942, 952 having the third chemistry, as shown.

In some embodiments, as shown in FIG. 9D, the pack 940, 950 that includes the one or more cells 942, 952 having the second chemistry and the one or more cells 942, 952 having the third chemistry also may include a switch controller 960. The switch controller 960 may be configured to change or adjust connections between the respective cells 942, 952 of the pack 940, 950. As shown, the switch controller 960 may include one or more switch(es), transistor(s), or solid state relay(s) 962, or the switch controller 920 may be electrically coupled to and in operable communication with the one or more switch(es), transistor(s), or solid state relay(s) 962. In some embodiments, the switch(es), transistor(s), or solid state relay(s) 862 may be or may include one or more metal-oxide-semiconductor field-effect transistor(s) (MOSFETs). The switch(es), transistor(s), or solid state relay(s) 962 may be configured to transition between a plurality of states to form a plurality of different connections between the respective cells 942, 952 of the pack 940, 950. In some embodiments, the switch(es), transistor(s), or solid state relay(s) 962 may be configured to transition between a first state, a second state, a third state, and a fourth state. In the first state, the switch(es), transistor(s), or solid state relay(s) 962 may form series connections between all of the respective cells 942, 952 of the pack 940, 950. In the second state, the switch(es), transistor(s), or solid state relay(s) 962 may form parallel connections between all of the respective cells 942, 952 of the pack 940, 950. In the third state, the switch(es), transistor(s), or solid state relay(s) 962 may form series connections between some of the respective cells 942, 952 of the pack 940, 950 and parallel connections between some of the respective cells 942, 952 of the pack 940, 950. In the fourth state, the switch(es), transistor(s), or solid state relay(s) 962 may form series or parallel connections between some of the respective cells 942, 952 of the pack 940, 950, and some of the respective cells 942, 952 of the pack 940, 950 may be disconnected from one another. The switch controller 960 may cause the switch(es), transistor(s), or solid state relay(s) 962 to transition between the first state, the second state, the third state, and the fourth state based at least in part on an electric load on the respective battery 932, 934 or the batteries 932, 934, a charge level of the respective battery 932, 934, a charge level of the respective pack 940, 950, and/or a charge level of one or more of the cells 942, 952 of the respective pack 940, 950.

Different combinations of battery chemistries may be used within the battery system 930. In various embodiments, the battery system 930 may have a multiple chemistry configuration that includes one or more lithium-ion cells, one or more lithium-titanate cells, one or more nickel-metal hydride cells, and/or one or more nickel cadmium cells, in any combination of at least two of such battery chemistries. Still other types of battery chemistries may be used in combination with such battery chemistries and/or additional battery chemistries. In some embodiments, one or more of the cells 942 of the first battery 932 may be lithium-ion cells, one or more of the cells 942 of the first battery 932 may be lithium-titanate cells, and such cells may be positioned in different packs 940 or the same pack 940 thereof. Likewise, in some embodiments, one or more of the cells 952 of the second battery 934 may be lithium-ion cells, one or more of the cells 952 of the second battery 934 may be lithium-titanate cells, and such cells may be positioned in different packs 950 or the same pack 950 thereof.

The controller(s) 970 may include the first motor controller 272 configured to control delivery of electric current between the first drive motor 222 and the batteries 932, 934. In some embodiments, the controller(s) 970 also may include the second motor controller 274 configured to control delivery of electric current between the second drive motor 224 and the batteries 932, 934. In other embodiments, the second motor controller 274 may be omitted, for example, when the second drive motor 224 is omitted.

As shown in FIG. 9A, the controller(s) 970 also may include the switch controller 372 configured to change or adjust connections between the first battery 932 and the second battery 934. The switch controller 372 may be electrically coupled to the first battery 932, the second battery 934, and the first motor controller 272. When the second motor controller 274 is present, the switch controller 372 also may be electrically coupled to the second motor controller 274. As shown, the switch controller 372 may include the one or more switch(es), transistor(s), or solid state relay(s) 374, or the switch controller 372 may be electrically coupled to and in operable communication with the one or more switch(es), transistor(s), or solid state relay(s) 374. The switch controller 372 generally may be configured in the manner described above. As shown, the controller(s) 970 also may include the energy transfer controller 476 configured to control transfer of energy between the first battery 932 and the second battery 934. For example, the energy transfer controller 476 may be configured to control transfer of energy from the first battery 932 to the second battery 934 and/or from the second battery 934 to the first battery 932. The energy transfer controller 476 may include the one or more DC-DC converter(s) 478, or the energy transfer controller 476 may be electrically coupled to and in operable communication with the one or more DC-DC converter(s) 478. The energy transfer controller 476 may cause the DC-DC converter(s) 478 to transfer energy between the first battery 932 and the second battery 934 based at least in part on an electric load on the batteries 932, 934, a charge level of the first battery 932, and/or a charge level of the second battery 934. The energy transfer controller 476 generally may be configured in the manner described above.

In various embodiments, the first battery 932 and the second battery 934 may be used in any of the electric drive systems 210, 310, 410, 510, 610, 710 described above instead of the first battery 232 and the second battery 234. In such embodiments, the first battery 932 and the second battery 934 may be used in carrying out any of the process flows 290, 390, 490, 590, 690, 790 described above.

The operations described and depicted in the illustrative methods, process flows, and use cases of FIGS. 1-9D may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those described and depicted in FIGS. 1-9D may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. An electric drive system comprising:
   a first drive motor configured to impart motion to one or more wheels of the electric drive system;
   a second drive motor configured to impart motion to one or more wheels of the electric drive system;
   a plurality of batteries configured to power the first drive motor and the second drive motor, the plurality of batteries comprising:
      a first battery comprising a first cell having a first chemistry; and
      a second battery comprising a second cell having a second chemistry different from the first chemistry; and
   one or more controllers configured to:
      cause the first battery and the second battery to power the first drive motor at a first instance;
      cause the first battery and the second battery to power the second drive motor at a second instance;
      cause the first battery to power the first drive motor and the second drive motor at a third instance; and
      cause the second battery to power the first drive motor and the second drive motor at a fourth instance; and
   one or more switches or transistors electrically coupled to the first battery and the second battery, the one or more switches or transistors configured to transition between a first state in which the one or more switches or transistors form a series connection between the first battery and the second battery and a second state in which the one or more switches or transistors form a parallel connection between the first battery and the second battery.

2. The electric drive system of claim 1, wherein the first cell has a first energy density, wherein the second cell has a second energy density less than the first energy density, wherein the first cell has a first power density, and wherein the second cell has a second power density greater than the first power density.

3. The electric drive system of claim 1, wherein the first cell is a lithium-ion cell, and wherein the second cell is a lithium-titanate cell.

4. The electric drive system of claim 1, wherein the one or more controllers are further configured to:
 determine an electric load on the plurality of batteries; and
 cause, based at least in part on the electric load, the one or more switches or transistors to form the series connection or the parallel connection between the first battery and the second battery.

5. The electric drive system of claim 1, wherein the first battery and the second battery are connected in series at the first instance.

6. The electric drive system of claim 1, wherein the one or more controllers are further configured to:
 cause the first battery to reconfigure internal cells between a series and parallel arrangement via the one or more switches to optimally match voltage between a first battery pack and a second battery pack when the first battery pack and second battery pack are in a parallel arrangement, and to optimally match current when the first battery pack and the second battery pack are in a series arrangement.

7. The electric drive system of claim 1, wherein the first battery and the second battery are connected in parallel at the first instance.

8. The electric drive system of claim 1, wherein the one or more controllers are further configured to:
 cause the first battery and the second battery to power the first drive motor and the second drive motor at a fifth instance; and
 cause the first battery and the second battery to power the first drive motor, and the first battery to power the second drive motor at a sixth instance.

9. The electric drive system of claim 8, wherein the first motor and the second motor are mechanically coupled to one another, and wherein the one or more controllers are further configured to:
 cause the one or more switches or transistors to disconnect the first battery and the second battery from one another;
 cause the first battery to power the first drive motor while the first battery and the second battery are disconnected from one another; and
 cause the second drive motor to charge the second battery while the first battery and the second battery are disconnected from one another and the first battery powers the first drive motor.

10. A method comprising:
 causing, by a battery system controller, a first battery and a second battery to power a first drive motor at a first instance, wherein the first battery comprises a first cell having a first chemistry and the second battery comprises a second cell having a second chemistry, and wherein the first drive motor is configured to impart motion to one or more wheels of an electric drive system;
 causing the first battery and the second battery to power a second drive motor at a second instance, wherein the second drive motor is configured to impart motion to one or more wheels of the electric drive system;
 causing the first battery to power the first drive motor and the second drive motor at a third instance;
 causing the second battery to power the first drive motor and the second drive motor at a fourth instance; and
 wherein one or more switches or transistors electrically coupled to the first battery and the second battery are used to modify connections between the first battery, the second battery, the first drive motor, and the second drive motor, and wherein the one or more switches or transistors are configured to transition between a first state in which the one or more switches or transistors form a series connection between the first battery and the second battery and a second state in which the one or more switches or transistors form a parallel connection between the first battery and the second battery.

11. The method of claim 10, wherein the first cell has a first energy density, wherein the second cell has a second energy density less than the first energy density, wherein the first cell has a first power density, and wherein the second cell has a second power density greater than the first power density.

12. The method of claim 10, wherein the first cell is a lithium-ion cell, and wherein the second cell is a lithium-titanate cell.

13. The method of claim 10, further comprising:
 determining an electric load on the first battery and the second battery; and
 causing, based at least in part on the electric load, the one or more switches or transistors to form a series connection or the parallel connection between the first battery and the second battery.

14. The method of claim 10, wherein the first battery and the second battery are connected in series at the first instance.

15. The method of claim 10, further comprising:
 causing the first battery to reconfigure internal cells between a series and parallel arrangement via the one or more switches to optimally match voltage between a first battery pack and a second battery pack when the first battery pack and second battery pack are in a parallel arrangement, and to optimally match current when the first battery pack and the second battery pack are in a series arrangement.

16. The method of claim 10, wherein the first battery and the second battery are connected in parallel at the first instance.

17. The method of claim 10, further comprising:
 causing the first battery and the second battery to power the first drive motor and the second drive motor at a fifth instance; and
 causing the first battery and the second battery to power the first drive motor, and the first battery to power the second drive motor at a sixth instance.

18. The method of claim 17, wherein the first motor and the second motor are mechanically coupled to one another, the method further comprising:
 causing the one or more switches or transistors to disconnect the first battery and the second battery from one another;
 causing the first battery to power the first drive motor while the first battery and the second battery are disconnected from one another; and
 causing the second drive motor to charge the second battery while the first battery and the second battery are disconnected from one another and the first battery powers the first drive motor.

* * * * *